(12) United States Patent
Liu et al.

(10) Patent No.: US 12,538,317 B2
(45) Date of Patent: Jan. 27, 2026

(54) COMMUNICATION METHOD AND APPARATUS

(71) Applicant: HUAWEI TECHNOLOGIES CO., LTD., Shenzhen (CN)

(72) Inventors: Nannan Liu, Beijing (CN); Junren Chang, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 530 days.

(21) Appl. No.: 17/976,284

(22) Filed: Oct. 28, 2022

(65) Prior Publication Data
US 2023/0074542 A1 Mar. 9, 2023

Related U.S. Application Data

(63) Continuation of application No. PCT/CN2021/090163, filed on Apr. 27, 2021.

(30) Foreign Application Priority Data

Apr. 30, 2020 (CN) .......................... 202010366253.6
Dec. 17, 2020 (CN) .......................... 202011501252.4

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04W 4/06* (2013.01); *H04L 12/189* (2013.01)

(58) Field of Classification Search
CPC ...... H04W 72/23; H04W 4/06; H04L 1/1812; H04L 12/189
See application file for complete search history.

(56) References Cited

U.S. PATENT DOCUMENTS 11,403,193 B2 * 8/2022 Kim ...................... H04L 1/1671
2014/0126551 A1 5/2014 Nammi et al.
(Continued)

FOREIGN PATENT DOCUMENTS

CN 105589506 A 5/2016

OTHER PUBLICATIONS

CMCC:"Discussion on UL inter UE Tx prioritization/ multiplexing", 3GPP Draft: R1-1900417. 3rd Generation Partnership Project (3GPP), Mobile Competence Centre;650; Route Des Lucioles; F-06921 Sophia-Antipolis Cedex; France; vol. RAN WG1, No. Taipei; Jan. 21, 2019-Jan. 25, 2019; Jan. 12, 2019 (Jan. 12, 2019), XP051576026, total 4 pages.

(Continued)

*Primary Examiner* — Charles N Appiah
*Assistant Examiner* — Nicole M Louis-Fils
(74) *Attorney, Agent, or Firm* — HAUPTMAN HAM, LLP

(57) ABSTRACT

A communication method includes determining, by a terminal device, that a second new data indicator (NDI) is toggled in response to a first condition being met. The second NDI is associated with a second resource. The method also includes receiving, by the terminal device, a second data. The second data is transmitted on the second resource. The second resource is associated with a second hybrid automatic repeat request (HARQ) process identifier (ID). The first condition includes the second resource is scheduled by using downlink control information (DCI) or physical downlink control channel (PDCCH) scrambled by a radio network temporary identifier (RNTI), among one or more other suitable conditions.

9 Claims, 15 Drawing Sheets

---

First step: second device -> first device, transmission identifier 1, HARQ process ID 1, newly transmit (data 1) (NDI=0);
Second step: second device -> first device, transmission identifier 2, HARQ process ID 1, newly transmit (data 2) (NDI=1); and
Third step: second device -> first device, transmission identifier 1, HARQ process ID 1, newly transmit (data 1) (NDI=0); ----> this NDI is compared with the NDI in the second step.
 If new transmission/retransmission is determined only based on whether NDIs with a same HARQ process ID are toggled,
  the first device incorrectly considers the data 1 in the third step as newly transmitted data.

(51) Int. Cl.
*H04L 12/18* (2006.01)
*H04W 4/06* (2009.01)

(56) References Cited

U.S. PATENT DOCUMENTS

| | | | |
|---|---|---|---|
| 2018/0092122 A1* | 3/2018 | Babaei | H04L 1/1822 |
| 2019/0191486 A1* | 6/2019 | Myung | H04L 5/0044 |
| 2019/0215104 A1 | 7/2019 | Salem et al. | |
| 2019/0327761 A1* | 10/2019 | Suzuki | H04W 28/04 |
| 2020/0107356 A1* | 4/2020 | Rico Alvarino | H04W 72/21 |
| 2022/0159602 A1* | 5/2022 | Wei | H04W 24/06 |

OTHER PUBLICATIONS

Huawei et al.:"Discussion on HARQ support for NR sidelink", 3GPP TSG-RAN WG2#107bis, R2-1913701, Chongqing, China, Oct. 14-18, 2019, total 17 pages.

R2-2000546, InterDigital Inc. et al, HARQ Buffer Management at the RX UE, 3GPP RAN WG2 Meeting #109e, Feb. 24-Mar. 6, 2020, 4 pages.

3GPP TS 38.214 V16.1.0 (Mar. 2020), 3rd Generation Partnership Project;Technical Specification Group Radio Access Network;NR;Physical layer procedures for data(Release 16), total 151 pages.

3GPP TS 38.321 V16.0.0 (Mar. 2020), 3rd Generation Partnership Project;Technical Specification Group Radio Access Network;NR;Medium Access Control (MAC) protocol specification(Release 16), total 141 pages.

Extended European Search Report issued in corresponding European Application No. 21797378.3, dated Sep. 28, 2023, pp. 1-12.

India Examination Report issued in corresponding India Application No. 202247064356, dated Jan. 5, 2023, pp. 1-6.

International Search Report issued in corresponding International Application No. PCT/CN2021/090163, dated Aug. 2, 2021, pp. 1-9.

* cited by examiner

| Slot | 1 | | | | | | | | | | | | | | 2 | | | | | | | | | | | | | | 3 | | | | | | | | | | | | | | 4 | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Symbol | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| Allocation | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | |
| Allocation ID | | | | | 1 | | | | | | | | | | | | | | 2 | | | | | | | | | | | | | | 3 | | | | | | | | | | | | | | 4 | | | | | | | | | |

FIG. 2

| Slot | 1 | | | | | | | | | | | | | | 2 | | | | | | | | | | | | | | 3 | | | | | | | | | | | | | | 4 | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Symbol | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| DL allocation | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | |
| HARQ process ID | | | | | 3 | | | | | | | | | | | | | | 4 | | | | | | | | | | | | | | 5 | | | | | | | | | | | | | | 6 | | | | | | | | | |

FIG. 4

First step: second device -> first device, transmission identifier 1, HARQ process ID 1, newly transmit (data 1) (NDI=0);
Second step: second device -> first device, transmission identifier 2, HARQ process ID 1, newly transmit (data 2) (NDI=1); and
Third step: second device -> first device, transmission identifier 1, HARQ process ID 1, newly transmit (data 1) (NDI=0); ----> this NDI is compared with the NDI in the second step.
If new transmission/retransmission is determined only based on whether NDIs with a same HARQ process ID are toggled,
 the first device incorrectly considers the data 1 in the third step as newly transmitted data.

FIG. 5

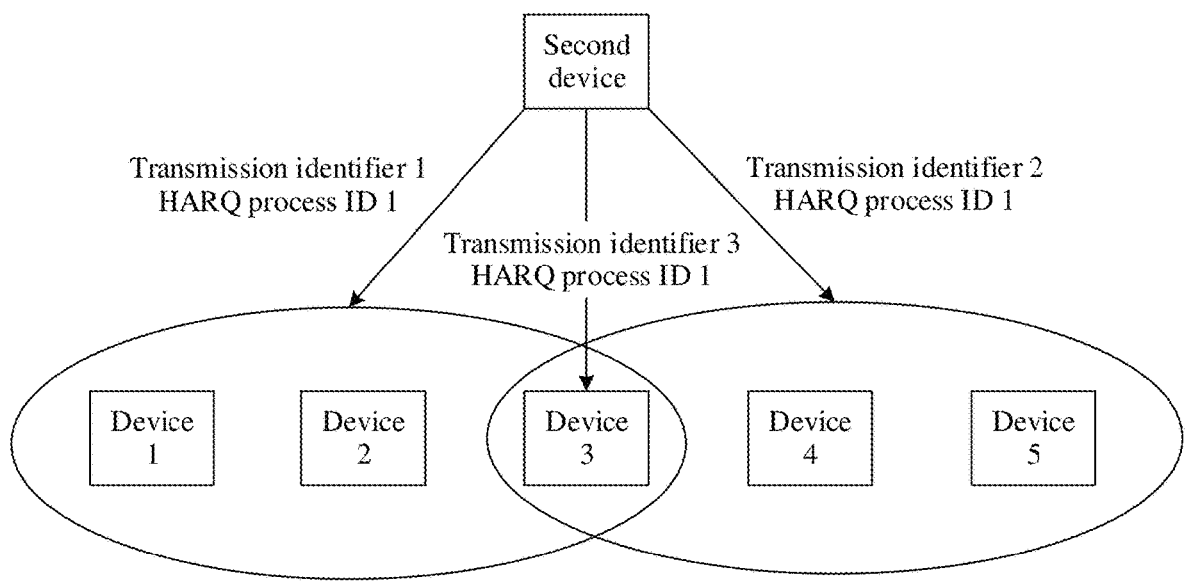

FIG. 6

First step: second device -> first device, transmission identifier 1, HARQ process ID 1, newly transmit (data 1); ---> if the first device processes the data 1 by using the HARQ process 1;
Second step: second device -> first device, transmission identifier 2, HARQ process ID 1, newly transmit (data 2); ---> if the first device processes the data 2 by using the HARQ process 1; and
Third step: second device -> first device, transmission identifier 1, HARQ process ID 1, newly transmit (data 1); ---> if the first device processes the data 1 by using the HARQ process 1.

If there is a fixed correspondence between the HARQ process ID and the HARQ process, that is, the first device processes data corresponding to all HARQ process IDs 1 by using the HARQ process 1. There are different problems under the following two understandings.
Problem 1: In the second step, the first device clears the data 1 received in the first step, and in third step, the first device clears the data 2 received in the second step, which may reduce transmission reliability.
Problem 2: Combination and decoding are performed on the data 2 in the second step and the data 1 in the first step, which may cause data decoding failure.

FIG. 7

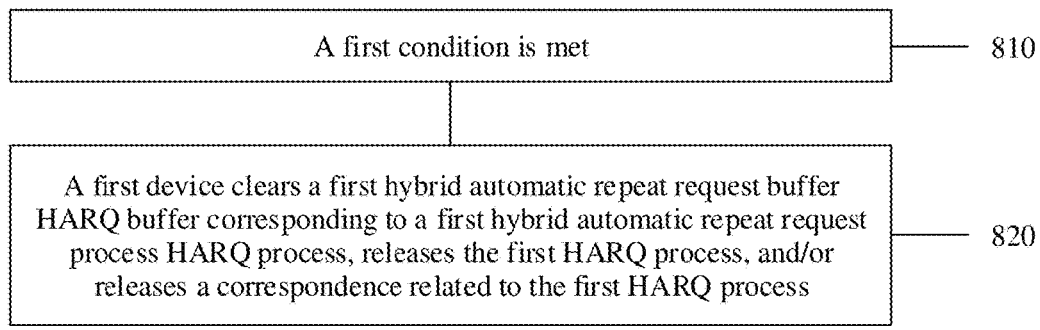

FIG. 8

First step: a first device receives data 1 (newly transmitted), transmission identifier 1, HARQ process ID 1; HARQ process 1, reception succeeds or transmission ends;
Second step: the first device receives data 2 (newly transmitted), transmission identifier 2, HARQ process ID 2; HARQ process 1, reception fails or transmission does not end; and
Third step: the first device receives data 3 (newly transmitted), transmission identifier 1, HARQ process ID 1.

FIG. 9

First step: a first device receives data 1 (newly transmitted), transmission identifier 1, HARQ process ID 1; HARQ process 1, reception succeeds or transmission ends;
Second step: the first device receives data 2 (newly transmitted), transmission identifier 2, HARQ process ID 2; HARQ process 1, reception succeeds or transmission ends; and
Third step: the first device receives data 3 (newly transmitted), transmission identifier 1, HARQ process ID 1.

FIG. 10

First step: a first device receives data 1 (newly transmitted), transmission identifier 1, HARQ process ID 1; HARQ process 1;
Second step: the first device receives data 2 (newly transmitted), transmission identifier 2, HARQ process ID 2; HARQ process 2; and
Third step: the first device receives data 3 (newly transmitted), transmission identifier 1, HARQ process ID 1.

FIG. 11

First step: a first device receives data 1, transmission identifier 1, HARQ process ID 1, NDI=1;
Second step: the first device receives data 2, transmission identifier 2, HARQ process ID 1, NDI=0; and
Third step: the first device receives data 3, transmission identifier 1, HARQ process ID 1, NDI=1; ———> compared with the NDI in the first step, this NDI is not toggled.

The first device determines that the data 3 in the third step is retransmitted data.

FIG. 12

First step: a first device receives data 1, transmission identifier 1, HARQ process ID 1, NDI=1;
Second step: the first device receives data 2, transmission identifier 2, HARQ process ID 1, NDI=0; and
Third step: the first device receives data 3, transmission identifier 1, the HARQ process ID 1, NDI=0; ———> compared with the NDI in the first step, this NDI has been toggled.

The first device determines that the data 3 in the third step is newly transmitted data.

FIG. 13

First step: a first device receives data 1, transmission identifier 1, NDI=1;
Second step: the first device receives data 2, transmission identifier 2, NDI=0; and
Third step: the first device receives data 3, transmission identifier 1, NDI=1; ------> compared with the NDI in the first step, this NDI is not toggled.

The first device determines that the data 3 in the third step is retransmitted data.

FIG. 14

First step: a first device receives data 1, transmission identifier 1, NDI=1;
Second step: the first device receives data 2, transmission identifier 2, NDI=0; and
Third step: the first device receives data 3, transmission identifier 1, NDI=0;
------> compared with the NDI in the first step, this NDI has been toggled.

The first device determines that the data 3 in the third step is newly transmitted data.

FIG. 15

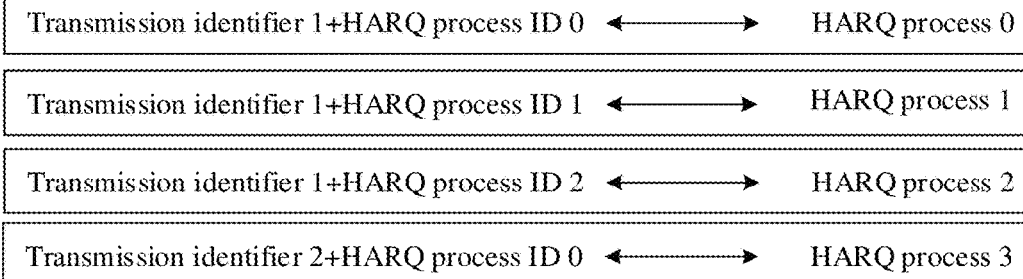

FIG. 16

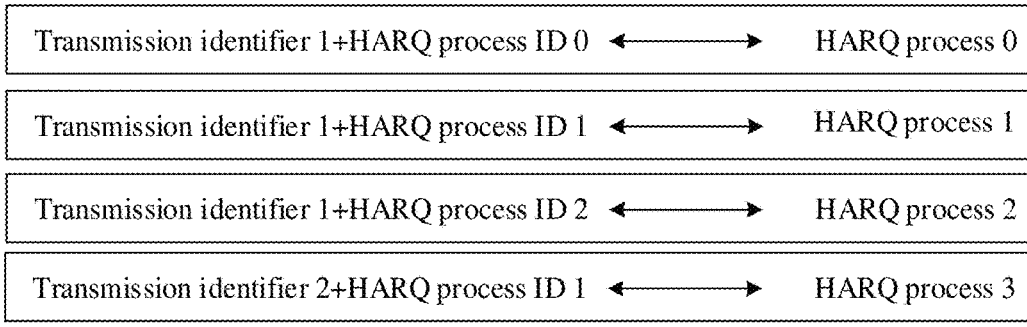

FIG. 17

COMMUNICATION METHOD AND APPARATUS

CROSS-REFERENCE TO RELATED APPLICATIONS

This application is a continuation of International Application No. PCT/CN2021/090163, filed on Apr. 27, 2021, which claims priority to Chinese Patent Application No. 202010366253.6, filed on Apr. 30, 2020 and Chinese Patent Application No. 202011501252.4, filed on Dec. 17, 2020. The disclosures of the aforementioned applications are hereby incorporated by reference in their entireties.

TECHNICAL FIELD

This application relates to the communication field, and more specifically, to a communication method and apparatus.

BACKGROUND

A multimedia broadcast multicast service (Multimedia Broadcast Multicast Service, MBMS) or a groupcast broadcast service (Multicast and Broadcast Services, or Multicast/Broadcast Services, or Multicast-Broadcast Services, MBS) may effectively use mobile communication network resources, and provides a point-to-multipoint service in which one data source sends data to a plurality of users in a mobile communication network, thereby implementing network resource sharing and improving resource utilization, especially air interface resources.

Generally, in an MBMS or MBS scenario, information may be directly broadcast to all users, or may be sent to a group of charged subscribers for viewing. This may help operators develop a plurality of commercial applications such as multimedia advertisements, free and paid TV channels, and multimedia message group sending.

Currently, in the MBMS or MBS, a broadcast/groupcast does not support HARQ feedback, that is, after receiving data, the users do not need to and do not notify a network device of whether the feedback is successfully received. A transmit device cannot learn of a receiving status of the data, and therefore cannot determine whether retransmission needs to be performed. As a result, data transmission reliability cannot be ensured. After the HARQ feedback is introduced into the broadcast/groupcast, a possible behavior of a receive device and technical problems in the possible behavior of the receive device need to be studied and resolved urgently.

SUMMARY

This application provides a communication method and apparatus, to improve data transmission performance.

According to a first aspect, a communication method is provided. The method includes: If a first condition is met, the first device clears a first hybrid automatic repeat request buffer HARQ buffer corresponding to a first hybrid automatic repeat request process HARQ process, and/or releases the first HARQ process, and/or releases a correspondence related to the first HARQ process.

Based on the foregoing technical solution, when the first device determines that the first device does not need to continue to process first data by using the first HARQ process, the first device clears a HARQ buffer corresponding to the first HARQ process in time, so that a quantity of HARQ processes used by the first device to process other data can be increased, thereby improving data transmission efficiency and performance.

In a possible implementation, the first condition includes: The first device receives second data; and the first device determines that the second data is newly transmitted data, where a second transmission identifier and a second hybrid automatic repeat request process identifier HARQ process ID that are corresponding to the second data are the same as a first transmission identifier and a first HARQ process ID that are corresponding to the first data, or a second transmission identifier corresponding to the second data is the same as a first transmission identifier corresponding to the first data.

In a possible implementation, the first condition includes: The first device receives first information, where the first indication indicates that transmission stops, and the first information is associated with the first data.

In a possible implementation, that the first information indicates that transmission stops includes: The first information indicates that transmission corresponding to the first transmission identifier stops, and the first transmission identifier is associated with the first data; the first information indicates that transmission corresponding to the first hybrid automatic repeat request process identifier HARQ process ID stops, and the first HARQ process ID is associated with the first data; the first information indicates that transmission corresponding to the first transmission identifier and the first HARQ process ID stops; or the first information indicates that transmission corresponding to a groupcast or a unicast stops, and the groupcast or the unicast is associated with the first data.

In a possible implementation, the first condition includes: The first device receives third data sent in a unicast mode, where the third data is associated with the first data, and the first data is sent in a groupcast mode.

In a possible implementation, the first condition includes: The first device processes fourth data by using a first hybrid automatic repeat request entity HARQ entity, where a fourth transmission identifier corresponding to the fourth data is different from the first transmission identifier corresponding to the first data.

In a possible implementation, that the first device determines to process fourth data by using a first hybrid automatic repeat request entity HARQ entity includes: The first device allocates associated HARQ information and the fourth transmission identifier to the first HARQ entity; the first device allocates associated HARQ information to the first HARQ entity; or the first device indicates a fourth resource or existence of a fourth resource to the first HARQ entity, where the associated HARQ information includes at least one of the following: a fourth HARQ process ID, a fourth new data indicator NDI, a fourth redundancy version RV, and a fourth transport block size TBS.

In a possible implementation, the first condition includes: The first device releases a multicast radio bearer, where the multicast radio bearer is associated with the first HARQ process; the first device receives a unicast indication, where the unicast indication is associated with the first HARQ process; the first device receives first data sent in a unicast mode, where the first data is associated with the first HARQ process; the first device receives a groupcast indication, where the groupcast indication is associated with the first HARQ process; the first device receives first data sent in a groupcast mode, where the first data is associated with the first HARQ process; the first device receives third information, where the third information indicates to release the first HARQ process; or the first device resets media access radio control MAC for a first transmission identifier, where the first transmission identifier is associated with the first HARQ process.

In a possible implementation, if the first condition is met, that the first device clears a first hybrid automatic repeat request buffer HARQ buffer corresponding to a first hybrid automatic repeat request process HARQ process includes: If the first device determines the first condition is met and a second condition is met, the first device clears the first HARQ buffer, releases the first HARQ process, and/or releases the correspondence related to the first HARQ process, where the second condition includes any one or more of the following: the first HARQ buffer is not empty; the first HARQ process is associated with the first data; the first HARQ process is associated with the first transmission identifier and the first HARQ process ID; the first HARQ process is associated with first downlink control information DCI corresponding to the first data; the first HARQ process is associated with the first HARQ entity; transmission corresponding to the first HARQ process succeeds or ends; the first device receives the newly transmitted data; or a quantity of unoccupied HARQ processes is less than or equal to a first threshold.

In a possible implementation, that the first device determines that the second data is the newly transmitted data includes: The first device determines, based on the second transmission identifier, the second HARQ process ID, and a second new data indicator NDI corresponding to the second data, that the second data is the newly transmitted data. According to this solution, whether the data is the newly transmitted data is determined, so that a determining error can be avoided.

In a possible implementation, after the first device determines that the second data is the newly transmitted data, the method further includes: The first device determines a second HARQ process, where the second HARQ process is used to process the second data; and the first device associates the second transmission identifier and the second HARQ process ID with the second HARQ process; the first device associates the second transmission identifier with the second HARQ process; the first device associates the second HARQ process ID with the second HARQ process; or the first device associates second downlink control information DCI corresponding to the second data with the second HARQ process. According to this solution, the first device can distinguish between differently groupcast data associated with a same HARQ process ID.

According to a second aspect, a communication method is provided. The communication method includes: A first device determines, based on a second transmission identifier and/or a second HARQ process ID that are/is corresponding to second data, that the second data is newly transmitted data or retransmitted data.

In a possible implementation, the first device determines, based on the second transmission identifier, the second HARQ process ID, and a second NDI that are corresponding to the second data, that the second data is the newly transmitted data or the retransmitted data; or the first device determines, based on the second transmission identifier and a second NDI that are corresponding to the second data, that the second data is the newly transmitted data or the retransmitted data.

In a possible implementation, that the first device determines, based on the second transmission identifier, the second HARQ process ID, and a second NDI that are corresponding to the second data, that the second data is the newly transmitted data or the retransmitted data includes: The first device determines, based on the second NDI and a first NDI corresponding to the second transmission identifier and the second HARQ process ID, that the second data is the newly transmitted data or the retransmitted data.

In a possible implementation, that the first device determines, based on the second transmission identifier and a second NDI that are corresponding to the second data, that the second data is the newly transmitted data or the retransmitted data includes: The first device determines, based on the second NDI and a first NDI corresponding to the second transmission identifier, that the second data is the newly transmitted data or the retransmitted data.

In a possible implementation, that the first device determines, based on the second NDI and a first NDI corresponding to the second transmission identifier and the second HARQ process ID, that the second data is the newly transmitted data or the retransmitted data includes: If the second NDI has been toggled compared with the first NDI, the first device determines that the second data is the newly transmitted data; or if the second NDI is not toggled compared with the first NDI, the first device determines that the second data is the retransmitted data.

In a possible implementation, that the first device determines, based on the second NDI and a first NDI corresponding to the second transmission identifier, that the second data is the newly transmitted data or the retransmitted data includes: If the second NDI has been toggled compared with the first NDI, the first device determines that the second data is the newly transmitted data; or if the second NDI is not toggled compared with the first NDI, the first device determines that the second data is the retransmitted data.

In a possible implementation, that a first device determines, based on a second transmission identifier and/or a second HARQ process ID that are/is corresponding to second data, that the second data is newly transmitted data or retransmitted data includes: If the first device receives the second data corresponding to the second transmission identifier and/or the second HARQ process ID for the first time, the first device determines that the second data is the newly transmitted data.

According to a third aspect, a communication method is provided. The communication method includes: A first device receives second data, and determines a second hybrid automatic repeat request process HARQ process.

In a possible implementation, that a first device determines a second HARQ process includes any one or more of the following: The first device associates a second transmission identifier and a second HARQ process ID with the second HARQ process; the first device associates a second transmission identifier with the second HARQ process; the first device associates a second HARQ process ID with the second HARQ process; the first device associates second DCI or a PDCCH with the second HARQ process; the first device associates a second resource with the second HARQ process; the first device associates second transmission with the second HARQ process; or the first device associates the second data with the second HARQ process.

In a possible implementation, that a first device determines a second HARQ process includes any one or more of the following: The first device allocates or delivers the second data, associated HARQ information, and a second transmission identifier to the second HARQ process; the first device allocates or delivers the second data and associated HARQ information to the second HARQ process; the first device allocates or delivers the second data and a second transmission identifier to the second HARQ process; or the first device allocates or delivers the second data to the second HARQ process.

In a possible implementation, the first device stores a first correspondence, where the first correspondence may be any one or more of the following: a correspondence between the second data and the second HARQ process; a correspondence between a second transmission identifier and a second HARQ process ID and the second HARQ process; a correspondence between a second transmission identifier and the second HARQ process; a correspondence between a second HARQ process ID and the second HARQ process; a correspondence between second downlink control information DCI or a PDCCH and the second HARQ process; a correspondence between a second resource and the second HARQ process; a correspondence between second transmission and the second HARQ process; a correspondence between any one or more of the second data, a second transmission identifier, a second HARQ process ID, second DCI or a PDCCH, a second resource, or second transmission and the second HARQ process.

In a possible implementation, that a first device determines a second HARQ process includes: The first device determines the second HARQ process from HARQ processes that are not occupied by the first device; or the first device determines any HARQ process as the second HARQ process.

In a possible implementation, if a third condition is met, the first device may perform any one or more of the following operations: deleting the first correspondence, releasing an association associated with the second HARQ process, releasing the second HARQ process, discarding the second data, clearing a HARQ buffer corresponding to the second HARQ process, considering the second HARQ process as unoccupied, or considering the second HARQ process as available for receiving other data. The third condition includes any one or more of the following conditions: the second data is successfully decoded; the first device feeds back an ACK corresponding to the second data to a second device; the first device does not feed back a NACK corresponding to the second data to a second device; transmission of the second data reaches a maximum quantity of times of transmission or a maximum quantity of times of retransmission; transmission time of the second data reaches maximum transmission time; the first device releases the second HARQ process; the first device clears a second HARQ buffer corresponding to the second HARQ process; the first device receives second information, where the second information indicates that transmission stops, and the second information is associated with the second data; or the first device receives newly transmitted data corresponding to a second transmission identifier and a second HARQ process ID.

In a possible implementation, the second data is the newly transmitted data.

According to a fourth aspect, a communication method is provided. The communication method includes: A first device receives fourth data, and determines a first HARQ entity.

In a possible implementation, that a first device determines a first HARQ entity includes any one or more of the following: The first device associates a fourth transmission identifier and a fourth HARQ process ID with the first HARQ entity; the first device associates a fourth transmission identifier with the first HARQ entity; the first device associates a fourth HARQ process ID with the first HARQ entity; the first device associates fourth DCI or a PDCCH with the first HARQ entity; the first device associates a fourth resource with the first HARQ entity; the first device associates fourth transmission with the first HARQ entity; the first device associates any one or more of the fourth data, a fourth transmission identifier, a fourth HARQ process ID, fourth DCI or a PDCCH, a fourth resource, and fourth transmission with the first HARQ entity; or the first device associates the fourth data with the first HARQ entity.

In a possible implementation, that a first device determines a first HARQ entity includes any one or more of the following: The first device allocates or delivers the fourth data, associated HARQ information, and a fourth transmission identifier to the first HARQ entity; the first device allocates or delivers the fourth data and associated HARQ information to the first HARQ entity; the first device allocates or delivers the fourth data and a fourth transmission identifier to the first HARQ entity; the first device allocates or delivers the fourth data to the first HARQ entity; the first device allocates or delivers associated HARQ information and a fourth transmission identifier to the first HARQ entity; the first device allocates or delivers associated HARQ information to the first HARQ entity; the first device allocates or delivers a fourth transmission identifier to the first HARQ entity; the first device allocates or delivers a fourth resource to the first HARQ entity; or the first device indicates a fourth resource or existence of a fourth resource to the first HARQ entity.

In a possible implementation, the first device may store a second correspondence, where the second correspondence may be any one or more of the following: a correspondence between the fourth data and the first HARQ entity; a correspondence between a fourth transmission identifier and a fourth HARQ process ID and the first HARQ entity; a correspondence between a fourth transmission identifier and the first HARQ entity; a correspondence between a fourth HARQ process ID and the first HARQ entity; a correspondence between fourth downlink control information DCI or a PDCCH and the first HARQ entity; a correspondence between a fourth resource and the first HARQ entity; a correspondence between fourth transmission and the first HARQ entity; or a correspondence between any one or more of the fourth data, a fourth transmission identifier, a fourth HARQ process ID, fourth DCI or a PDCCH, a fourth resource, or fourth transmission and the first HARQ entity.

In a possible implementation, that a first device determines a first HARQ entity includes: The first device determines the first HARQ entity from HARQ entities that are not occupied by the first device; or the first device determines any HARQ entity as the first HARQ entity.

In a possible implementation, if a fourth condition is met, the first device may perform any one or more of the following operations: deleting the second correspondence, releasing an association associated with the first HARQ entity, releasing a HARQ process corresponding to the first HARQ entity, discarding the fourth data, discarding data corresponding to a HARQ process corresponding to the first HARQ entity, clearing a HARQ buffer corresponding to a HARQ process corresponding to the first HARQ entity, considering the first HARQ entity and/or a HARQ process corresponding to the first HARQ entity as unoccupied, or considering the first HARQ entity and/or a HARQ process corresponding to the first HARQ entity as available for receiving other data. The fourth condition includes any one or more of the following conditions: The first device releases the first HARQ entity; the first device clears the HARQ buffer corresponding to the HARQ process corresponding to the first HARQ entity; the first device receives fourth information, where the fourth information indicates that transmission stops, and the fourth information is associated with any one or more of the first HARQ entity, the fourth data, the fourth transmission identifier, the fourth HARQ process ID, the fourth DCI or the PDCCH, the fourth resource, and the fourth transmission; or the first device determines to process fifth data by using the first HARQ entity.

In a possible implementation, the fourth data is the newly transmitted data.

According to a fifth aspect, a communication method is provided. The communication method includes: A first device obtains a second resource; and determines a second NDI.

In a possible implementation, that a first device determines a second NDI includes: The first device determines that the second NDI has been toggled; and/or the first device determines that the second NDI is not toggled.

In a possible implementation, that the first device determines that the second NDI is toggled and/or that the first device determines that the second NDI is not toggled may include any one or more of the following cases: the second resource is a resource scheduled by using DCI/PDCCH scrambled by a first RNTI, and a second HARQ process ID is previously associated with a configured resource or a retransmission resource of the configured resource; the second resource is a resource scheduled by using DCI/PDCCH scrambled by a first RNTI, and a second HARQ process ID and a second transmission identifier are previously associated with a configured resource or a retransmission resource of the configured resource; the second resource is a resource scheduled by using DCI/PDCCH scrambled by a first RNTI, and a second transmission identifier is previously associated with a configured resource or a retransmission resource of the configured resource; the first device obtains a second resource corresponding to a second transmission identifier and/or a second HARQ process ID for the first time; the second resource is a configured resource; or the second resource is not preempted by another resource, where the first RNTI may be used to schedule a dynamic resource, used to schedule a retransmission resource of the dynamic resource, used to schedule initial transmission of the dynamic resource, and used to schedule any one or more of the retransmission resource of the dynamic resource, and the another resource may be a dynamic resource.

According to a sixth aspect, a communication apparatus is provided. The communication apparatus includes a processing unit, configured to determine that a first condition is met, and the processing unit is further configured to: clear a first hybrid automatic repeat request buffer HARQ buffer corresponding to a first hybrid automatic repeat request process HARQ process, release the first HARQ process, and/or release a correspondence related to the first HARQ process.

In a possible implementation, the apparatus further includes a transceiver unit. The first condition includes: the transceiver unit is configured to receive second data; and the processing unit is further configured to determine that the second data is newly transmitted data, where a second transmission identifier and a second hybrid automatic repeat request process identifier HARQ process ID that are corresponding to the second data are the same as a first transmission identifier and a first HARQ process ID that are corresponding to first data, or a second transmission identifier corresponding to the second data is the same as a first transmission identifier corresponding to first data.

In a possible implementation, the apparatus further includes a transceiver unit, and the first condition includes: the transceiver unit is configured to receive first information, where the first information indicates that transmission stops, and the first information is associated with the first data.

In a possible implementation, that the first information indicates that transmission stops includes: The first information indicates that transmission corresponding to the first transmission identifier stops, and the first transmission identifier is associated with the first data; the first information indicates that transmission corresponding to the first hybrid automatic repeat request process identifier HARQ process ID stops, and the first HARQ process ID is associated with the first data; the first information indicates that transmission corresponding to the first transmission identifier and the first HARQ process ID stops; or the first information indicates that transmission corresponding to a groupcast or a unicast stops, and the groupcast or the unicast is associated with the first data.

In a possible implementation, the apparatus further includes a transceiver unit. The first condition includes: the transceiver unit is configured to receive third data sent in a unicast mode, where the third data is associated with the first data, and the first data is sent in a groupcast mode.

In a possible implementation, the first condition includes: the processing unit is further configured to process fourth data by using a first hybrid automatic repeat request entity HARQ entity, where a fourth transmission identifier corresponding to the fourth data is different from the first transmission identifier corresponding to the first data.

In a possible implementation, the processing unit is specifically configured to: allocate associated HARQ information and the fourth transmission identifier to the first HARQ entity; allocate associated HARQ information to the first HARQ entity; or indicate a fourth resource or existence of a fourth resource to the first HARQ entity, where the associated HARQ information includes at least one of the following: a fourth HARQ process ID, a fourth new data indicator NDI, a fourth redundancy version RV, and a fourth transport block size TBS.

In a possible implementation, the apparatus further includes a transceiver unit. The first condition includes: the processing unit is further configured to release a multicast radio bearer, where the multicast radio bearer is associated with the first HARQ process; the transceiver unit is configured to receive a unicast indication, where the unicast indication is associated with the first HARQ process; the transceiver unit is further configured to receive first data sent in a groupcast mode, where the first data is associated with the first HARQ process; the transceiver unit is configured to receive a groupcast indication, where the groupcast indication is associated with the first HARQ process; the transceiver unit is further configured to receive first data sent in a groupcast mode, where the first data is associated with the first HARQ process; the transceiver unit is further configured to receive third information, where the third information indicates to release the first HARQ process; or the processing unit is further configured to reset media access radio control MAC for a first transmission identifier, where the first transmission identifier is associated with the first HARQ process.

In a possible implementation, the processing unit is specifically configured to: if the first condition is met and a second condition is met, clear the first HARQ buffer, release the first HARQ process, and/or release the correspondence related to the first HARQ process, where the second condition includes any one or more of the following: the first HARQ buffer is not empty; the first HARQ process is associated with the first data; the first HARQ process is associated with the first transmission identifier and the first HARQ process ID; the first HARQ process is associated with the first transmission identifier; the first HARQ process is associated with first downlink control information DCI corresponding to the first data; the first HARQ process is associated with the first HARQ entity; transmission corresponding to the first HARQ process succeeds or ends; the first device receives the newly transmitted data; or a quantity of unoccupied HARQ processes is less than or equal to a first threshold.

In a possible implementation, the processing unit is specifically configured to determine, based on the second transmission identifier and the second HARQ process ID, that the second data is the newly transmitted data.

In a possible implementation, the processing unit is further configured to: determine a second HARQ process, where the second HARQ process is used to process the second data. That the first device determines the second HARQ process includes any one or more of the following: associating the second transmission identifier and the second HARQ process ID with the second HARQ process; associating the second transmission identifier with the second HARQ process; associating the second HARQ process ID with the second HARQ process; or associating second downlink control information DCI corresponding to the second data with the second HARQ process.

According to a seventh aspect, a communication system is provided. The communication system includes the communication apparatus in any one of the second aspect or the possible implementations of the second aspect.

According to an eighth aspect, a device is provided. The device includes: a memory, configured to store executable instructions; and a processor, configured to invoke and run the executable instructions in the memory, to perform the method in any one of the first aspect or the possible implementations of the first aspect.

According to a ninth aspect, a computer-readable storage medium is provided. The computer-readable medium stores a computer program; and when the computer program is run on a computer, the computer is enabled to perform the method in any one of the first aspect or the possible implementations of the first aspect.

BRIEF DESCRIPTION OF DRAWINGS

FIG. 2 is a schematic diagram of downlink configured resource allocation according to this application;

FIG. 4 is a schematic diagram of an association relationship between a resource and a HARQ process ID according to this application;

FIG. 5 is a schematic diagram in which a first device determines, based on whether an NDI of a same HARQ process ID is toggled, whether data is newly transmitted or retransmitted;

FIG. 6 is a schematic diagram of a possible data transmission scenario according to this application;

FIG. 7 is a schematic diagram in which there is a fixed correspondence between a HARQ process and a HARQ process ID;

FIG. 8 is a schematic flowchart of a communication method according to an embodiment of this application;

FIG. 9 to FIG. 23 are schematic diagrams of examples corresponding to a communication method according to an embodiment of this application;

DESCRIPTION OF EMBODIMENTS

The following describes technical solutions of this application with reference to accompanying drawings.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used for representing giving an example, an illustration, or a description. Any embodiment or design scheme described as "an example" or "for example" in this application should not be explained as being more preferred or having more advantages than another embodiment or design scheme. Exactly, use of the word "an example" or "for example" or the like is intended to present a relative concept in a specific manner.

The method provided in embodiments of this application may be applied to but is not limited to the following fields: multimedia broadcast multicast services (Multimedia Broadcast Multicast Service, MBMS), single-cell point-to-multipoint (Single-cell point-to-multipoint, SC-PTM), groupcast broadcast services (Multicast and Broadcast Services, Multicast/Broadcast Services, or Multicast-Broadcast Services, MBS), a multimedia broadcast multicast service single frequency network (Multimedia Broadcast multicast service Single Frequency Network, MBSFN), dual-channel intelligent unicast (Dual-channel intelligent unicast, DC-IU), broadcast (Broadcast), multicast (Multicast), broadcast multicast (Multicast Broadcast), groupcast (Groupcast), vehicle to everything (vehicle to everything, V2X), public safety (public safety), mission critical (mission critical), transparent IPv4/IPv6 multicast delivery (transparent IPv4/IPv6 multicast delivery), IPTV, software delivery over wireless (software delivery over wireless), group communications (group communications), internet of things (Internet of things, IoT), television video (TV Video), television (TV), linear television (linear TV), live broadcast (Live), and radio services (radio services).

Figure 1:
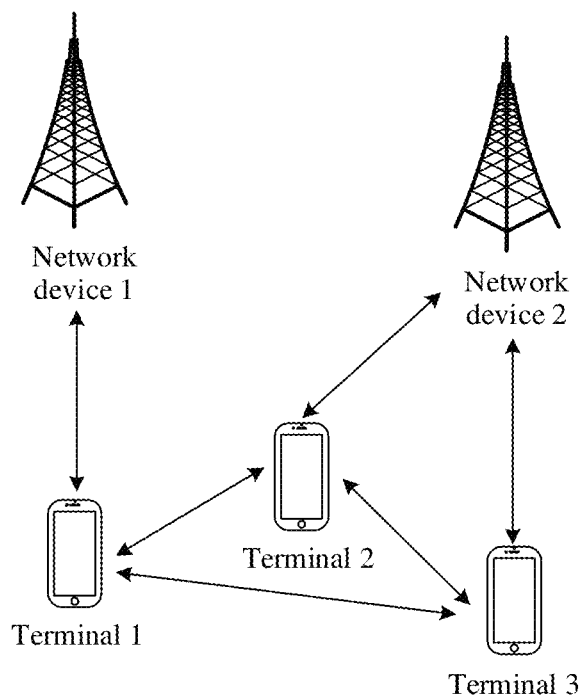
FIG. 1 is a schematic diagram of a possible communication scenario according to this application.

Network elements in this application include a network device and a terminal in a communication system. Refer to FIG. 1. A method provided in embodiments of this application mainly relates to communication between terminals and communication between a terminal and a network device.

The communication system in embodiments of this application includes but is not limited to a long term evolution (long term evolution, LTE) system, a 5th generation (5th generation, 5G) system, a new radio (new radio, NR) system, a wireless local area network (wireless local area network, WLAN) system and a future evolved system, or a plurality of converged communication systems. The 5G system may be a non-standalone (non-standalone, NSA) 5G system or a standalone (standalone, SA) 5G system.

A network device in embodiments of this application is a network-side entity configured to send a signal, receive a signal, or send a signal and receive a signal. The network device may be an apparatus that is deployed on a radio access network (radio access network, RAN) and that provides a wireless communication function for a terminal, for example, may be a transmission reception point (transmission reception point, TRP), a base station, or control nodes in various forms (for example, a network controller and a radio controller (for example, a radio controller in a cloud radio access network (cloud radio access network, CRAN) scenario)). Specifically, the network device may be a macro base station, a micro base station (also referred to as a small cell), a relay station, an access point (access point, AP), or the like in various forms, or may be an antenna panel of a base station. The control node may be connected to a plurality of base stations, and configure resources (the resources in embodiments of this application may also be referred to as grants) for a plurality of terminals covered by the plurality of base stations. In systems using different radio access technologies, names of devices having functions of a base station may vary. For example, the device may be referred to as an evolved NodeB (evolved NodeB, eNB or eNodeB) in the LTE system, or may be referred to as a next generation node base station (next generation node base station, gNB) in the 5G system or the NR system. A specific name of the base station is not limited in this application. The network device may alternatively be a network device in a future evolved public land mobile network (public land mobile network, PLMN) or the like.

The terminal in embodiments of this application is a user-side entity configured to receive a signal, send a signal, or receive a signal and send a signal. The terminal is configured to provide a user with one or more of a voice service and a data connectivity service. The terminal may also be referred to as user equipment (user equipment, UE), a terminal device, an access terminal, a subscriber unit, a subscriber station, a mobile station, a remote station, a remote terminal, a mobile device, a user terminal, a wireless communication device, a user agent, or a user apparatus. The terminal may be a V2X device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (hybrid electric vehicle, HEV), a range extended electric vehicle (range extended EV, REEV), a plug-in hybrid electric vehicle (plug-in HEV, PHEV), a new energy vehicle (new energy vehicle), or a road side unit (road site unit, RSU). Alternatively, the terminal may be a D2D device, for example, an electricity meter or a water meter. Alternatively, the terminal may be a mobile station (mobile station, MS), a subscriber unit (subscriber unit), an uncrewed aerial vehicle, an internet of things (internet of things, IoT) device, a station (station, ST) in a WLAN, a cellular phone (cellular phone), a smartphone (smart phone), a cordless telephone set, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

To help a reader understand the solutions in embodiments of this application, the following describes some technical terms used in this application.

1. A Downlink is a Downlink Communication Link Between a Terminal Device and a Network Device.

2. A Downlink Resource Includes a Downlink Configuration Allocation Resource and/or a Downlink Dynamic Allocation Resource.

(2.1) The downlink configuration allocation resource includes a downlink first-type configuration allocation resource and/or a downlink second-type configuration allocation resource. Each time the terminal device receives data, the network device does not always need to separately allocate a resource. After the network device allocates a resource to the terminal device at a specific time, the terminal device may use the allocated resource in a subsequent period of time. A characteristic of the allocated resource is "allocated once and used for a plurality of times".

For example, refer to FIG. 2, a periodicity of the resource that periodically appears is one slot. If a resource that appears each time is one allocation, it may be understood that FIG. 2 shows four allocations, and one allocation may correspond to one allocation ID. In this case, allocation right IDs corresponding to four sidelink grants are respectively an allocation 1, an allocation 2, an allocation 3, and an allocation 4.

(2.2) The downlink first-type configuration allocation resource is a downlink resource directly configured by the network device for the terminal device by using RRC signaling, and the terminal device may directly use the downlink resource to receive data without additional activation (for example, activation by using a PDCCH or DCI). For example, the resource is similar to a configured grant type-1 (configured grant type-1) and grant free (grant free) on an uplink.

(2.3) The downlink second-type configuration allocation resource is a downlink resource whose periodicity may be defined by the network device by using RRC signaling, and then the downlink resource may be activated by using a PDCCH or DCI; and the terminal device cannot directly use the resource to receive data, and can use the resource only after the resource is activated. The resource may be, for example, downlink semi-persistent allocation resource and semi-persistent scheduling (Semi-Persistent Scheduling, SPS). For example, the resource is similar to a configured grant type-2 (configured grant type-2) on the uplink.

(2.4) The downlink dynamic allocation resource is a downlink resource dynamically allocated by the network device to the terminal device by using downlink control information (downlink control information, DCI) or a PDCCH, where the DCI may be carried on a physical downlink control channel. Each time the terminal device receives data, the network device needs to separately allocate a resource, and a characteristic is "allocated once and used once".

(2.5) A downlink configuration allocation resource set includes configuration allocation resources corresponding to one or more configuration allocation resources (indexes), for example, a resource set including a configuration allocation 1, a configuration allocation 2, and a configuration allocation 3.

It should be noted that different configuration allocation resource sets are different types of resources. For example, a configuration allocation resource set 1 is resources of one type, and a configuration allocation resource set 2 is resources of another type.

3. A HARQ is a Technology that Combines Forward Error Correction (Forward Error Correction, FEC) (or Forward Error Correction Code) with an Automatic Repeat Request (Automatic Repeat Request, ARQ) Method.

The following specifically describes HARQ-related content by using three parts: (a) to (d).

(a) HARQ Process (HARQ Process)

A stop-and-wait protocol (stop-and-wait protocol) may be used in a HARQ to send data. In the stop-and-wait protocol, after sending a transport block (transport block, TB), the transmit end stops and waits for acknowledgment information. A receive end may feed back an ACK or a NACK of the TB. However, the transmit end stops and waits for an acknowledgement after each transmission, and throughput is low. Therefore, a plurality of parallel HARQ processes may be used. When one HARQ process waits for acknowledgment, the transmit end may continue to send data by using another HARQ process.

Figure 3:
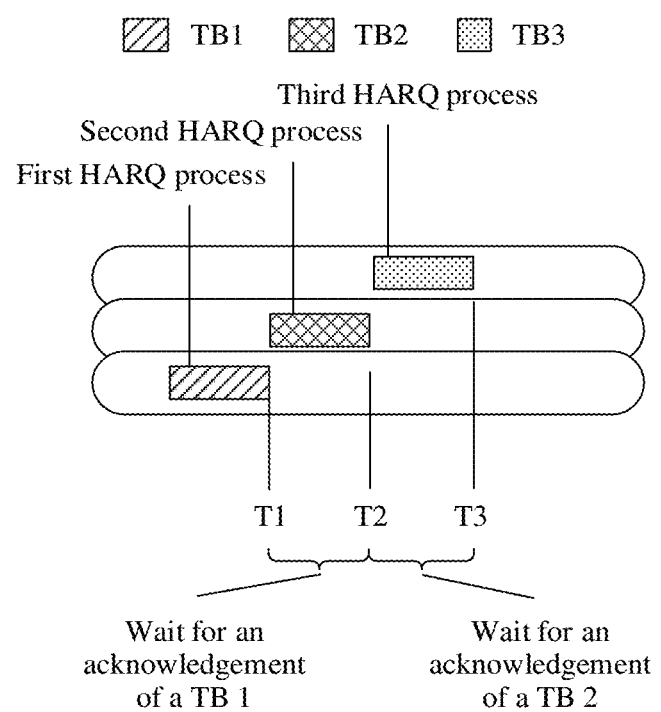
FIG. 3 is a schematic diagram of parallel HARQ processes according to this application.

For example, refer to FIG. 3. A terminal sends a TB 1 by using a first HARQ process, completes sending of the TB 1 at a moment T1, receives a HARQ feedback of the TB 1 at a moment T2, and waits for an acknowledgement of the TB 1 within a period of time from T1 to T2. Within the period of time for waiting for the acknowledgement, the terminal may send a TB 2 by using a second HARQ process, complete sending of the TB 2 at the moment T2, receive a HARQ feedback of the TB 2 at a moment T3, and wait for an acknowledgement of the TB 2 within a period of time from T2 to T3. Within the time of period for waiting for the acknowledgement, the terminal may send a TB 3 by using a third HARQ process.

It should be noted that each HARQ process can process one TB or more TBs (for example, in a case of spatial multiplexing) in one transmission time interval (transmission time interval, TTI).

One allocation/grant is generally associated with one HARQ process. Particularly, a plurality of allocations/grants included in one bundle are associated with a same HARQ process. To be specific, transmission (for example, downlink transmission or uplink transmission) on the plurality of allocations/grants included in one bundle corresponds to the same HARQ process.

For example, transmission in one bundle may be understood as that one TB needs to be retransmitted for one or more times after one new transmission. For the receive end, data received by a same HARQ process for a plurality of times may be placed in a same buffer (for example, a HARQ buffer (buffer) or a soft buffer (soft buffer)), to perform soft combination and decoding.

The HARQ process may be identified by using a HARQ process ID. However, it is not limited that one HARQ process corresponds to one fixed HARQ process ID, and it is not limited that one HARQ process is identified by using only one HARQ process ID.

Descriptions about the HARQ process of the terminal device in embodiments of this application are all specific for one carrier. When there are a plurality of carriers, descriptions in this application document are applicable to each carrier.

(b) HARQ Process ID Determining Mechanism

The terminal device may calculate a HARQ process ID associated with a resource in the following first manner and/or second manner.

Manner 1: The terminal device determines, based on a preset algorithm 1, a calculation manner 1 indicated by the network device, or a calculation manner 1 specified in the protocol, the HARQ process ID associated with the resource.

The "preset algorithm 1" or the "calculation manner 1" may be understood as a formula.

For example, a formula similar to the "preset algorithm 1" or the "calculation manner 1" may be used to calculate the HARQ process ID associated with the resource.

The "preset algorithm 1" may be understood as a formula specified in the protocol (for details, refer to 3GPP TS 38.321): section 5.3.1 in "NR; Medium Access Control (MAC); Protocol specification".

For example, when a subcarrier spacing (subcarrier spacing, SCS) is 15 kHz, for a DL SPS resource, a start system frame number (system frame number, SFN) is 5, a start slot is a slot 1, a start symbol is a symbol 4, a downlink allocation occupies six symbols, a periodicity is one slot, and a quantity of HARQ processes available for the SPS resource is 16. In this case, a HARQ process ID associated with each downlink allocation may be obtained through calculation according to the preset algorithm. For details, refer to FIG. 4.

Manner 2: The network device indicates, to the terminal device, the HARQ process ID associated with the resource.

The HARQ process ID associated with the resource may be indicated by the network device to the terminal device.

For a DG resource, the network device may indicate, to the terminal device by using DCI, a HARQ process ID associated with the resource.

The HARQ process ID associated with the resource may overlap/be the same as a HARQ process ID associated with another resource.

That the resource is associated with the HARQ process ID may be understood as the HARQ process ID associated with the resource.

The HARQ process ID associated with the resource is obtained in any one or more of the following manners:

(1) a first device determines the HARQ process ID for the resource based on a preset algorithm 1, a calculation manner 1 indicated by a second device, or a calculation manner 1 specified in the protocol; or (2) a second device indicates the HARQ process ID associated with the resource for a first device.

(c) Newly Transmitted Data and Retransmitted Data Processing Mechanism at the Receive End Each HARQ process has a corresponding buffer (for example, a HARQ buffer or a soft buffer), to perform soft combination and decoding on received data.

After receiving the newly transmitted data sent by a transmit end, the receive end may place the received newly transmitted data in a buffer (for example, a HARQ buffer or a soft buffer) corresponding to a HARQ process. If when receiving retransmitted data of the newly transmitted data again, the receive end may perform combination and decoding on the received retransmitted data with the newly transmitted data previously stored in the buffer. The foregoing manner may be referred to as soft combination and decoding. Compared with separate decoding (that is, data during each transmission is separately decoded, and is not combined with previous data for decoding), the soft combination and decoding improves a success rate of decoding. Similarly, if the decoding still fails, the foregoing process may be further repeated. Combination and decoding are performed on retransmitted data that is newly received and the data in the buffer.

The retransmitted data and the newly transmitted data at the transmit end may be of a same redundancy version (redundancy version, RV) or different RVs of a same TB.

(d) HARQ Feedback

There are two HARQ feedback manners, which are described in Manner A and Manner B.

Manner A: The HARQ feedback is a NACK only manner. After the transmit end sends data to the receive end, if the receive end correctly receives the data, the receive end does not perform feedback; or if the receive end fails to receive the data, the receive end feeds back a NACK to the transmit end.

In a possible manner, if the receive end fails to receive the data, within a range, the receive end feeds back a NACK to the transmit end; otherwise, the receive end does not perform feedback.

Manner B: The HARQ feedback is an ACK/NACK manner. After the transmit end sends data to the receive end, if the receive end correctly receives the data, the receive end feeds back an ACK to the transmit end; or if the receive end fails to receive the data, the receive end feeds back a NACK to the transmit end.

4. ACK or NACK (4.1) The ACK in embodiments of this application may be a HARQ feedback in the conventional technology, and may be information indicated by using one bit (bit), where a value of the bit is 0 or 1 to represent the ACK; or may be a message, where the message indicates that transmission/reception succeeds, retransmission is requested, or a retransmission resource is requested. The message may be information occupying a plurality of bits, or may exist in or be carried in information in another form.

For example, the ACK may be a positive acknowledgment (acknowledgement or positive acknowledgment).

(4.2) The NACK in embodiments of this application may be a HARQ feedback in the conventional technology, and may be information indicated by using one bit (bit), where a value of the bit is 0 or 1 to represent the NACK; or may be a message, where the message indicates that transmission/reception fails, transmission/reception does not succeed, retransmission is not requested, or a retransmission resource is not requested. The message may be information occupying a plurality of bits, or may exist in or be carried in information in another form.

For example, the NACK may be a negative acknowledgment (negative acknowledgement, NACK).

5. Occupied HARQ Process

In embodiments of this application, the occupied HARQ process includes any one or more of the following cases.

(1) Transmission of data corresponding to the HARQ process fails or does not end.

The case may include a case in which the HARQ feedback is not performed and/or a case in which the HARQ feedback is performed.

For example, the first device receives the data by using the HARQ process, and a quantity of times of blind retransmission or repeated transmission (repetition) is not reached.

That the transmission of data corresponding to the HARQ process fails or does not end may be understood as any one or more of the following.

(1.1) The data corresponding to the HARQ process fails to be decoded.

For example, the first device receives the data by using the HARQ process, and decoding of the data fails.

(1.2) Alternatively, the first device does not send, to the second device, an ACK or a feedback corresponding to the HARQ process.

The feedback may be an ACK or a NACK.

For example, the first device receives the data by using the HARQ process, and the first device does not send an ACK or a feedback to the second device.

For example, because an occasion for feeding back to the second device conflicts with that of other transmission, the first device fails to perform feedback to the second device.

(1.3) Alternatively, the first device feeds back, to the second device, a NACK corresponding to the HARQ process.

For example, the first device receives the data by using the HARQ process, and the first device feeds back a NACK to the second device.

(1.4) Alternatively, transmission associated with the HARQ process does not reach a maximum transmission time or a maximum quantity of times of transmission or a maximum quantity of times of retransmission.

For example, a quantity of times that the first device receives the data associated with the HARQ process does not reach the maximum quantity of times of transmission or the maximum quantity of times of retransmission.

For example, a quantity of times that the first device receives one TB does not reach a maximum quantity of times of transmission.

The maximum transmission time may correspond to a timer or a clock machine.

For example, a timer corresponding to the HARQ process does not expire or is running.

(1.5) Alternatively, the first device does not receive an indication used to indicate the last time of data transmission.

For example, the first device receives the data by using the HARQ process, and the first device does not receive an indication used to indicate the last time of data transmission.

(2) Alternatively, the first device does not release the HARQ process.

(3) Alternatively, the first device does not clear a HARQ buffer corresponding to the HARQ process, or a HARQ buffer corresponding to the HARQ process is not empty.

(4) Alternatively, there exists a correspondence associated with the HARQ process, or there exists an association associated with the HARQ process.

"There exists the correspondence associated with the HARQ process, or there exists an association associated with the HARQ process" may be understood as that the first device has a correspondence associated with the HARQ process, or the first device has an association associated with the HARQ process.

"Exist" may be understood as any one or more of "store", "does not release", and "undelete".

6. Unoccupied HARQ Process

In embodiments of this application, the unoccupied HARQ process includes any one or more of the following cases.

(1) Transmission of data corresponding to the HARQ process succeeds or ends.

The case may include a case in which the HARQ feedback is not performed, and/or a case in which the HARQ feedback is performed.

For example, the first device receives the data by using the HARQ process, and a quantity of times of blind retransmission or repeated transmission (repetition) is reached.

That the transmission of data corresponding to the HARQ process succeeds or ends may be understood as any one or more of the following.

(1.1) The data corresponding to the HARQ process is decoded successfully.

For example, the first device receives the data by using the HARQ process, and decoding of the data succeeds.

(1.2) Alternatively, the first device sends, to the second device, an ACK corresponding to the HARQ process.

For example, the first device receives the data by using the HARQ process, and the first device feeds back an ACK to the second device.

(1.3) Alternatively, the first device does not feed back, to the second device, a NACK corresponding to the HARQ process.

For example, the first device receives the data by using the HARQ process, and the first device does not feed back a NACK to the second device on a corresponding feedback occasion.

(1.4) Alternatively, transmission associated with the HARQ process reaches a maximum transmission time or a maximum quantity of times of transmission or a maximum quantity of times of retransmission.

For example, a quantity of times that the first device receives the data associated with the HARQ process reaches the maximum quantity of times of transmission or the maximum quantity of times of retransmission.

For example, a quantity of times that the first device receives one TB reaches a maximum quantity of times of transmission.

The maximum transmission time may correspond to a timer or a clock machine.

For example, a timer corresponding to the HARQ process times out or expires or is not running.

(1.5) Alternatively, the first device receives an indication used to indicate the last time of data transmission.

For example, the first device receives the data by using the HARQ process, and the first device receives an indication used to indicate the last time of data transmission.

(2) Alternatively, the first device releases the HARQ process.

(3) Alternatively, the first device clears a HARQ buffer corresponding to the HARQ process, or a HARQ buffer corresponding to the HARQ process is empty.

(4) Alternatively, there does not exist a correspondence associated with the HARQ process, or there does not exist an association associated with the HARQ process.

"There does not exist the correspondence associated with the HARQ process, or there does not exist an association associated with the HARQ process" may be understood as that the first device does not have a correspondence associated with the HARQ process, or the first device does not have an association associated with the HARQ process.

"Does not exist" may be understood as any one or more of "does not store", "release", and "delete".

7. Occupied HARQ Entity

In embodiments of this application, the occupied HARQ entity includes any one or more of the following cases.

(1) Transmission of data of a HARQ process corresponding to the HARQ entity fails or does not end.

The case may include a case in which the HARQ feedback is not performed, and/or a case in which the HARQ feedback is performed.

(2) Alternatively, the first device does not release a HARQ process corresponding to the HARQ entity.

(3) Alternatively, the first device does not clear a HARQ buffer corresponding to a HARQ process corresponding to the HARQ entity, or a HARQ buffer corresponding to a HARQ process corresponding to the HARQ entity is not empty.

(4) Alternatively, there exists a correspondence associated with the HARQ entity, or there exists an association associated with the HARQ entity.

"There exists the correspondence associated with the HARQ entity, or there exists an association associated with the HARQ entity" may be understood as that the first device has a correspondence associated with the HARQ entity, or the first device has an association associated with the HARQ entity.

"Exist" may be understood as any one or more of "store", "does not release", and "undelete".

8. Unoccupied HARQ Entity

In embodiments of this application, the unoccupied HARQ entity includes any one or more of the following cases.

(1) Transmission of data corresponding to a HARQ process corresponding to the HARQ entity succeeds or ends.

The case may include a case in which the HARQ feedback is not performed, and/or a case in which the HARQ feedback is performed.

(2) Alternatively, the first device releases a HARQ process corresponding to the HARQ entity.

(3) Alternatively, the first device clears a HARQ buffer corresponding to a HARQ process corresponding to the HARQ entity, or a HARQ buffer corresponding to a HARQ process corresponding to the HARQ entity is empty.

(4) Alternatively, there does not exist a correspondence associated with the HARQ entity, or there does not exist an association associated with the HARQ entity.

"There does not exist the correspondence associated with the HARQ entity, or there does not exist an association associated with the HARQ entity" may be understood as that the first device does not have a correspondence associated with the HARQ entity, or the first device does not have an association associated with the HARQ entity.

"Does not exist" may be understood as any one or more of "does not store", "release", and "delete".

9. Dynamic Resource and Configured Resource

The dynamic resource may include a downlink dynamic allocation resource and/or an uplink dynamic grant resource.

The dynamic resource may be a dynamic resource used for unicast, and/or may be a dynamic resource used for groupcast.

The configured resource may include any one or more of downlink first-type configuration allocation resource, a downlink second-type configuration allocation resource, an uplink first-type configuration grant resource, and an uplink second-type configuration grant resource.

The configured resource may be a configured resource used for unicast, and/or may be a configured resource used for groupcast.

10. Transmission Identifier

The transmission identifier may include a groupcast identifier and/or a unicast identifier.

The transmission identifier may be used to identify transmission, or identify the unicast, or identify the groupcast.

One transmission identifier may be used to identify one groupcast.

The first device may determine, based on a scrambling manner of DCI or a physical downlink control channel (Physical Downlink Control Channel, PDCCH) for scheduling a resource or data, a transmission identifier associated with the resource or the data, or may determine, based on a configuration of the second device, a transmission identifier associated with the resource or the data, or may determine, based on a first list, a transmission identifier associated with the resource or the data.

The first list includes a unicast identifier and/or a groupcast identifier of a groupcast in which the first device is interested.

The first list includes a correspondence between the unicast identifier and an index (index) and/or a correspondence between the groupcast identifier of the interested groupcast and an index.

The first list includes a correspondence between the unicast and an index (index), and/or a correspondence between the groupcast of the interested groupcast and an index. The first device may send the first list to the second device.

The first device sends the first list to the second device by using a second message, where the first list is included in the second message.

The second message may be an indication of interest, or indicate, to the second device, a unicast and/or a groupcast in which the first device is interested or no longer interested.

The first device may determine, based on the unicast identifier and/or the groupcast identifier of the interested groupcast in the first list, indexes/an index corresponding to the unicast and/or the groupcast.

The transmission identifier may include any one or more of an RNTI used for the groupcast, an RNTI used for the unicast, or an RNTI used for scheduling.

The transmission identifier may be used for any one or more of the following:
(1) scheduling a dynamic resource;
(2) a retransmission resource of the dynamic resource;
(3) activating a configured resource;
(4) reactivating the configured resource;
(5) deactivating the configured resource; or
(6) scheduling a retransmission resource of the configured resource.

For example, the transmission identifier may be any one or more of the following: a group-radio network temporary identifier (for example, Group-Radio Network Temporary Identity, G-RNTI), a group-configured scheduling-radio network temporary identifier (for example, Group-Configured Scheduling-Radio Network Temporary Identity, G-CS-RNTI), a group-cell-radio network temporary identifier (for example, Group-Cell-Radio Network Temporary Identity, G-C-RNTI), a configured scheduling-group-radio network temporary identifier (for example, Configured Scheduling-Group-Radio Network Temporary Identity, CS-G-RNTI), a cell-group-radio network temporary identifier (for example, Cell-Group-Radio Network Temporary Identity, C-G-RNTI), a groupcast-radio network temporary identifier (for example, Groupcast-Radio Network Temporary Identity, G-RNTI), a groupcast-configured scheduling-radio network temporary identifier (for example, Groupcast-Configured Scheduling-Radio Network Temporary Identity, G-CS-RNTI), a groupcast-cell-radio network temporary identifier (for example, Groupcast-Cell-Radio Network Temporary Identity, G-C-RNTI), a configured scheduling-groupcast-radio network temporary identifier (for example, Configured Scheduling-Groupcast-Radio Network Temporary Identity, CS-G-RNTI), a cell-groupcast-radio network temporary identifier (for example, Cell-Groupcast-Radio Network Temporary Identity, C-G-RNTI), a multicast-radio network temporary identifier (for example, Multicast-Radio Network Temporary Identity, M-RNTI), a multicast-configured scheduling-radio network temporary identifier (for example, Multicast-Configured Scheduling-Radio Network Temporary Identity, M-CS-RNTI), a multicast-cell-radio network temporary identifier (for example, Multicast-Cell-Radio Network Temporary Identity, M-C-RNTI), a configured scheduling-multicast-radio network temporary identifier (for example, Configured Scheduling-Multicast-Radio Network Temporary Identity, CS-M-RNTI), a cell-multicast-radio network temporary identifier (for example, Cell-Multicast-Radio Network Temporary Identity, C-M-RNTI), a broadcast-radio network temporary identifier (for example, Broadcast-Radio Network Temporary Identity, B-RNTI), a broadcast-configured scheduling-radio network temporary identifier (for example, Broadcast-Configured Scheduling-Radio Network Temporary Identity, B-CS-RNTI), a broadcast-cell-radio network temporary identifier (for example, Broadcast-Cell-Radio Network Temporary Identity, B-C-RNTI), a configured scheduling-broadcast-radio network temporary identifier (for example, Configured Scheduling-Broadcast-Radio Network Temporary Identity, CS-B-RNTI), a cell-broadcast-radio network temporary identifier (for example, Cell-Broadcast-Radio Network Temporary Identity, C-B-RNTI), an index corresponding to unicast or multicast, a cell-radio network temporary identifier (Cell-Radio Network Temporary Identity, C-RNTI), a configured scheduling-radio network temporary identifier (Configured Scheduling-Radio Network Temporary Identity, CS-RNTI), a temporary mobile group identifier (for example, Temporary Mobile Group Identity, TMGI), a temporary mobile groupcast identifier (for example, Temporary Mobile Groupcast Identity, TMGI), a temporary mobile multicast identifier (for example, Temporary Mobile Multicast Identity, TMMI), a temporary mobile broadcast identifier (for example, Temporary Mobile Broadcast Identity, TMBI), a session identifier, a groupcast session identifier, a multicast session identifier, a broadcast session identifier, and the like.

The transmission identifier may be used to identify a groupcast session.

The TMGI may be used to identify a groupcast session, or transmission or possible retransmission of the groupcast session.

The TMMI may be used to identify a multicast session, or transmission or possible retransmission of the multicast session.

The TMBI may be used to identify a broadcast session, or transmission or possible retransmission of the broadcast session.

One transmission identifier may be used to identify one groupcast session, one multicast session, or one broadcast session, or transmission or possible retransmission of the groupcast session, the multicast session, or the broadcast session.

The TMGI and the session identifier/groupcast session identifier may be used together to identify one groupcast session, or transmission or possible retransmission of the groupcast session.

The TMMI and the session identifier/multicast session identifier may be used together to identify one multicast session, or transmission or possible retransmission of the multicast session.

The TMBI and the session identifier/broadcast session identifier may be used together to identify one broadcast session, or transmission or possible retransmission of the broadcast session.

11. Associated

That the data is associated with the HARQ process may be understood as that the HARQ process is used to process the data, the HARQ process is used for first data, the data is allocated to the HARQ process, the data and associated HARQ information are allocated to the HARQ process, or any one or more of the data, associated HARQ information, and the transmission identifier are allocated to the HARQ process.

That the data is associated with the transmission identifier may be understood as any one or more of the following:
(1) the transmission identifier is used to scramble DCI or a PDCCH, where the DCI or the PDCCH is associated with the data;
(2) the transmission identifier is associated with scrambling information, where the scrambling information is used to scramble DCI or a PDCCH, and the DCI or the PDCCH is associated with the data; or
(3) the data is transmitted on a resource, and the resource is associated with the transmission identifier.

That the resource is associated with the transmission identifier may be understood as that the second device configures the resource to be corresponding to the transmission identifier.

That the DCI or the PDCCH is associated with the data may be understood as follows: the DCI or the PDCCH is used to schedule the data.

That the data is associated with the HARQ process ID may be understood as that the data is transmitted on a resource, where the resource is associated with the HARQ process ID.

That the data is associated with the transmission may be understood as that transmission corresponding to the data is the transmission, or data transmitted in the transmission is the data.

That the HARQ process is associated with the HARQ entity may be understood as that a HARQ process maintained by the HARQ entity includes the HARQ process, or the HARQ entity maintains the HARQ process.

That the data is associated with the HARQ entity may be understood as that the data is processed or received by the HARQ entity, the data is processed or received by a HARQ process maintained by the HARQ entity, or the data is associated with a HARQ process maintained by the HARQ entity.

Any one or more of the DCI or the PDCCH, the HARQ entity, the transmission, the data, the resource, the HARQ process, the transmission identifier, and the HARQ process ID are associated.

In embodiments of this application, "the HARQ process corresponding to the HARQ entity" may be understood as some or all HARQ processes corresponding to the HARQ entity.

In embodiments of this application, the maximum transmission time may be a timer or a clock machine.

In embodiments of this application, that the maximum transmission time is reached may be understood as that the timer/clock machine times outs, expires, or is not running.

In embodiments of this application, that the maximum transmission time is not reached may be understood as that the timer/clock machine times outs, expires, or is not running.

In embodiments of this application, "occupied" may be understood as "activated". "Unoccupied" may be understood as "deactivated" or "inactive".

In embodiments of this application, the first device is used as an example to describe a specific implementation process. In actual application, embodiments of this application may be performed by any one or more of a MAC entity, the HARQ entity, and the HARQ process of the first device.

The transmission identifier may be a groupcast identifier, or may be a unicast identifier.

In embodiments of this application, the first device may be a network device, or may be a terminal device.

In embodiments of this application, the second device may be a network device, or may be a terminal device.

The data in embodiments of this application may be understood as any one or more of a transport block (transport block, TB), a medium access control protocol data unit (medium access control protocol data unit, MAC PDU), a data packet, or a packet.

Optionally, in embodiments of this application, for groupcast transmission, the MAC entity or the first device includes one or more HARQ entities.

Optionally, in embodiments of this application, one or more groupcasts correspond to one HARQ entity.

Optionally, in embodiments of this application, one HARQ entity maintains one or more HARQ processes, or one HARQ entity corresponds to one or more HARQ processes.

In embodiments of this application, one HARQ process may be associated with one HARQ buffer.

In embodiments of this application, the unicast may be understood as that one transmit end sends data to one receive end.

In embodiments of this application, the unicast may be understood as: downlink transmission in an LTE or NR protocol.

In embodiments of this application, the groupcast may be understood as that one transmit end sends data to a plurality of receive ends.

In embodiments of this application, the groupcast may be understood as: a broadcast/groupcast in LTE MBMS or NR MBS.

In embodiments of this application, the groupcast may be understood as a multicast and/or a broadcast. The multicast may be understood as a groupcast, and/or a broadcast.

In embodiments of this application, the groupcast mode may be replaced with a PTM mode, a PTM transmission mode, or a groupcast transmission mode. The groupcast mode may be understood as that one transmit end sends data to a plurality of receive ends. For example, the groupcast transmission mode may include: (the second device) scheduling, by using a PDCCH/DCI scrambled by a fourth RNTI (for example, a C-RNTI), a PDSCH scrambled by a fifth RNTI (for example, a G-RNTI) (for the first device), and/or (the second device) scheduling, by a PDCCH/DCI scrambled by a fifth RNTI (for example, a G-RNTI), a PDSCH scrambled by the fifth RNTI (for example, the G-RNTI) (for the first device). In embodiments of this application, the unicast mode may be replaced with a PTP mode, a PTP transmission mode, or a unicast transmission mode. The unicast mode may be understood as that one transmit end sends data to one receive end.

In embodiments of this application, "associated" may be understood as "corresponding to". The "correspondence" may be understood as an "association relationship".

In embodiments of this application, the maintaining one HARQ entity may be understood as: corresponding to one HARQ entity.

In embodiments of this application, that the second device sends the data to the first device by using the transmission identifier and the HARQ process ID may be understood as that the first device receives the data associated with the transmission identifier and the HARQ process ID.

In embodiments of this application, that the first device receives the data may be understood as that the first device receives control information corresponding to the data.

In embodiments of this application, "toggled" may be understood as that a first NDI is different from a second NDI, or a value of the first NDI is different from a value of the second NDI.

In embodiments of this application, "is not toggled", "not toggled", or "does not toggle" may be understood as that a first NDI is the same as a second NDI, or a value of the first NDI is the same as a value of the second NDI.

That the first device receives the data may be understood as that the first device receives control information corresponding to the data.

In embodiments of this application, that the first device performs determining based on the second transmission identifier and/or the second HARQ process ID may be understood as: for the second transmission identifier and/or the second HARQ process ID, the first device performs determining.

In embodiments of this application, that the first device determines, based on the second transmission identifier, the second HARQ process ID, and the second new data indicator NDI, that second data is newly transmitted data may be understood as: for the second transmission identifier, the second HARQ process ID, and that the second NDI is toggled or not toggled, the first device determines that the second data is the newly transmitted data.

In embodiments of this application, that the first device determines, based on the second transmission identifier and the second new data indicator NDI, that the second data is newly transmitted data may be understood as: for the second transmission identifier and that the second NDI is toggled or not toggled, the first device determines that the second data is the newly transmitted data.

In embodiments of this application, that the first device determines, based on the second transmission identifier, the second HARQ process ID, and the second new data indicator NDI, that second data is newly transmitted data may be understood as: for the second transmission identifier, the second HARQ process ID, and that the second NDI is toggled or not toggled compared with the first NDI, the first device determines that the second data is the newly transmitted data.

In embodiments of this application, that the first device determines, based on the second transmission identifier and the second new data indicator NDI, that the second data is newly transmitted data may be understood as: for the second transmission identifier and that the second NDI is toggled or not toggled compared with the first NDI, the first device determines that the second data is the newly transmitted data.

In embodiments of this application, that the first device determines, based on the second transmission identifier, the second HARQ process ID, and the second new data indicator NDI, that second data is retransmitted data may be understood as: for the second transmission identifier, the second HARQ process ID, and that the second NDI is toggled or not toggled, the first device determines that the second data is the retransmitted data.

In embodiments of this application, that the first device determines, based on the second transmission identifier and the second new data indicator NDI, that the second data is retransmitted data may be understood as: for the second transmission identifier and that the second NDI is toggled or not toggled, the first device determines that the second data is the retransmitted data.

In embodiments of this application, that the first device determines, based on the second transmission identifier, the second HARQ process ID, and the second new data indicator NDI, that second data is retransmitted data may be understood as: for the second transmission identifier, the second HARQ process ID, and that the second NDI is toggled or not toggled compared with the first NDI, the first device determines that the second data is the retransmitted data.

In embodiments of this application, that the first device determines, based on the second transmission identifier and the second new data indicator NDI, that the second data is retransmitted data may be understood as: for the second transmission identifier and that the second NDI is toggled or not toggled compared with the first NDI, the first device determines that the second data is the retransmitted data.

In embodiments of this application, "stop" may be understood as/replaced with "suspend" and/or "deactivate". For example, the "transmission stops" may be understood as/replaced with "transmission pauses" and/or "transmission deactivates".

In embodiments of this application, the "transmission stops" may be understood as/replaced with "a session stops" and/or "a session deactivates".

In LTE MBMS, HARQ feedback is not supported.

In NR MBS, to improve transmission reliability, a HARQ mechanism may be introduced.

Currently, the foregoing HARQ mechanism is applied to unicast transmission, and there is a fixed correspondence between a HARQ process ID and a HARQ process. After receiving data, a receive end places the data in a HARQ process corresponding to a HARQ process ID associated with the data for processing. The HARQ process determines whether the data is newly transmitted data or retransmitted data based on whether an NDI of a same HARQ process ID is toggled.

That there is a fixed correspondence between the HARQ process ID and the HARQ process may be understood as that the HARQ process is uniquely identified by the HARQ process ID.

The first device may receive one or more groupcasts from the second device.

The first device may also receive a unicast from the second device.

For the groupcast, after the HARQ mechanism is introduced, there may be the following several possibilities for the HARQ entity on the first device side.

(1) Option 1: All groupcasts received by the first device correspond to one HARQ entity, that is, all groupcasts share one HARQ entity.

(2) Option 2: A plurality of groupcasts received by the first device correspond to one HARQ entity, that is, the plurality of groupcasts share one HARQ entity.

(3) Option 3: Each groupcast received by the first device corresponds to one HARQ entity.

For the unicast and the groupcast, there may be the following several possibilities for the HARQ entity on the first device side.

(1) Option 1: A unicast and a groupcast received by the first device correspond to one HARQ entity, that is, the unicast and the groupcast share one HARQ entity.

(2) Option 2: A unicast and a groupcast received by the first device correspond to different HARQ entities, that is, the unicast and the groupcast do not share one HARQ entity.

The second device may send differently groupcast data by using a same HARQ process ID, and/or the second device may send unicast data and groupcast data by using a same HARQ process ID.

If the plurality of or all the groupcasts share one HARQ entity, one HARQ process may be used to process the differently groupcast data, or may process data corresponding to different HARQ process IDs. There is no fixed correspondence between the HARQ process ID and the HARQ process.

If the unicast and the groupcast share one HARQ entity, one HARQ process may be used to process the unicast data, or may be used to process the groupcast data, or may be used to process data corresponding to different HARQ process IDs. There is no fixed correspondence between the HARQ process ID and the HARQ process.

That there is no fixed correspondence between the HARQ process ID and the HARQ process may be understood as that the HARQ process is no longer uniquely identified by the HARQ process ID, and/or the HARQ process may be not only used to process data corresponding to a HARQ process ID, but also used to process data corresponding to another HARQ process ID.

Problem 1: After the HARQ mechanism is introduced into the groupcast, when the first device processes, by using a HARQ process (for example, a HARQ process 1), data corresponding to a transmission identifier (for example, a G-RNTI 1) and a HARQ process ID (for example, a HARQ process ID 1), if transmission of the data by the second device ends, and then the second device no longer sends the data by using the transmission identifier and the HARQ process ID, but the first device has not successfully received the data, the HARQ process is always occupied. In this case, a HARQ process on the first device side is always occupied. As a result, a quantity of HARQ processes that can be used to receive data on the first device side decreases.

Problem 2: After the HARQ mechanism is introduced into the groupcast, if the first device determines, only based on whether a new data indicator (New data indication, NDI) of a same HARQ process ID is toggled, whether data is newly transmitted data or retransmitted data, a determining error may be caused.

For example, as shown in FIG. 5, in a first step, the second device (for example, a network device) sends newly transmitted data, data 1, to the first device (for example, a terminal device) by using a transmission identifier 1 (for example, a G-RNTI 1) and a HARQ process ID 1, where NDI=0; in a second step, the second device sends newly transmitted data, data 2, to the first device by using a transmission identifier 2 (for example, a G-RNTI 2) and the HARQ process ID 1, where NDI=1; and in a third step, the second device sends retransmission of the data, data 1, (NDI=0) to the first device by using the transmission identifier 1 (for example, the G-RNTI 1) and the HARQ process ID 1. If the first device determines, only based on whether a new data indicator (New data indication, NDI) of a same HARQ process ID is toggled, whether the data is the newly transmitted data or the retransmitted data, the first device compares an NDI (that is, the NDI in the second step) of last time of transmission associated with the HARQ process ID 1 with an NDI (that is, the NDI in the third step) of this time of transmission, and considers/determines that the NDI has been toggled. As a result, the first device mistakenly considers that the data 1 sent in the third step is the newly transmitted data.

Problem 3: If the second device sends differently groupcast data by using a same HARQ process ID, and/or the second device sends unicast data and groupcast data by using a same HARQ process ID, the first device may receive different groupcasts, with a same HARQ process ID, sent by the second device, and/or may receive a unicast and a groupcast, with a same HARQ process ID, sent by the second device.

For example, as shown in FIG. 6, the second device may send groupcast data 1 to a device 1, a device 2, and a device 3 by using a transmission identifier 1 (for example, a G-RNTI 1) and a HARQ process ID 1, send groupcast data 2 to a device 3, a device 4, and a device 5 by using a transmission identifier 2 (for example, a G-RNTI 2) and the HARQ process ID 1, or may send unicast data 3 to the device 3 by using a transmission identifier 3 (for example, a C-RNTI) and the HARQ process ID 1. Therefore, the device 3 (the first device) may receive the data 1, the data 2, and the data 3 that are sent by the second device, where the data 1, the data 2, and the data 3 correspond to a same HARQ process ID.

If a plurality of or all groupcasts share one HARQ entity, and/or the unicast and the groupcast share one HARQ entity, the first device may not be able to distinguish between differently groupcast data associated with a same HARQ process ID, and/or the first device may not be able to distinguish between unicast data and groupcast data associated with a same HARQ process ID.

For example, as shown in FIG. 7, in a first step, the second device (for example, a network device) sends newly transmitted data, data 1, to the first device (for example, a terminal device) by using a transmission identifier 1 (for example, a G-RNTI 1) and a HARQ process ID 1; in a second step, the second device sends newly transmitted data, data 2, to the first device by using a transmission identifier 2 (for example, a G-RNTI 2) and the HARQ process ID 1; and in a third step, the second device sends retransmission of the data, data 1, to the first device by using the transmission identifier 1 (for example, the G-RNTI 1) and the HARQ process ID 1. If there is a fixed correspondence between the HARQ process ID and the HARQ process, the first device processes, by using the HARQ process 1, all data corresponding to the HARQ process ID 1. There are different problems under the following two understandings:

Option 1: In the second step, the first device clears the data 1 received in the first step, and in the third step, the first device clears the data 2 received in the second step. In this case, if the data 1 is not successfully received in the first step, although the first device receives the retransmission of the data 1 in the third step, the first device can decode the data only based on this time of transmission, and cannot perform combination and decoding on the content received in the first step and the content received in the third step. As a result, transmission reliability is reduced.

Option 2: Combination and decoding are performed on the data 2 in the second step and the data 1 in the first step. In this case, data decoding may fail.

Problem 4: If the second device sends differently groupcast data, and/or the second device sends unicast data and groupcast data, the first device may receive different groupcasts sent by the second device, and/or may receive a unicast and a groupcast sent by the second device. The first device may not be able to determine which HARQ entity should be used to process differently groupcast data, and/or the first device may not be able to determine which HARQ entity should be used to process unicast data and groupcast data.

If one or more groupcasts share one HARQ entity, and/or the unicast and the groupcast do not share one HARQ entity, the first device may maintain a plurality of HARQ entities, and the first device may not be able to determine which HARQ entity should process differently groupcast data, and/or the first device may not be able to determine which HARQ entity should process unicast data and groupcast data.

Problem 5: If the second device sends differently groupcast data, and/or the second device sends unicast data and groupcast data, the first device may receive different groupcasts sent by the second device, and/or may receive a unicast and a groupcast sent by the second device. How the first device to determine an NDI corresponding to each piece of data or each resource is a technical problem that needs to be resolved.

Problem 6: If the first device does not release a correspondence related to the HARQ process (for example, a correspondence between a HARQ process 1 and a HARQ process ID 1 and a transmission identifier 1 (for example, a G-RNTI 1)), the first device receives data (for example, newly transmitted data) associated with the HARQ process ID 1 and the transmission identifier 1 (for example, the G-RNTI 1) again, the first device may incorrectly clear/overwrite other data (that is, data in a HARQ buffer of the HARQ process 1) associated with the HARQ process 1.

For example, in a first step, the second device (for example, a network device) sends newly transmitted data, data 1, to the first device (for example, a terminal device) by using a transmission identifier 1 (for example, a G-RNTI 1) and a HARQ process ID 1, where the data 1 corresponds to a groupcast 1. The first device receives the data 1 by using a HARQ process 1, and then the first device no longer receives the data 1/the groupcast 1. However, the first device does not release a correspondence between the HARQ process 1 and the transmission identifier 1 (for example, the G-RNTI 1) and the HARQ process ID 1. In a second step, the second device sends newly transmitted data, data 2, to the first device by using a transmission identifier 2 (for example, a G-RNTI 2) and the HARQ process ID 1, where the data 2 corresponds to a groupcast 2, and the first device receives the data 2 by using the HARQ process 1. In a third step, the second device sends newly transmitted data, data 3, to the first device by using the transmission identifier 1 (for example, the G-RNTI 1) and the HARQ process ID 1, where the data 3 corresponds to the groupcast 1. The first device may perform any one of the following operations: (1) the HARQ process 1 may be considered as unoccupied, the HARQ buffer of the HARQ process 1 is cleared, and the data 2 is incorrectly cleared, affecting receiving of the data 2 in the second step; or (2) the data 3 may be delivered to the HARQ process 1, affecting receiving of the data 2 in the second step.

Therefore, this embodiment of this application proposes a communication method, to improve data transmission performance.

FIG. 8 is a schematic diagram of a communication method according to an embodiment of this application. The method 800 includes the following steps:

810: A first condition is met.

820: A first device clears a first hybrid automatic repeat request buffer HARQ buffer corresponding to a first hybrid automatic repeat request process HARQ process, releases the first HARQ process, and/or releases a correspondence related to the first HARQ process.

In this application, the releasing the correspondence related to the HARQ process may include/be replaced with deleting the correspondence related to the HARQ process. In this application, the releasing the correspondence related to the first HARQ process may include/be replaced with deleting the correspondence related to the first HARQ process.

In this application, the releasing the HARQ process may include/be replaced with any one or more of the following: considering/determining the HARQ process as unoccupied and deactivating the HARQ process. For example, the releasing the first HARQ process may be understood as determining the first HARQ process as unoccupied.

Specifically, the correspondence related to the first HARQ process may be any one or more of the following:

(1) a correspondence between a first transmission identifier and a first hybrid automatic repeat request process identifier HARQ process ID and the first HARQ process;

(2) a correspondence between a first transmission identifier and the first HARQ process;

(3) a correspondence between a first HARQ process ID and the first HARQ process;

(4) a correspondence between first downlink control information DCI or a PDCCH and the first HARQ process;

(5) a correspondence between a first resource and the first HARQ process;

(6) a correspondence between first transmission and the first HARQ process; or (7) a correspondence between the first HARQ process and any one or more of first data, a first transmission identifier, a first HARQ process ID, first DCI or a PDCCH, a first resource, and first transmission.

Optionally, the first data is associated with the first HARQ process.

That the first data is associated with the first HARQ process may be understood as that the first HARQ process is configured to process the first data, the first HARQ process is configured to receive the first data, the first data is allocated to the first HARQ process, the first data and associated HARQ information are allocated to the first HARQ process, or any one or more of the first data, associated HARQ information, and the first transmission identifier is allocated to the first HARQ process.

It should be explained that if the first data is associated with the first HARQ process, it may be understood as that the first data has been or has been previously associated with the first HARQ process, and a time point or a time period in which the first data is associated with the first process is not limited.

"Allocated to" may be understood as "sent to".

Optionally, the first data is associated with the first transmission identifier.

That the first data is associated with the first transmission identifier may be understood as any one or more of the following:

(1) the first transmission identifier is used to scramble first DCI or a PDCCH, where the first DCI or the PDCCH is associated with the data;

(2) the first transmission identifier is associated with first scrambling information, where the first scrambling information is used to scramble first DCI or a PDCCH, and the first DCI or the PDCCH is associated with the data; or (3) the first data is transmitted on a first resource, and the first resource is associated with the first transmission identifier.

That the first resource is associated with the first transmission identifier may be understood as that the second device configures the first resource to be corresponding to the first transmission identifier.

That the first DCI or the PDCCH is associated with the first data may be understood as that the first DCI or the PDCCH is used to schedule the first data.

Optionally, the first data is associated with the first HARQ process ID.

That the first data is associated with the first HARQ process ID may be understood as that the first data is transmitted on a first resource, where the first resource is associated with the first HARQ process ID.

Optionally, the first data is associated with the first transmission.

That the first data is associated with the first transmission may be understood as that transmission corresponding to the first data is the first transmission, or data transmitted in the first transmission is the first data.

That the first device clears the first hybrid automatic repeat request buffer HARQ buffer corresponding to the first hybrid automatic repeat request process HARQ process may be understood as that the first device clears a HARQ buffer corresponding to a HARQ process corresponding to the first HARQ entity.

The first HARQ process may be understood as a HARQ process corresponding to the first HARQ entity, or one or more or all or some HARQ processes corresponding to the first HARQ entity.

That the first device clears the HARQ buffer corresponding to the HARQ process corresponding to the first HARQ entity may be understood as that the first device clears HARQ buffers corresponding to all or some HARQ processes corresponding to the first HARQ entity.

The first HARQ process is associated with the first HARQ entity.

That the first HARQ process is associated with the first HARQ entity may be understood as that HARQ processes maintained by the first HARQ entity includes the first HARQ process, or the first HARQ entity maintains the first HARQ process.

Optionally, the first data is associated with the first HARQ entity.

That the first data is associated with the first HARQ entity may be understood as that the first data is processed or received by the first HARQ entity, or the first data is processed or received by the HARQ process maintained by the first HARQ entity, or the first data is associated with the HARQ process maintained by the first HARQ entity.

Any one or more of the first DCI or the PDCCH, the first HARQ entity, the first transmission, the first data, the first resource, the first HARQ process, the first transmission identifier, and the first HARQ process ID are associated.

That the any one or more of the first DCI or the PDCCH, the first HARQ entity, the first transmission, the first data, the first resource, the first HARQ process, the first transmission identifier, and the first HARQ process ID are associated may be understood as that any one or more of the first DCI or the PDCCH, the first HARQ entity, the first transmission, the first data, the first resource, the first HARQ process, the first transmission identifier, and the first HARQ process ID are previously associated.

Optionally, if the first condition is met and a second condition is met, the first device clears the first HARQ buffer, releases the first HARQ process, and/or releases the correspondence related to the first HARQ process, where the second condition includes any one or more of the following.

(1) The first HARQ buffer is not empty.

(2) Alternatively, the first HARQ process or the first HARQ entity is associated with the first data.

That the first HARQ process or the first HARQ entity is associated with the first data may be understood as that the first HARQ process or the first HARQ entity is further/still associated with the first data, or the first HARQ process or the first HARQ entity is not associated with other data.

The "other data" may be understood as data that is not associated with the first HARQ process ID, data that is not associated with the first transmission identifier, or data that is not associated with the first transmission identifier and the first HARQ process ID.

That the first HARQ process or the first HARQ entity is associated with the first data may be understood as that there exists the first data in the first HARQ buffer corresponding to the first HARQ process, there exists the first data in the HARQ buffer corresponding to the HARQ process corresponding to the first HARQ entity, or there exists an association between the first HARQ process or the first HARQ entity and the first data.

That there exists the association between the first HARQ process or the first HARQ entity and the first data may be understood as that the association between the first HARQ process or the first HARQ entity and the first data is not deleted or released.

(3) Alternatively, the first HARQ process or the first HARQ entity is associated with the first transmission identifier and the first HARQ process ID.

That the first HARQ process or the first HARQ entity is associated with the first transmission identifier and the first HARQ process ID may be understood as that the first HARQ process or the first HARQ entity is further/still associated with the first transmission identifier and the first HARQ process ID, or the first HARQ process and the first HARQ entity are not associated with another transmission identifier and another HARQ process ID.

The "another transmission identifier and another HARQ process ID" may be understood as a transmission identifier and a HARQ process ID that are different from the first transmission identifier and the first HARQ process ID.

That the first HARQ process or the first HARQ entity is associated with the first transmission identifier and the first HARQ process ID may be understood as that there exists data associated with the first transmission identifier and the first HARQ process ID in the first HARQ buffer corresponding to the first HARQ process, there exists data associated with the first transmission identifier and the first HARQ process ID in the HARQ buffer corresponding to the HARQ process corresponding to the first HARQ entity, or there exists an association between the first HARQ process or the first HARQ entity and the first transmission identifier and the first HARQ process ID.

That there exists the association between the first HARQ process or the first HARQ entity and the first transmission identifier and the first HARQ process ID may be understood as that the association between the first HARQ process or the first HARQ entity and the first transmission identifier and the first HARQ process ID is not deleted or released.

(4) Alternatively, the first HARQ process or the first HARQ entity is associated with the first transmission identifier.

That the first HARQ process or the first HARQ entity is associated with the first transmission identifier may be understood as that the first HARQ process or the first HARQ entity is further/still associated with the first transmission identifier, or the first HARQ process or the first HARQ entity is not associated with another transmission identifier.

The "another transmission identifier" may be understood as a transmission identifier different from the first transmission identifier.

That the first HARQ process or the first HARQ entity is associated with the first transmission identifier may be understood as that there exists data associated with the first transmission identifier in the first HARQ buffer corresponding to the first HARQ process, there exists data associated with the first transmission identifier in the HARQ buffer corresponding to the HARQ process corresponding to the first HARQ entity, or there exists an association between the first HARQ process or the first HARQ entity and the first transmission identifier.

That there exists the association between the first HARQ process or the first HARQ entity and the first transmission identifier may be understood as that the association between the first HARQ process or the first HARQ entity and the first transmission identifier is not deleted or released.

(5) Alternatively, the first HARQ process or the first HARQ entity is associated with the first HARQ process ID.

That the first HARQ process or the first HARQ entity is associated with the first HARQ process ID may be understood as that the first HARQ process or the first HARQ entity is further/still associated with the first HARQ process ID, or the first HARQ process or the first HARQ entity is not associated with another HARQ process ID.

The "another HARQ process ID" may be understood as a HARQ process ID different from the first HARQ process ID.

That the first HARQ process or the first HARQ entity is associated with the first HARQ process ID may be understood as that there exists data associated with the first HARQ process ID in the first HARQ buffer corresponding to the first HARQ process, there exists data associated with the first HARQ process ID in the HARQ buffer corresponding to the HARQ process corresponding to the first HARQ entity, or there exists an association between the first HARQ process or the first HARQ entity and the first HARQ process ID.

That there exists the association between the first HARQ process or the first HARQ entity and the first HARQ process ID may be understood as that the association between the first HARQ process or the first HARQ entity and the first HARQ process ID is not deleted or released.

(6) Alternatively, the first HARQ process or the first HARQ entity is associated with the first downlink control information DCI or the PDCCH.

That the first HARQ process or the first HARQ entity is associated with the first downlink control information DCI or the PDCCH may be understood as that the first HARQ process or the first HARQ entity is further/still associated with the first DCI or the PDCCH, or the first HARQ process or the first HARQ entity is not associated with another DCI or another PDCCH.

The "another DCI or another PDCCH" may be understood as DCI or a PDCCH different from the first DCI or the PDCCH, or DCI or a PDCCH different from DCI or a PDCCH corresponding to the first data.

That the first HARQ process or the first HARQ entity is associated with the first downlink control information DCI or the PDCCH may be understood as that there exists data associated with the first DCI or the PDCCH in the first HARQ buffer corresponding to the first HARQ process, there exists data associated with the first DCI or the PDCCH in the HARQ buffer corresponding to the HARQ process corresponding to the first HARQ entity, or there exists an association between the first HARQ process or the first HARQ entity and the first DCI or the PDCCH.

That there exists the association between the first HARQ process or the first HARQ entity and the first DCI or the PDCCH may be understood as that the association between the first HARQ process or the first HARQ entity and the first DCI or the PDCCH is not deleted or released.

(7) Alternatively, the first HARQ process or the first HARQ entity is associated with the first resource.

That the first HARQ process or the first HARQ entity is associated with the first resource may be understood as that the first HARQ process or the first HARQ entity is further/still associated with the first resource, or the first HARQ process or the first HARQ entity is not associated with another resource.

The "another resource" may be understood as a resource different from the first resource, or a resource different from a resource corresponding to the first data.

That the first HARQ process or the first HARQ entity is associated with the first resource may be understood as that there exists data associated with the first resource in the first HARQ buffer corresponding to the first HARQ process, there exists data associated with the first resource in the HARQ buffer corresponding to the HARQ process corresponding to the first HARQ entity, or there exists an association between the first HARQ process or the first HARQ entity and the first resource.

That there exists the association between the first HARQ process or the first HARQ entity and the first resource may be understood as that the association between the first HARQ process or the first HARQ entity and the first resource is not deleted or released.

(8) Alternatively, the first HARQ process or the first HARQ entity is associated with the first transmission.

That the first HARQ process or the first HARQ entity is associated with the first transmission may be understood as that the first HARQ process or the first HARQ entity is further/still associated with the first transmission, or the first HARQ process or the first HARQ entity is not associated with another transmission.

The "another transmission" may be understood as transmission different from the first transmission, or transmission different from transmission corresponding to the first transmission.

That the first HARQ process or the first HARQ entity is associated with the first transmission may be understood as that there exists data associated with the first transmission in the first HARQ buffer corresponding to the first HARQ process, there exists data associated with the first transmission in the HARQ buffer corresponding to the HARQ process corresponding to the first HARQ entity, or there exists an association between the first HARQ process or the first HARQ entity and the first transmission.

That there exists the association between the first HARQ process or the first HARQ entity and the first transmission may be understood as that the association between the first HARQ process or the first HARQ entity and the first transmission is not deleted or released.

(9) Alternatively, transmission corresponding to the first HARQ process succeeds or ends.

That the transmission corresponding to the first HARQ process succeeds or ends may be understood as that previous transmission, previous time of transmission, or last time of transmission corresponding to the first HARQ process succeeds or ends.

That the transmission corresponding to the first HARQ process succeeds or ends may be understood as that transmission of data corresponding to the first HARQ process succeeds or ends.

(10) Alternatively, the first HARQ process is associated with the first HARQ entity.

That the first HARQ process is associated with the first HARQ entity may be understood as that the first HARQ entity includes the first HARQ process, or the first HARQ entity maintains the first HARQ process.

(11) Alternatively, the first device receives sixth data.

That the first device receives the sixth data may be understood as that the first device receives control information corresponding to the sixth data.

The sixth data is newly transmitted data and/or groupcast data.

(12) Alternatively, a quantity of unoccupied HARQ processes is less than or equal to a first threshold.

The first threshold may be configured/indicated/sent by the second device to the first device, may be preconfigured, may be specified in a protocol, may be stored in the first device by a device vendor before the first device is delivered from a factory, or may be preconfigured in the first device by a network device/the second device when the first device is connected to a network. For example, the first threshold may be 0, 2, 3, or the like.

For example, that the quantity of unoccupied HARQ processes is less than or equal to the first threshold may be understood as that all HARQ processes are occupied, or a quantity of unoccupied HARQ processes is less than or equal to a quantity of HARQ processes required by newly transmitted data.

Specifically, optionally, the first condition includes: The first device receives second data; and the first device determines that the second data is newly transmitted data.

That the first device receives the second data may be understood as that the first device receives control information corresponding to the second data.

The control information corresponding to the second data may be second DCI or a PDCCH, and the second DCI or the PDCCH is associated with the second data.

That the second DCI or the PDCCH is associated with the second data may be understood as that the second DCI or the PDCCH is used to schedule the second data.

Optionally, the second data is associated with a second transmission identifier.

Optionally, the second data is associated with a second HARQ process ID.

That the second data is associated with the second HARQ process ID may be understood as that the second data is transmitted on a second resource, where the second resource is associated with the second HARQ process ID.

Optionally, the second transmission identifier and the second HARQ process ID are the same as the first transmission identifier and the first HARQ process ID, the second transmission identifier is the same as the first transmission identifier, or the second HARQ process ID is the same as the first HARQ process ID.

Optionally, the transmission related to the first data is previous time of transmission associated with the first HARQ process ID, the transmission related to the first data is previous time of transmission associated with the first transmission identifier, or the transmission related to the first data is previous time of transmission associated with the first HARQ process ID and the first transmission identifier.

Optionally, the transmission related to the first data is previous time of transmission associated with the second HARQ process ID, the transmission related to the first data is previous time of transmission associated with the second transmission identifier, or the transmission related to the first data is previous time of transmission associated with the second HARQ process ID and the second transmission identifier.

That the first device receives the second data; and the first device determines that the second data is the newly transmitted data may be understood as that the first device receives the second data, where the second data is the newly transmitted data.

In this application, a time sequence of "the first device receives second data" and "the first device determines that the second data is newly transmitted data" is not limited, and is not necessarily two actions.

It should be understood that if a transmission identifier and a HARQ process ID that are associated with the newly transmitted second data are the same as the transmission identifier and the HARQ process ID that are associated with the first data, a transmission identifier associated with the newly transmitted second data is the same as the transmission identifier associated with the first data, or a HARQ process ID associated with the newly transmitted second data is the same as the HARQ process ID associated with the first data, it indicates that the transmit end no longer sends the first data, or transmission of the first data stops.

It should be understood that, if a transmission identifier associated with the newly transmitted second data is the same as the transmission identifier associated with the first data, and there is only one HARQ process ID corresponding to the transmission identifier, it indicates that the transmit end no longer sends the first data.

For example, if the first device receives the newly transmitted second data, and a second transmission identifier and a second hybrid automatic repeat request process identifier HARQ process ID that are corresponding to the second data are the same as the first transmission identifier and the first HARQ process ID that are corresponding to the first data, the first device clears a first HARQ buffer corresponding to a first HARQ process used to process the first data.

For example, the first device receives the newly transmitted second data, where the second data is associated with a second transmission identifier and a second HARQ process ID, and the first device clears a HARQ buffer corresponding to a HARQ process corresponding to previous time of transmission associated with the second transmission identifier and the second HARQ process ID.

For example, the first device receives the newly transmitted second data, where the second data is associated with a second transmission identifier and a second HARQ process ID. If a HARQ process corresponding to previous time of transmission associated with the second transmission identifier and the second HARQ process ID is not empty, the first device clears a HARQ buffer corresponding to the HARQ process corresponding to the previous time of transmission associated with the second transmission identifier and the second HARQ process ID.

For example, the first device receives the newly transmitted second data, where the second data is associated with a second transmission identifier and a second HARQ process ID. If there exists data related to the second transmission identifier and the second HARQ process ID in a HARQ buffer corresponding to a HARQ process corresponding to previous time of transmission associated with the second transmission identifier and the second HARQ process ID, the first device clears the HARQ buffer corresponding to the HARQ process corresponding to the previous time of transmission associated with the second transmission identifier and the second HARQ process ID.

For example, the first device receives the newly transmitted second data, where the second data is associated with a second transmission identifier, and the first device clears a HARQ buffer corresponding to a HARQ process corresponding to previous time of transmission associated with the second transmission identifier.

For example, the first device receives the newly transmitted second data, where the second data is associated with a second transmission identifier. If a HARQ process corresponding to previous time of transmission associated with the second transmission identifier is not empty, the first device clears a HARQ buffer corresponding to the HARQ process corresponding to the previous time of transmission associated with the second transmission identifier.

For example, the first device receives the newly transmitted second data, where the second data is associated with a second transmission identifier. If there exists data related to the second transmission identifier in a HARQ buffer corresponding to a HARQ process corresponding to previous time of transmission associated with the second transmission identifier, the first device clears the HARQ buffer corresponding to the HARQ process corresponding to the previous time of transmission associated with the second transmission identifier.

For example, as shown in FIG. 9, in a first step, the second device sends newly transmitted data 1 to the first device by using a transmission identifier 1 (for example, a G-RNTI 1) and a HARQ process ID 1, the first device processes the data 1 by using the HARQ process 1, and the first device successfully receives the data 1 or transmission of the data 1 ends (for example, a maximum quantity of times of transmission, a maximum quantity of times of retransmission, or a maximum transmission time is reached). In a second step, the second device sends newly transmitted data 2 to the first device by using a transmission identifier 2 (for example, a G-RNTI 2) and a HARQ process ID 2. The first device processes the data 2 by using the HARQ process 1, and the first device fails to receive the data 2 or transmission of the data 2 does not end (for example, a maximum quantity of times of transmission, a maximum quantity of times of retransmission, or a maximum transmission time is not reached). In a third step, the second device sends newly transmitted data 3 to the first device by using the transmission identifier 1 (for example, the G-RNTI 1) and the HARQ process ID 1. In this case, a HARQ process corresponding to previous time of transmission associated with the transmission identifier 1 and the HARQ process ID 1 is the HARQ process 1. However, the HARQ process 1 is no longer associated with the transmission identifier 1 and the HARQ process ID 1, and the first device cannot clear a HARQ buffer corresponding to the HARQ process 1.

It may be understood that this is because the HARQ process 1 is used to process the data 2 associated with the transmission identifier 2 and the HARQ process ID 2, instead of being used to process the data associated with the transmission identifier 1 and the HARQ process ID 1, the HARQ process 1 is no longer associated with the transmission identifier 1 and the HARQ process ID 1, or there exists no data associated with the transmission identifier 1 and the HARQ process ID 1 in the HARQ buffer corresponding to the HARQ process 1.

It may be understood that this is because transmission corresponding to the HARQ process 1 fails or does not end.

For example, as shown in FIG. 10, in a first step, the second device sends newly transmitted data 1 to the first device by using a transmission identifier 1 (for example, a G-RNTI 1) and a HARQ process ID 1, the first device processes the data 1 by using the HARQ process 1, and the first device successfully receives the data 1 or transmission of the data 1 ends (for example, a maximum quantity of times of transmission, a maximum quantity of times of retransmission, or a maximum transmission time is reached). In a second step, the second device sends newly transmitted data 2 to the first device by using a transmission identifier 2 (for example, a G-RNTI 2) and a HARQ process ID 2. The first device processes the data 2 by using the HARQ process 1, and the first device successfully receives the data 2 or transmission of the data 2 ends (for example, a maximum quantity of times of transmission, a maximum quantity of times of retransmission, or a maximum transmission time is reached). In a third step, the second device sends newly transmitted data 3 to the first device by using the transmission identifier 1 (for example, the G-RNTI 1) and the HARQ process ID 1. In this case, a HARQ process corresponding to previous time of transmission associated with the transmission identifier 1 and the HARQ process ID 1 is the HARQ process 1, and transmission corresponding to the HARQ process 1 succeeds or ends. The first device clears a HARQ buffer corresponding to the HARQ process 1.

It may be understood that this is because the transmission corresponding to the HARQ process 1 succeeds or ends.

It may be understood that this is because the HARQ buffer corresponding to the HARQ process 1 is not empty.

For example, as shown in FIG. 11, in a first step, the second device sends newly transmitted data 1 to the first device by using a transmission identifier 1 (for example, a G-RNTI 1) and a HARQ process ID 1, and the first device processes the data 1 by using the HARQ process 1; in a second step, the second device sends newly transmitted data 2 to the first device by using a transmission identifier 2 (for example, a G-RNTI 2) and a HARQ process ID 2, and the first device processes the data 2 by using the HARQ process 2; and in a third step, the second device sends newly transmitted data 3 to the first device by using the transmission identifier 1 (for example, the G-RNTI 1) and the HARQ process ID 1. In this case, a HARQ process corresponding to previous time of transmission associated with the transmission identifier 1 and the HARQ process ID 1 is the HARQ process 1, and the first device clears a HARQ buffer corresponding to the HARQ process 1.

It may be understood that this is because the HARQ process 1 is used to process data associated with the transmission identifier 1 and the HARQ process ID 1; the HARQ process 1 is still associated with the transmission identifier 1 and the HARQ process ID 1; or there exists data associated with the transmission identifier 1 and the HARQ process ID 1 in the HARQ buffer corresponding to the HARQ process 1.

In a possible implementation, the transmission corresponding to the HARQ process 1 succeeds or ends.

It may be understood that this is because the HARQ buffer corresponding to the HARQ process 1 is not empty.

The first device successfully receives the data 1 or transmission of the data 1 ends (for example, a maximum quantity of times of transmission, a maximum quantity of times of retransmission, or a maximum transmission time is reached), or the first device fails to receive the data 1 or transmission of the data 1 does not end (for example, a maximum quantity of times of transmission, a maximum quantity of times of retransmission, or a maximum transmission time is not reached).

The processing data by using the HARQ process may be understood as that the data is associated with the HARQ process.

That the HARQ process is used to process the data may be understood as that the data is associated with the HARQ process.

This implementation may be applied to a case in which a plurality of or all groupcasts share one HARQ entity, may be applied to a case in which a groupcast and a unicast share one HARQ entity, or may be applied to a case in which each groupcast or each unicast maintains one HARQ entity.

Optionally, that the first device determines that the second data is the newly transmitted data includes: The first device determines, based on the second transmission identifier and/or the second HARQ process ID, that the second data is the newly transmitted data.

That the first device determines, based on the second transmission identifier and/or the second HARQ process ID, that the second data is the newly transmitted data may be understood as: when the first device judges/determines whether the second data is the newly transmitted data or the retransmitted data, the first device considers the second transmission identifier and/or the second HARQ process ID.

Optionally, if the first device receives, for the first time, data corresponding to the second transmission identifier and/or the second HARQ process ID, the first device determines that the second data is the newly transmitted data.

"The first device receives, for the first time, the data corresponding to the second transmission identifier and/or the second HARQ process ID" may be understood as one or more of the following: there is no previous time of transmission corresponding to the current time of transmission, there is no previous time of transmission corresponding to the second transmission identifier and/or the second HARQ process ID, there is no previous NDI corresponding to the data, or there is no previous NDI corresponding to the second transmission identifier and/or the second HARQ process ID.

Optionally, that the first device determines that the second data is the newly transmitted data includes: The first device determines, based on the second transmission identifier, the second HARQ process ID, and the second new data indicator NDI, that the second data is the newly transmitted data.

That the first device determines, based on the second transmission identifier, the second HARQ process ID, and the second new data indicator NDI that the second data is the newly transmitted data may be understood as: when the first device judges/determines whether the second data is the newly transmitted data or the retransmitted data, the first device considers the second transmission identifier, the second HARQ process ID, and the second NDI.

Optionally, that the first device determines that the second data is the newly transmitted data includes: The first device determines, based on the second transmission identifier and the second new data indicator NDI, that the second data is the newly transmitted data.

That the first device determines, based on the second transmission identifier and the second new data indicator NDI that the second data is the newly transmitted data may be understood as: when the first device judges/determines whether the second data is the newly transmitted data or the retransmitted data, the first device considers the second transmission identifier and the second NDI.

"Determining that the second data is the newly transmitted data" may also be understood as: determining that transmission corresponding to the second data is new transmission, or determining that the second transmission is new transmission.

"Determining that the second data is the retransmitted data" may also be understood as: determining that transmission corresponding to the second data is retransmission, or determining that the second transmission is retransmission.

The second NDI is associated with the second data and/or the second resource.

The second data is transmitted on the second resource.

Specifically, "the first device determines, based on the second transmission identifier, the second HARQ process ID, and the second new data indicator NDI corresponding to the second data, that the second data is the newly transmitted data" may be understood as that the first device determines, based on the second NDI and the first NDI, that the first data is the newly transmitted data.

Specifically, "the first device determines, based on the second transmission identifier and the second new data indicator NDI corresponding to the second data, that the second data is the newly transmitted data" may be understood as that the first device determines, based on the second NDI and the first NDI, that the first data is the newly transmitted data.

The first NDI meets any one or more of the following conditions:
  (1) the first NDI is associated with the second transmission identifier and/or the second HARQ process ID;
  (2) data corresponding to the first NDI is associated with the second transmission identifier and/or the second HARQ process ID;
  (3) the first NDI is an NDI corresponding to latest or previous or last time of transmission; or
  (4) latest or previous or last time of transmission is associated with the second transmission identifier and/ or the second HARQ process ID.

For example, the first NDI may be an NDI of last time of transmission associated with the second HARQ process ID.

For example, the first NDI may be an NDI of last time of transmission associated with the second HARQ process ID and the second transmission identifier.

For example, the first NDI may be an NDI of last time of transmission associated with the second transmission identifier.

For example, the first NDI may be an NDI corresponding to data or transmission that is previously received by the first device and that is corresponding to the second transmission identifier.

For example, the first NDI may be an NDI corresponding to data or transmission that is previously received by the first device and that is corresponding to the second HARQ process ID and the second transmission identifier.

Optionally, if the second NDI has been toggled compared with the first NDI, the first device determines that the second data is the newly transmitted data; or if the second NDI is not toggled compared with the first NDI, the first device determines that the second data is the retransmitted data.

For example, as shown in FIG. 12, in a first step, the first device receives data 1 associated with a transmission identifier 1 (for example, a G-RNTI 1) and a HARQ process ID 1, and an NDI associated with this transmission is 1; in a second step, the first device receives data 2 associated with a transmission identifier 2 (for example, a G-RNTI 2) and the HARQ process ID 1, and an NDI associated with this transmission is 0; and in a third step, the first device receives data 3 associated with the transmission identifier 1 (for example, the G-RNTI 1) and the HARQ process ID 1, and an NDI associated with this transmission is 0. An NDI corresponding to data or transmission that is previously received by the first device and that is corresponding to the transmission identifier 1 and the HARQ process ID 1 is the NDI in the first step. Compared with the NDI in the first step, the NDI in the third step is not toggled. The first device determines that the data 3 received in the third step is the retransmitted data.

The first device determines that the data 3 received in the third step is the retransmitted data of the data 1 in the first step.

For example, as shown in FIG. 13, in a first step, the first device receives data 1 associated with a transmission identifier 1 (for example, a G-RNTI 1) and a HARQ process ID 1, and an NDI associated with this transmission is 1; in a second step, the first device receives data 2 associated with a transmission identifier 2 (for example, a G-RNTI 2) and the HARQ process ID 1, and an NDI associated with this transmission is 0; and in a third step, the first device receives data 3 associated with the transmission identifier 1 (for example, the G-RNTI 1) and the HARQ process ID 1, and an NDI associated with this transmission is 0. An NDI corresponding to data or transmission that is previously received by the first device and that is corresponding to the transmission identifier 1 and the HARQ process ID 1 is the NDI in the first step. Compared with the NDI in the first step, the NDI in the third step has been toggled. The first device determines that the data 3 received in the third step is the newly transmitted data.

For example, as shown in FIG. 14, in a first step, the first device receives data 1 associated with a transmission identifier 1 (for example, a G-RNTI 1), and an NDI associated with this transmission is 1; in a second step, the first device receives data 2 associated with a transmission identifier 2 (for example, a G-RNTI2), and an NDI associated with this transmission is 0; and in a third step, the first device receives data 3 associated with the transmission identifier 1 (for example, the G-RNTI 1), and an NDI associated with the transmission is 0. An NDI corresponding to data or transmission that is previously received by the first device and that is corresponding to the transmission identifier 1 is the NDI in the first step. Compared with the NDI in the first step, the NDI in the third step is not toggled. The first device determines that the data 3 received in the third step is the retransmitted data.

The first device determines that the data 3 received in the third step is the retransmitted data of the data 1 in the first step.

For example, as shown in FIG. 15, in a first step, the first device receives data 1 associated with a transmission identifier 1 (for example, a G-RNTI 1), and an NDI associated with this transmission is 1; in a second step, the first device receives data 2 associated with a transmission identifier 2 (for example, a G-RNTI2), and an NDI associated with this transmission is 0; and in a third step, the first device receives data 3 associated with the transmission identifier 1 (for example, the G-RNTI 1), and an NDI associated with the transmission is 0. An NDI corresponding to data or transmission that is previously received by the first device and that is corresponding to the transmission identifier 1 is the NDI in the first step. Compared with the NDI in the first step, the NDI in the third step has been toggled. The first device determines that the data 3 received in the third step is the newly transmitted data.

Optionally, if the second NDI is not toggled compared with the first NDI, the first device determines that the second data is the newly transmitted data; or if the second NDI has been toggled compared with the first NDI, the first device determines that the second data is the retransmitted data.

A manner of determining whether the second data is the newly transmitted data based on whether the NDI is toggled is optional, and may also be set as follows: if the NDI is not toggled, it is determined that the second data is the newly transmitted data; and if the NDI has been toggled, it is determined that the second data is the retransmitted data. According to this solution, whether the data is the newly transmitted data is determined, so that a determining error can be avoided.

Optionally, the application further includes: The first device determines a second NDI.

That the first device determines the second NDI may be understood as that the second NDI may be indicated by the second device to the first device, or may be determined by the first device.

"The second NDI may be indicated by the second device to the first device" may be understood as that the second NDI may be indicated by the second device to the first device by using control information for scheduling second data.

"The second NDI may alternatively be determined by the first device" may be understood as that the first device determines the second NDI based on a preset algorithm 2, a calculation manner 2 indicated by the second device, or a calculation manner 2 specified in the protocol.

"The second NDI may alternatively be determined by the first device" may be understood as that the first device determines the second NDI according to any one or more of the following:
(1) a second resource;
(2) a transmission identifier;
(3) a second HARQ process ID;
(4) a transmission identifier; or
(5) an RNTI.

"The second NDI may alternatively be determined by the first device" may be understood as any one or more of the following cases:
(1) the first device determines that the second NDI is toggled; or
(2) the first device determines that the second NDI is not toggled.

"The first device determines that the second NDI is toggled" may be understood as that the first device determines that the second NDI is toggled compared with the first NDI.

"The first device determines that the second NDI is not toggled" may be understood as that the first device determines that the second NDI does not toggle/is not toggled compared with the first NDI.

"The first device determines that the second NDI is toggled" may be understood as that the first device considers that the second NDI is toggled.

"The first device determines that the second NDI is not toggled" may be understood as that the first device considers that the second NDI is not toggled.

"The first device determines that the second NDI is toggled" and/or "the first device determines that the second NDI is not toggled" may include any one or more of the following cases.

(1) The second resource is a resource scheduled by using DCI/PDCCH scrambled by a first RNTI, and a second HARQ process ID is previously associated with a configured resource or a retransmission resource of the configured resource.

The retransmission resource of the configured resource may be understood as a resource scheduled by using DCI/PDCCH scrambled by a second RNTI.

The first RNTI may be used to schedule any one or more of a dynamic resource, a retransmission resource of the dynamic resource, initial transmission of the dynamic resource, and a retransmission resource of the dynamic resource.

For example, the first RNTI may be any one or more of a C-RNTI, a G-RNTI, a G-C-RNTI, a C-G-RNTI, an M-RNTI, an M-C-RNTI, a C-M-RNTI, a B-RNTI, a B-C-RNTI, or a C-B-RNTI.

The second RNTI may be used for any one or more of the following: activating a configured resource, reactivating the configured resource, deactivating the configured resource, and scheduling a retransmission resource of the configured resource.

For example, the second RNTI may be any one or more of a CS-RNTI, a G-CS-RNTI, a CS-G-RNTI, an M-CS-RNTI, a CS-M-RNTI, a B-CS-RNTI, or a CS-B-RNTI.

(2) Alternatively, the second resource is a resource scheduled by using DCI/PDCCH scrambled by a first RNTI, and a second HARQ process ID and a second transmission identifier are previously associated with a configured resource or a retransmission resource of the configured resource.

(3) Alternatively, the second resource is a resource scheduled by using DCI/PDCCH scrambled by a first RNTI, and a second transmission identifier is previously associated with a configured resource or a retransmission resource of the configured resource.

(4) Alternatively, the first device obtains, for the first time, a second resource corresponding to a second transmission identifier and/or a second HARQ process ID.

That the first device obtains, for the first time, the second resource corresponding to the second transmission identifier and/or the second HARQ process ID may be understood as that the first device receives, for the first time, data corresponding to the second transmission identifier and/or the second HARQ process ID.

"The first device receives, for the first time, the data corresponding to the second transmission identifier and/or the second HARQ process ID" may be understood as one or more of the following: there is no previous time of transmission corresponding to the current time of transmission, there is no previous time of transmission corresponding to the second transmission identifier and/or the second HARQ process ID, there is no previous NDI corresponding to the data, or there is no previous NDI corresponding to the second transmission identifier and/or the second HARQ process ID.

(5) The second resource is a configured resource.

The second resource may be a resource activated or reactivated by using the DCI/PDCCH scrambled by the second RNTI, or may be a resource that does not need to be activated.

(6) The second resource is not preempted by another resource.

"Preempted" may be understood as that the second resource and the another resource overlap or partially overlap in time domain, and the second resource is preempted by the another resource (for example, overlap).

For example, the another resource may be a dynamic resource.

For example, the another resource is a resource scheduled by using the DCI/PDCCH scrambled by the first RNTI or the second RNTI.

Any one or more of (1) to (6) may be understood as follows: regardless of a value of the first NDI, a value of the second NDI, a value of an NDI indicated by the second device to the first device, or whether the previous NDI exists, it is considered that the second NDI has been toggled or is not toggled.

Optionally, the application further includes: The first device determines a second HARQ process.

The second HARQ process is used to process second data, or the second HARQ process is associated with the second data.

That the first device determines the second HARQ process may be understood as that the first device determines the second HARQ process associated with the second data.

That the first device determines the second HARQ process may include any one or more of the following:
(1) the first device associates a second transmission identifier and a second HARQ process ID with the second HARQ process;
(2) the first device associates a second transmission identifier with the second HARQ process;
(3) the first device associates a second HARQ process ID with the second HARQ process;
(4) the first device associates second DCI or a PDCCH with the second HARQ process;
(5) the first device associates a second resource with the second HARQ process;
(6) the first device associates second transmission with the second HARQ process; or
(7) the first device associates the second data with the second HARQ process.

Optionally, the second data is associated with the second transmission.

That the second data is associated with the second transmission may be understood as that transmission corresponding to the second data is the second transmission, or data transmitted in the second transmission is the second data.

That the first device determines the second HARQ process may be understood as that the first device associates any one or more of the second transmission identifier, the second HARQ process ID, the second DCI or the PDCCH, the second resource, the second transmission, and the second data with the second HARQ process.

"Associated with the second HARQ process" may be understood as: being associated with an identifier of the second HARQ process.

"Associated with the HARQ process" may be understood as: updating the association, or releasing the original association and establishing a new association.

Optionally, the first device may maintain the association by using the HARQ process as a reference, or maintain the association by using received information as a reference.

"Maintain" may be understood as any one or more of "store", "update", "delete", "release", and "associate".

The "received information" may be understood as any one or more of data, a transmission identifier, a HARQ process ID, DCI or a PDCCH, a resource, or transmission.

That the first device may maintain the association by using the HARQ process as the reference may be understood as: for the first HARQ process, the first device may at most associate one group of received information.

That the first device may maintain the association by using the HARQ process as the reference may be understood as: for N HARQ processes supported by the first device, the first device may at most associate N groups of received information, where N is an integer greater than or equal to 0 or 1.

The N HARQ processes supported by the first device may be understood as N HARQ processes supported by one HARQ entity of the first device, or N HARQ processes associated with one HARQ entity of the first device.

For example, there previously exist four associations in the first device or there exist four associations in the first device. For example, as shown in FIG. 16, a transmission identifier 1 and a HARQ process ID 0 are associated with a HARQ process 0, the transmission identifier 1 and a HARQ process ID 1 are associated with a HARQ process 1, the transmission identifier 1 and a HARQ process ID 2 are associated with a HARQ process 2, and a transmission identifier 2 and the HARQ process ID 0 are associated with a HARQ process 3. Then, the first device receives data 1 (for example, newly transmitted data) corresponding to the transmission identifier 2 and the HARQ process ID 1, the first device determines to process the data 1 by using the HARQ process 3, and the first device associates the transmission identifier 2 and the HARQ process ID 1 with the HARQ process 3. In this case, the associations existing in the first device are shown in FIG. 17, including: the transmission identifier 1 and the HARQ process ID 0 are associated with the HARQ process 0, the transmission identifier 1 and the HARQ process ID 1 are associated with the HARQ process 1, the transmission identifier 1 and the HARQ process ID 2 are associated with the HARQ process 2, and the transmission identifier 2 and the HARQ process ID 1 are associated with the HARQ process 3.

That the first device associates the transmission identifier 2 and the HARQ process ID 1 with the HARQ process 3 may be understood as that the first device updates the association between the transmission identifier 2 and the HARQ process ID 0 and the HARQ process 3 to the association between the transmission identifier 2 and the HARQ process ID 1 and the HARQ process 3; or the first device releases the association between the transmission identifier 2 and the HARQ process ID 0 and the HARQ process 3, and associates the transmission identifier 2 and the HARQ process ID 1 with the HARQ process 3.

That the first device may maintain the association by using the received information as the reference may be understood as: for the first HARQ process, the first device may associate one or more groups of received information.

That the first device may maintain the association by using the received information as the reference may be understood as: for each group of received information, the first device may at most associate one HARQ process.

That the first device may maintain the association by using the received information as the reference may be understood as: for one group of information received by the first device, the first device may at most associate one HARQ process, or the first device may at most associate the latest HARQ process.

That the first device may maintain the association by using the received information as the reference may be understood as: for M groups of information received by the first device, the first device may at most associate M HARQ processes, where M is an integer greater than or equal to 0 or 1.

The "received group of information" may be understood as any one or more of the second data, the second transmission identifier, the second HARQ process ID, the second DCI or the PDCCH, the second resource, and the second transmission.

The "M groups of information received by the first device" may be understood as M groups of not exactly the same or completely the same information.

In a possible implementation, one association may include a relationship between one or more pieces of information and a HARQ process, and one complete association is considered as one association.

Figure 18:
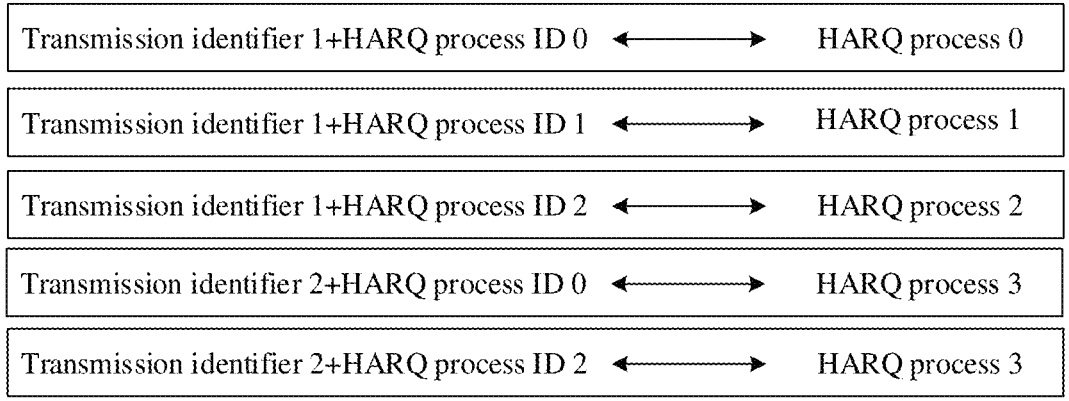

For example, there previously exist four associations in the first device or there exist four associations in the first device. For example, as shown in FIG. 16, a transmission identifier 1 and a HARQ process ID 0 are associated with a HARQ process 0, the transmission identifier 1 and a HARQ process ID 1 are associated with a HARQ process 1, the transmission identifier 1 and a HARQ process ID 2 are associated with a HARQ process 2, and a transmission identifier 2 and the HARQ process ID 0 are associated with a HARQ process 3. Then, the first device receives data 1 (for example, newly transmitted data) corresponding to the transmission identifier 2 and the HARQ process ID 2, the first device determines to process the data 1 by using the HARQ process 3, and the first device associates the transmission identifier 2 and the HARQ process ID 2 with the HARQ process 3. In this case, the associations in the first device are shown in FIG. 18, including: the transmission identifier 1 and the HARQ process ID 0 are associated with the HARQ process 0, the transmission identifier 1 and the HARQ process ID 1 are associated with the HARQ process 1, the transmission identifier 1 and the HARQ process ID 2 are associated with the HARQ process 2, the transmission identifier 2 and the HARQ process ID 0 are associated with the HARQ process 3, and the transmission identifier 2 and the HARQ process ID 2 are associated with the HARQ process 3.

Figure 19:
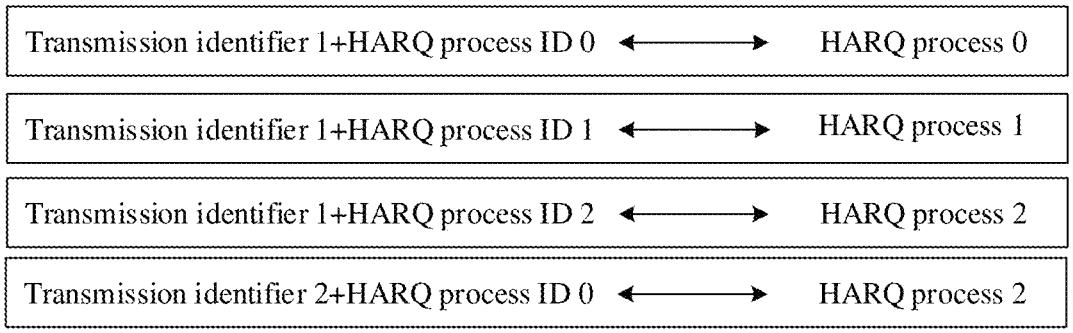

For example, there previously exist four associations in the first device or there exist four associations in the first device. For example, as shown in FIG. 16, a transmission identifier 1 and a HARQ process ID 0 are associated with a HARQ process 0, the transmission identifier 1 and a HARQ process ID 1 are associated with a HARQ process 1, the transmission identifier 1 and a HARQ process ID 2 are associated with a HARQ process 2, and a transmission identifier 2 and the HARQ process ID 0 are associated with a HARQ process 3. Then, the first device receives data 1 (for example, newly transmitted data) corresponding to the transmission identifier 2 and the HARQ process ID 0, the first device determines to process the data 1 by using the HARQ process 2, and the first device associates the transmission identifier 2 and the HARQ process ID 0 with the HARQ process 2. In this case, the associations in the first device are shown in FIG. 19, including: the transmission identifier 1 and the HARQ process ID 0 are associated with the HARQ process 0, the transmission identifier 1 and the HARQ process ID 1 are associated with the HARQ process 1, the transmission identifier 1 and the HARQ process ID 2 are associated with the HARQ process 2, and the transmission identifier 2 and the HARQ process ID 0 are associated with the HARQ process 2.

That the first device associates the transmission identifier 2 and the HARQ process ID 0 with the HARQ process 2 may be understood as that the first device updates the association between the transmission identifier 2 and the HARQ process ID 0 and the HARQ process 3 to the association between the transmission identifier 2 and the HARQ process ID 0 and the HARQ process 2; or the first device releases the association between the transmission identifier 2 and the HARQ process ID 0 and the HARQ process 3, and associates the transmission identifier 2 and the HARQ process ID 0 with the HARQ process 2.

For example, if there is only one HARQ process ID corresponding to the second transmission identifier, the first device only needs to associate the second transmission identifier with the second HARQ process.

For example, if the second transmission identifier corresponds to unicast transmission, the first device may associate only the second HARQ process ID with the second HARQ process.

Optionally, that the first device determines the second HARQ process may include any one or more of the following:
 (1) (the first device or the HARQ entity) allocating or delivering the second data, associated HARQ information, and the second transmission identifier to the second HARQ process;
 (2) (the first device or the HARQ entity) allocating or delivering the second data and associated HARQ information to the second HARQ process;
 (3) (the first device or the HARQ entity) allocating or delivering the second data and the second transmission identifier to the second HARQ process; or
 (4) (the first device or the HARQ entity) allocating or delivering the second data to the second HARQ process.

The associated HARQ information includes at least one of the following: a second HARQ process ID, a second NDI, a second redundancy version (Redundancy Version, RV), and a second transport block size (Transport Block Size, TBS).

The associated HARQ information may be understood as HARQ information associated with any one or more of the second data, the second transmission identifier, the second HARQ process ID, the second DCI, the second resource, and the second transmission.

Optionally, that the first device determines the second HARQ process may include: The first device stores a first correspondence.

The first device stores a first correspondence, where the first correspondence may be any one or more of the following:
 (1) a correspondence between the second data and the second HARQ process;
 (2) a correspondence between the second transmission identifier and the second HARQ process ID and the second HARQ process;
 (3) a correspondence between a second transmission identifier and the second HARQ process;
 (4) a correspondence between a second HARQ process ID and the first HARQ process;
 (5) a correspondence between second downlink control information DCI or a PDCCH and the second HARQ process;
 (6) a correspondence between a second resource and the second HARQ process;
 (7) a correspondence between second transmission and the second HARQ process; or
 (8) a correspondence between any one or more of the second data, a second transmission identifier, a second HARQ process ID, second DCI or a PDCCH, a second resource, or second transmission and the second HARQ process.

"Correspondence with the second HARQ process" may be understood as "a correspondence with an identifier of the second HARQ process".

For example, if there is only one HARQ process ID corresponding to the second transmission identifier, the first correspondence may be a correspondence between the second transmission identifier and the second HARQ process.

For example, if the second transmission identifier corresponds to unicast transmission, the first correspondence may also be a correspondence between the second HARQ process ID and the second HARQ process.

According to this solution, the first device can distinguish between differently groupcast data associated with a same HARQ process ID.

According to this solution, the first device can distinguish between unicast data and groupcast data that are associated with a same HARQ process ID.

Specifically, the first device determines the second HARQ process from HARQ processes that are not occupied by the first device; or the first device determines any HARQ process as the second HARQ process.

That the first device determines any HARQ process as the second HARQ process may be understood as that the first device may select or preempt an occupied HARQ process to process the second data, or may select an unoccupied HARQ process to process the second data.

"Store the correspondence" may be understood as: updating the correspondence, or deleting the original correspondence and storing a new correspondence.

Optionally, the first device may maintain the correspondence by using the HARQ process as a reference, or maintain the correspondence by using received information as a reference.

That the first device may maintain the correspondence by using the HARQ process as the reference may be understood as: for the first HARQ process, the first device may at most associate one first correspondence.

That the first device may maintain the correspondence by using the HARQ process as the reference may be understood as: for N HARQ processes supported by the first device, the first device may store a maximum of N correspondences, where N is an integer greater than or equal to 0 or 1.

In this embodiment of this application, "store" may be understood as "exist".

For example, the first device previously stores four correspondences or the first device stores four correspondences. For example, as shown in FIG. 16, the four correspondences are respectively a correspondence between a transmission identifier 1 and a HARQ process ID 0 and a HARQ process 0, a correspondence between the transmission identifier 1 and a HARQ process ID 1 and a HARQ process 1, a correspondence between the transmission identifier 1 and a HARQ process ID 2 and a HARQ process 2, and a correspondence between a transmission identifier 2 and the HARQ process ID 0 and a HARQ process 3. Then, the first device receives data 1 (for example, newly transmitted data) corresponding to the transmission identifier 2 and the HARQ process ID 1, the first device determines to process the data 1 by using the HARQ process 3, and the first device stores the correspondence between the transmission identifier 2 and the HARQ process ID 1 and the HARQ process 3. In this case, the correspondences stored in the first device are shown in FIG. 17, including: the correspondence between the transmission identifier 1 and the HARQ process ID 0 and the HARQ process 0, the correspondence between the transmission identifier 1 and the HARQ process ID 1 and the HARQ process 1, the correspondence between the transmission identifier 1 and the HARQ process ID 2 and the HARQ process 2, and the correspondence between the transmission identifier 2 and the HARQ process ID 1 and the HARQ process 3.

That the first device stores the correspondence between the transmission identifier 2 and the HARQ process ID 1 and the HARQ process 3 may be understood as that the first device updates the correspondence between the transmission identifier 2 and the HARQ process ID 0 and the HARQ process 3 to the correspondence between the transmission identifier 2 and the HARQ process ID 1 and the HARQ process 3; or the first device deletes the correspondence between the transmission identifier 2 and the HARQ process ID 0 and the HARQ process 3, and stores the correspondence between the transmission identifier 2 and the HARQ process ID 1 and the HARQ process 3.

That the first device may maintain the correspondence by using the received information as the reference may be understood as: for the first HARQ process, the first device may store one or more correspondences.

That the first device may maintain the correspondence by using the received information as the reference may be understood as: for each group of received information, the first device may store a maximum of one correspondence.

That the first device may maintain the correspondence by using the received information as the reference may be understood as: for one group of information received by the first device, the first device may store a maximum of one correspondence, or the first device may store the latest correspondence.

That the first device may maintain the correspondence by using the received information as the reference may be understood as: for M groups of information received by the first device, the first device may store a maximum of M correspondences, where M is an integer greater than or equal to 0 or 1.

In a possible implementation, the first correspondence may include a relationship between one or more pieces of information and a HARQ process, and one complete first correspondence is considered as one correspondence.

For example, the first device previously stores four correspondences or the first device stores four correspondences. For example, as shown in FIG. 16, the four correspondences are respectively a correspondence between a transmission identifier 1 and a HARQ process ID 0 and a HARQ process 0, a correspondence between the transmission identifier 1 and a HARQ process ID 1 and a HARQ process 1, a correspondence between the transmission identifier 1 and a HARQ process ID 2 and a HARQ process 2, and a correspondence between a transmission identifier 2 and the HARQ process ID 0 and a HARQ process 3. Then, the first device receives data 1 (for example, newly transmitted data) corresponding to the transmission identifier 2 and the HARQ process ID 1, the first device determines to process the data 1 by using the HARQ process 3, and the first device stores the correspondence between the transmission identifier 2 and the HARQ process ID 2 and the HARQ process 3. In this case, the correspondences stored in the first device are shown in FIG. 18, including: the correspondence between the transmission identifier 1 and the HARQ process ID 0 and the HARQ process 0, the correspondence between the transmission identifier 1 and the HARQ process ID 1 and the HARQ process 1, the correspondence between the transmission identifier 1 and the HARQ process ID 2 and the HARQ process 2, the correspondence between the transmission identifier 2 and the HARQ process ID 0 and the HARQ process 3, and the correspondence between the transmission identifier 2 and the HARQ process ID 2 and the HARQ process 3.

For example, the first device previously stores four correspondences or the first device stores four correspondences. For example, as shown in FIG. 16, the four correspondences are respectively a correspondence between a transmission identifier 1 and a HARQ process ID 0 and a HARQ process 0, a correspondence between the transmission identifier 1 and a HARQ process ID 1 and a HARQ process 1, a correspondence between the transmission identifier 1 and a HARQ process ID 2 and a HARQ process 2, and a correspondence between a transmission identifier 2 and the HARQ process ID 0 and a HARQ process 3. Then, the first device receives data 1 (for example, newly transmitted data) corresponding to the transmission identifier 2 and the HARQ process ID 0, the first device determines to process the data 1 by using the HARQ process 2, and the first device stores the correspondence between the transmission identifier 2 and the HARQ process ID 0 and the HARQ process 2. In this case, the correspondences stored in the first device are shown in FIG. 19, including: the correspondence between the transmission identifier 1 and the HARQ process ID 0 and the HARQ process 0, the correspondence between the transmission identifier 1 and the HARQ process ID 1 and the HARQ process 1, the correspondence between the transmission identifier 1 and the HARQ process ID 2 and the HARQ process 2, and the correspondence between the transmission identifier 2 and the HARQ process ID 0 and the HARQ process 2.

That the first device stores the correspondence between the transmission identifier 2 and the HARQ process ID 0 and the HARQ process 2 may be understood as that the first device updates the correspondence between the transmission identifier 2 and the HARQ process ID 0 and the HARQ process 3 to the correspondence between the transmission identifier 2 and the HARQ process ID 0 and the HARQ process 2; or the first device deletes the correspondence between the transmission identifier 2 and the HARQ process ID 0 and the HARQ process 3, and stores the correspondence between the transmission identifier 2 and the HARQ process ID 0 and the HARQ process 2.

Optionally, the method further includes: If a third condition is met, the first device may perform any one or more of the following operations: deleting the first correspondence, releasing an association associated with the second HARQ process, releasing the second HARQ process, discarding the second data, clearing a HARQ buffer corresponding to the second HARQ process, considering the second HARQ process as unoccupied, or considering the second HARQ process as available for receiving other data.

The third condition includes any one or more of the following conditions.

(1) The second data is successfully decoded.

(2) Alternatively, the first device feeds back an ACK corresponding to the second data to a second device.

(3) Alternatively, the first device does not feed back a NACK corresponding to the second data to a second device.

If the NACK corresponding to the second data is not fed back to the second device, it may be considered that the second data is successfully received.

(4) Alternatively, transmission of the second data reaches a maximum quantity of times of transmission or a maximum quantity of times of retransmission.

It should be understood that when the maximum quantity of times of transmission or the maximum quantity of times of retransmission is reached, transmission of the data ends, and the transmit end no longer transmits the data.

(5) Alternatively, transmission time of the second data reaches maximum transmission time.

(6) Alternatively, the first device releases the second HARQ process.

(7) Alternatively, the first device clears a second HARQ buffer corresponding to the second HARQ process.

"The first device clears the second HARQ buffer corresponding to the second HARQ process" may be understood as that the first device discards the second data, or the first device discards data corresponding to the second HARQ process.

(8) Alternatively, the first device receives second information, where the second information indicates that transmission stops, and the second information is associated with the second data.

For content related to the second information, refer to the first information. It is only necessary to replace the first information with the second information, replace the first data with the second data, replace the first HARQ process with the second HARQ process, replace the first HARQ process ID with the second HARQ process ID, replace the first transmission identifier with the second transmission identifier, replace the first resource with the second resource, and replace the first transmission with the second transmission for understanding. Details are not described herein again.

The second data associated with the second information may include one or more pieces of second data.

(9) Alternatively, the first device receives newly transmitted data corresponding to the second transmission identifier and the second HARQ process ID.

For content related to "the first device receives the newly transmitted data corresponding to the second transmission identifier and the second HARQ process ID", refer to the content related to that the first device receives the second data. Details are not described herein again.

The "association associated with the second HARQ process" may include any one or more of the following:
(1) the second transmission identifier and the second HARQ process ID are associated with the second HARQ process;
(2) the second transmission identifier is associated with the second HARQ process;
(3) the second HARQ process ID is associated with the second HARQ process;
(4) the second DCI or the PDCCH is associated with the second HARQ process;
(5) the second resource is associated with the second HARQ process;
(6) the second transmission is associated with the second HARQ process;
(7) the second data is associated with the second HARQ process; or
(8) any one or more of the second data, the second transmission identifier, the second HARQ process ID, the second DCI, the second resource, or the second transmission is associated with the second HARQ process.

Specifically, optionally, the first condition includes: The first device receives first information, where the first indication indicates that transmission stops, and the first information is associated with the first data.

The first information is associated with any one or more of first transmission, first data, a first resource, a first HARQ process, a first transmission identifier, a first HARQ process ID, or first DCI or a PDCCH.

Optionally, the "transmission stops" may be understood as that transmission of an MTCH or an SC-MTCH stops, or similar to that transmission of an MTCH or an SC-MTCH stops.

Optionally, the first information indicates that transmission corresponding to the first transmission identifier stops, and the first transmission identifier is associated with the first data.

For example, the first device receives a first message, where the first message indicates that transmission related to the first transmission identifier stops, and the first device performs any one or more of the following: The first device clears a HARQ buffer corresponding to a HARQ process associated with the first transmission identifier, the first device clears a HARQ buffer corresponding to a HARQ process corresponding to a HARQ entity associated with the first transmission identifier, the first device clears HARQ buffers corresponding to all HARQ processes associated with the first transmission identifier, or the first device clears HARQ buffers corresponding to all HARQ processes corresponding to a HARQ entity associated with the first transmission identifier.

For content related to the "related HARQ process", refer to the content related to the "associated with the HARQ process". Details are not described herein again.

For content related to the "associated HARQ entity", refer to the content related to the "associated with the HARQ entity". Details are not described herein again.

Optionally, the first information indicates that transmission corresponding to the first hybrid automatic repeat request process identifier HARQ process ID stops, and the first HARQ process ID is associated with the first data.

For example, the first device receives a first message, where the first message indicates that transmission related to the first HARQ process ID stops, and the first device performs any one or more of the following: The first device clears a HARQ buffer corresponding to a HARQ process associated with the first HARQ process ID, the first device clears a HARQ buffer corresponding to a HARQ process corresponding to a HARQ entity associated with the first HARQ process ID, the first device clears HARQ buffers corresponding to all HARQ processes associated with the first HARQ process ID, or the first device clears HARQ buffers corresponding to all HARQ processes corresponding to a HARQ entity associated with the first HARQ process ID.

Optionally, the first information indicates that transmission corresponding to the first transmission identifier and the first HARQ process ID stops.

For example, the first device receives a first message, where the first message indicates that transmission related to the first transmission identifier and the first HARQ process ID stops, and the first device performs any one or more of the following: The first device clears a HARQ buffer corresponding to a HARQ process associated with the first transmission identifier and the first HARQ process ID, the first device clears a HARQ buffer corresponding to a HARQ process corresponding to a HARQ entity associated with the first transmission identifier and the first HARQ process ID, the first device clears HARQ buffers corresponding to all HARQ processes associated with the first transmission identifier and the first HARQ process ID, or the first device clears HARQ buffers corresponding to all HARQ processes corresponding to a HARQ entity associated with the first transmission identifier and the first HARQ process ID, for example, a HARQ buffer corresponding to the first HARQ process.

The first information indicates that transmission corresponding to a groupcast or a unicast stops, and the groupcast or the unicast is associated with the first data.

For example, the transmission identifier of the first data is a groupcast identifier or a unicast identifier indicated by the first information.

For example, the first device receives a first message, where the first message indicates that transmission related to the groupcast or the unicast stops, and the first device performs any one or more of the following: The first device clears a HARQ buffer corresponding to a HARQ process associated with the groupcast or the unicast indicated by the first information, the first device clears a HARQ buffer corresponding to a HARQ process associated with the groupcast or the unicast, the first device clears a HARQ buffer corresponding to a HARQ process corresponding to a HARQ entity associated with the groupcast or the unicast indicated by the first information, the first device clears a HARQ buffer corresponding to a HARQ process corresponding to a HARQ entity associated with the groupcast or the unicast, the first device clears HARQ buffers corresponding to all HARQ processes associated with the groupcast or the unicast indicated by the first information, the first device clears HARQ buffers corresponding to all HARQ processes associated with the groupcast or the unicast, the first device clears HARQ buffers corresponding to all HARQ processes corresponding to HARQ entities associated with the groupcast or the unicast indicated by the first information, or the first device clears HARQ buffers corresponding to all HARQ processes corresponding to a HARQ entity associated with the groupcast or the unicast.

For example, the first device receives a first message, where the first message indicates that transmission stops, and the first device performs any one or more of the following: The first device clears a HARQ buffer corresponding to a HARQ process associated with the first information, the first device clears a HARQ buffer corresponding to a HARQ process corresponding to a HARQ entity associated with the first information, the first device clears HARQ buffers corresponding to all HARQ processes associated with the first information, or the first device clears HARQ buffers corresponding to all HARQ processes corresponding to a HARQ entity associated with the first information.

It should be understood that the first information may be information that is separately sent by a transmit end and that is independent of the first data, or may be information carried in the first data. This is not limited herein.

The first information may be an RRC layer message, a MAC layer message, or a PHY layer message.

For example, the first information may be a MAC CE, for example, a MAC CE similar to an SC-PTM Stop Indication MAC Control Element, but is not limited to be completely the same.

For example, the first information may be scheduled by a PDDCH/DCI scrambled by the first transmission identifier.

For example, the first information may be a fixed size of 0 bits, or may have a variable size.

For example, the first information may be an empty message.

For example, the first message may be identified by a MAC PDU subheader with an LCID.

For example, the first message may include any one or more of the following information:

(1) a first transmission identifier;
(2) a first HARQ process ID; or
(3) a unicast or groupcast identifier. For example, when a bit is 1, the bit may be understood as the unicast identifier, and when a bit is 0, it may be understood as the groupcast identifier; or when a bit is 0, the bit may be understood as the unicast identifier, and when a bit is 1, it may be understood as the groupcast identifier.

Optionally, after the first device receives the first message, the first device stops monitoring the PDCCH/DCI, and/or the first device indicates that transmission stops to an upper layer/higher layer.

That the first device stops monitoring the PDCCH/DCI may be understood as any one or more of the following:
 (1) the first device stops monitoring PDCCH/DCI associated with the first message; or
 (2) the first device stops monitoring PDCCH/DCI associated with the first transmission identifier.

That the first device stops monitoring the PDCCH/DCI associated with the first message may be understood as that the first message is associated with a third RNTI, and the first device stops monitoring PDCCH/DCI associated with the third RNTI.

The third RNTI may be an RNTI used for a unicast and/or an RNTI used for a groupcast.

For example, the third RNTI may be used for any one or more of the following:
 (1) scheduling a dynamic resource;
 (2) a retransmission resource of the dynamic resource;
 (3) activating a configured resource;
 (4) reactivating the configured resource;
 (5) deactivating the configured resource; or
 (6) scheduling a retransmission resource of the configured resource.

For example, the third RNTI may be any one or more of a C-RNTI, a G-RNTI, a G-C-RNTI, a C-G-RNTI, an M-RNTI, an M-C-RNTI, a C-M-RNTI, a B-RNTI, a C-C-RNTI, a CS-RNTI, a G-CS-RNTI, a CS-G-RNTI, an M-CS-RNTI, a CS-M-RNTI, a B-CS-RNTI, or a CS-B-RNTI.

That the first message is associated with the third RNTI may be understood as any one or more of the following:
 (1) the third RNTI is used to scramble a PDCCH or DCI for scheduling the first message; or
 (2) the first message includes information related to the third RNTI, or the first message includes the third RNTI.

That the first device indicates that transmission stops to the upper layer/higher layer may be understood as any one or more of the following:
 (1) the first device indicates that transmission related to the first message stops to the upper layer/higher layer;
 (2) the first device indicates that a related groupcast session or unicast session stops to the upper layer/higher layer;
 (3) the first device indicates that transmission related to the first transmission identifier stops to the upper layer/higher layer;
 (4) the first device indicates that transmission related to the first HARQ process ID stops to the upper layer/higher layer; or
 (5) the first device indicates that transmission related to the first HARQ process ID and the first transmission identifier stops to the upper layer/higher layer.

This implementation may be applied to a case in which a plurality of or all groupcasts share one HARQ entity, may be applied to a case in which at least one groupcast and at least one unicast share one HARQ entity, or may be applied to a case in which each groupcast or each unicast maintains one HARQ entity.

Specifically, optionally, the first condition includes: The first device receives third data sent in a unicast mode, where the third data is associated with first data, and the first data is sent, transmitted, or received in a groupcast mode.

It should be understood that the third data is retransmitted data or newly transmitted data of the first data.

That the first data is transmitted or received in the groupcast mode may be understood as any one or more of the following: The first device receives the first data, the first device receives the first data sent in the groupcast mode, the first device has received the first data, the first device has received the first data sent in the groupcast mode, the first device fails to receive the first data, or the first device fails to receive the first data sent in the groupcast mode.

That the first device receives the third data may be understood as that the first device receives control information corresponding to the third data.

The control information corresponding to the third data may be third DCI or a PDCCH, and the third DCI or the PDCCH is associated with the third data.

That the third DCI or the PDCCH is associated with the third data may be understood as that the third DCI or the PDCCH is used to schedule the third data.

That the first device receives the third data sent in the unicast mode may be understood as any one or more of the following:
(1) the first device receives the third data on a third resource, where the third resource is a resource associated with the unicast; or
(2) the first device receives the third DCI or the PDCCH scrambled by a fourth RNTI.

That the third resource is the resource associated with the unicast may be understood as that the first device receives a configuration of the second device, and determines, based on the configuration, that the third resource is associated with the unicast.

Optionally, the fourth RNTI may be an RNTI used for the unicast.

For example, the fourth RNTI may be used for any one or more of the following:
(1) scheduling a dynamic resource;
(2) a retransmission resource of the dynamic resource;
(3) activating a configured resource;
(4) reactivating the configured resource;
(5) deactivating the configured resource; or
(6) scheduling a retransmission resource of the configured resource.

For example, the fourth RNTI may be a C-RNTI or a CS-RNTI.

That the third data is associated with the first data may be understood as that the third DCI or the PDDCH includes information related to the first transmission identifier and/or the first HARQ process ID, or includes the first transmission identifier and/or the first HARQ process ID.

That the first data is sent, transmitted, or received in the groupcast mode may be understood as any one or more of the following:
(1) the third data is transmitted on a third resource, where the first resource is a resource associated with the groupcast; or
(2) the first device receives first DCI or a PDCCH scrambled by a fifth RNTI.

That the first resource is the resource associated with the groupcast may be understood as that the first device receives a configuration of the second device, and determines, based on the configuration, that the first resource is associated with the groupcast.

Optionally, the fifth RNTI may be an RNTI used for the groupcast.

For example, the fifth RNTI may be used for any one or more of the following:
(1) scheduling a dynamic resource;
(2) a retransmission resource of the dynamic resource;
(3) activating a configured resource;
(4) reactivating the configured resource;
(5) deactivating the configured resource; or
(6) scheduling a retransmission resource of the configured resource.

For example, the fifth RNTI may be any one or more of a G-RNTI, a G-C-RNTI, a C-G-RNTI, an M-RNTI, an M-C-RNTI, a C-M-RNTI, a B-RNTI, a B-C-RNTI, a C-B-RNTI, a G-CS-RNTI, a CS-G-RNTI, an M-CS-RNTI, a CS-M-RNTI, a B-CS-RNTI, or a CS-B-RNTI.

This implementation may be applied to a case in which the unicast and the groupcast do not share a HARQ entity or one HARQ entity.

For example, the first device receives third data, where the third data is groupcast data sent in a unicast mode, the third data is associated with first data, and the first data is groupcast data or groupcast data received by the first device. The first device clears a HARQ buffer corresponding to a HARQ process associated with the first data.

Specifically, optionally, the first condition includes: The first device processes fourth data by using a first hybrid automatic repeat request entity HARQ entity.

That the first device processes the fourth data by using the first hybrid automatic repeat request entity HARQ entity may be understood as any one or more of the following: The first device no longer uses the first HARQ entity to process the first data, the first device determines that the first device does not need to continue to process the first data by using the first HARQ entity, the first device does not need to continue to process the first data by using the first HARQ entity, or transmission/receiving of the first data ends.

That the first device processes the fourth data by using the first HARQ entity may be understood as any one or more of the following:
(1) the first device receives the fourth data, where the fourth data is associated with the first HARQ entity;
(2) the first device receives the fourth data by using the first HARQ entity; or
(3) the first HARQ entity processes or receives the fourth data.

That the fourth data is associated with the first HARQ entity may be understood as any one or more of the following:
(1) the first device associates the fourth data with the first HARQ entity;
(2) the first device processes or receives the fourth data by using the first HARQ entity; or
(3) the first device determines the first HARQ entity, where the first HARQ entity is configured to process or receive the fourth data, or the first HARQ entity is associated with the fourth data.

"Process or receive the fourth data by using the first HARQ entity" is not limited to: directly receiving the fourth data by using the first HARQ entity, and may be understood as: processing or receiving the fourth data by using a HARQ process maintained or associated with the first HARQ entity.

That the first device determines the first HARQ entity may be understood as that the first device determines the first HARQ entity related to the fourth data.

Optionally, the fourth data is associated with a fourth transmission identifier.

Optionally, the fourth data is associated with a fourth HARQ process ID.

That the fourth data is associated with the fourth HARQ process ID may be understood as that the fourth data is transmitted on a fourth resource, where the fourth resource is associated with the fourth HARQ process ID.

Optionally, the fourth data is associated with fourth transmission.

That the fourth data is associated with the fourth transmission may be understood as that transmission corresponding to the fourth data is the fourth transmission, or data transmitted in the fourth transmission is the fourth data.

That the first device receives the fourth data may be understood as that the first device receives control information corresponding to the fourth data.

The control information corresponding to the fourth data may be fourth DCI or a PDCCH, and the fourth DCI or the PDCCH is associated with the fourth data.

That the fourth DCI or the PDCCH is associated with the fourth data may be understood as that the fourth DCI or the PDCCH is used to schedule the fourth data.

Optionally, the fourth transmission identifier and the fourth HARQ process ID are different from the first transmission identifier and the first HARQ process ID, the fourth transmission identifier is different from the first transmission identifier, or the fourth HARQ process ID is different from the first HARQ process ID.

In this application, a time sequence of "the first device receives the fourth data" and "the fourth data is associated with the first HARQ entity" is not limited, and is not necessarily two actions.

Optionally, the first device no longer uses the first HARQ entity to process the first data, and the first device performs any one or more of the following:
 (1) the first device clears a HARQ buffer corresponding to a HARQ process that is in the first HARQ entity and that is used to process the first data;
 (2) the first device clears a HARQ buffer corresponding to a HARQ process corresponding to the first HARQ entity;
 (3) the first device clears a HARQ buffer corresponding to a HARQ process associated with the first data; or
 (4) the first device clears HARQ buffers corresponding to HARQ processes associated with any one or more of the first DCI or the PDCCH, the first transmission, the first data, the first resource, the first transmission identifier, and the first HARQ process ID.

That the first device receives the fourth data may be understood as that the first device receives, for the first time, data corresponding to the fourth transmission identifier or the fourth data.

Optionally, transmission respectively corresponding to the first transmission identifier and the fourth transmission identifier cannot share one HARQ entity at the same time.

The fourth data is newly transmitted data or retransmitted data.

That the first device processes the fourth data by using the first hybrid automatic repeat request entity HARQ entity may be understood as that the first device processes the fourth data by using the first hybrid automatic repeat request entity HARQ entity for the first time.

For example, the first device receives the fourth data, where the fourth data is associated with the fourth transmission identifier. The first device processes the fourth data by using the first HARQ entity, where the first HARQ entity is associated with the first data/the first transmission identifier. The first device clears a HARQ buffer corresponding to a HARQ process corresponding to the first HARQ entity, the first device clears HARQ buffers corresponding to all HARQ processes corresponding to the first HARQ entity, or the first device clears a HARQ buffer corresponding to a HARQ process corresponding to the first transmission identifier/the first data.

For example, the first device determines that the first HARQ entity is no longer used to process data associated with the first transmission identifier, and the first device performs any one or more of the following: The first device clears a HARQ buffer corresponding to a HARQ process associated with the first HARQ entity, the first device clears HARQ buffers corresponding to all HARQ processes associated with the first HARQ entity, the first device clears a HARQ buffer corresponding to a HARQ process associated with a HARQ entity associated with the first transmission identifier, the first device clears HARQ buffers corresponding to all HARQ processes associated with a HARQ entity associated with the first transmission identifier, the first device clears a HARQ buffer corresponding to a HARQ process associated with the first transmission identifier, or the first device clears HARQ buffers corresponding to all HARQ processes associated with the first transmission identifier.

"The first device processes the fourth data by using the first hybrid automatic repeat request HARQ entity" or "the first device determines the first HARQ entity" may be understood as any one or more of the following:
 (1) the first device associates the fourth transmission identifier and the fourth HARQ process ID with the first HARQ entity;
 (2) the first device associates the fourth transmission identifier with the first HARQ entity;
 (3) the first device associates the fourth HARQ process ID with the first HARQ entity;
 (4) the first device associates the fourth DCI or the PDCCH with the first HARQ entity;
 (5) the first device associates the fourth resource with the first HARQ entity;
 (6) the first device associates the fourth transmission with the first HARQ entity;
 (7) the first device associates any one or more of the fourth data, the fourth transmission identifier, the fourth HARQ process ID, the fourth DCI or the PDCCH, the fourth resource, and the fourth transmission with the first HARQ entity; or
 (8) the first device associates the fourth data with the first HARQ entity.

"Associated with the first HARQ entity" may be understood as: being associated with an identifier of the first HARQ entity.

"Associated with the HARQ entity" may be understood as: updating the association, or releasing the original association and establishing a new association.

Optionally, the first device may maintain the association by using the HARQ entity as a reference, or maintain the association by using received information as a reference.

That the first device may maintain the association by using the HARQ entity as the reference may be understood as: for the first HARQ entity, the first device may at most associate one group of received information.

That the first device may maintain the association by using the HARQ entity as the reference may be understood as: for P HARQ entities supported by the first device, the first device may at most associate P groups of received information, where P is an integer greater than or equal to 0 or 1.

The P HARQ entities supported by the first device may be understood as P HARQ entities included in one MAC entity of the first device, or P HARQ entities associated with one MAC entity of the first device.

The P HARQ entities supported by the first device may be understood as P HARQ entities used for downlink transmission, or P HARQ entities used for downlink transmission for the unicast and/or the groupcast.

Figure 20:
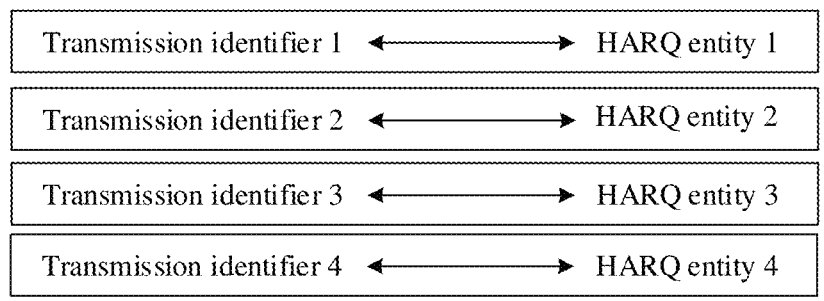
Figure 21:
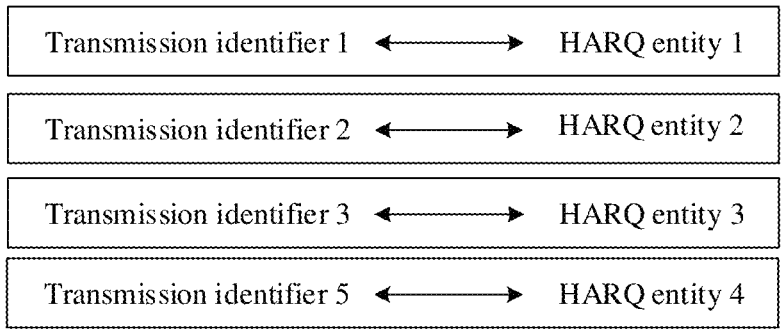

For example, there previously exist four associations in the first device or there exist four associations in the first device. For example, as shown in FIG. 20, a transmission identifier 1 is associated with a HARQ entity 1, a transmission identifier 2 is associated with a HARQ entity 2, a transmission identifier 3 is associated with a HARQ entity 3, and a transmission identifier 4 is associated with a HARQ entity 4. Then, the first device receives data corresponding to a transmission identifier 5, the first device determines to process the data by using the HARQ entity 4, and the first device associates the transmission identifier 5 with the HARQ entity 4. In this case, the associations existing in the first device are shown in FIG. 21, including: the transmission identifier 1 is associated with the HARQ entity 1, the transmission identifier 2 is associated with the HARQ entity 2, the transmission identifier 3 is associated with the HARQ entity 3, and the transmission identifier 5 is associated with the HARQ entity 4.

That the first device associates the transmission identifier 5 with the HARQ entity 4 may be understood as that the first device updates the association between the transmission identifier 4 and the HARQ entity 4 to the association between the transmission identifier 5 and the HARQ entity 4, or the first device releases the association between the transmission identifier 4 and the HARQ entity 4, and associates the transmission identifier 5 with the HARQ entity 4.

That the first device may maintain the association by using the received information as the reference may be understood as: for the first HARQ entity, the first device may associate one or more groups of received information.

That the first device may maintain the association by using the received information as the reference may be understood as: for each group of received information, the first device may at most associate one HARQ entity.

That the first device may maintain the association by using the received information as the reference may be understood as: for one group of information received by the first device, the first device may at most associate one HARQ entity, or the first device may at most associate the latest HARQ entity.

That the first device may maintain the association by using the received information as the reference may be understood as: for Q groups of information received by the first device, the first device may at most associate Q HARQ entities, where Q is an integer greater than or equal to 0 or 1.

The "received group of information" may be understood as any one or more of the fourth data, the fourth transmission identifier, the fourth HARQ process ID, the fourth DCI or the PDCCH, the fourth resource, and the fourth transmission.

The "Q groups of information received by the first device" may be understood as Q groups of not exactly the same or completely the same information.

In a possible implementation, one association may include a relationship between one or more pieces of information and a HARQ entity, and one complete association is considered as one association.

Figure 22:
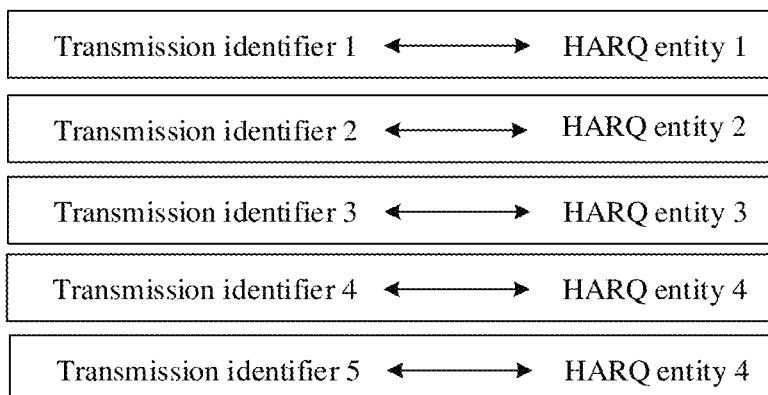

For example, there previously exist four associations in the first device or there exist four associations in the first device. For example, as shown in FIG. 20, a transmission identifier 1 is associated with a HARQ entity 1, a transmission identifier 2 is associated with a HARQ entity 2, a transmission identifier 3 is associated with a HARQ entity 3, and a transmission identifier 4 is associated with a HARQ entity 4. Then, the first device receives data corresponding to a transmission identifier 5, the first device determines to process the data by using the HARQ entity 4, and the first device associates the transmission identifier 5 with the HARQ entity 4. In this case, the associations existing in the first device are shown in FIG. 22, including: the transmission identifier 1 is associated with the HARQ entity 1, the transmission identifier 2 is associated with the HARQ entity 2, the transmission identifier 3 is associated with the HARQ entity 3, the transmission identifier 4 is associated with the HARQ entity 4, and the transmission identifier 5 is associated with the HARQ entity 4.

Figure 23:
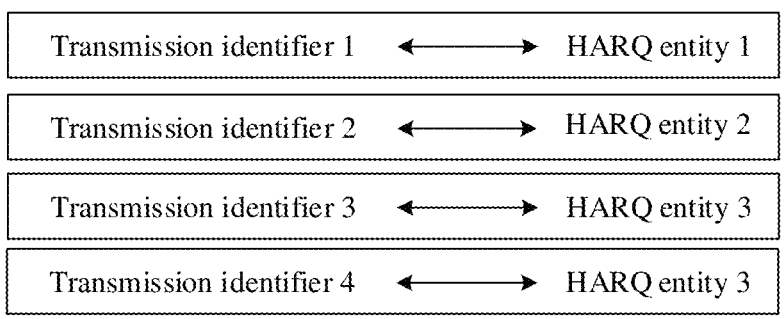

For example, there previously exist four associations in the first device or there exist four associations in the first device. For example, as shown in FIG. 20, a transmission identifier 1 is associated with a HARQ entity 1, a transmission identifier 2 is associated with a HARQ entity 2, a transmission identifier 3 is associated with a HARQ entity 3, and a transmission identifier 4 is associated with a HARQ entity 4. Then, the first device receives data corresponding to the transmission identifier 4, the first device determines to process the data by using the HARQ entity 3, and the first device associates the transmission identifier 4 with the HARQ entity 3. In this case, the associations existing in the first device are shown in FIG. 23, including: the transmission identifier 1 is associated with the HARQ entity 1, the transmission identifier 2 is associated with the HARQ entity 2, the transmission identifier 3 is associated with the HARQ entity 3, and the transmission identifier 4 is associated with the HARQ entity 3.

That the first device associates the transmission identifier 4 with the HARQ entity 3 may be understood as that the first device updates the association between the transmission identifier 4 and the HARQ entity 4 to the association between the transmission identifier 4 and the HARQ entity 3, or the first device releases the association between the transmission identifier 4 and the HARQ entity 4, and associates the transmission identifier 4 with the HARQ entity 3.

Optionally, "the first device processes the fourth data by using the first hybrid automatic repeat request HARQ entity" or "the first device determines the first HARQ entity" may include any one or more of the following:

(1) (the first device or the MAC entity) allocating or delivering the fourth data, associated HARQ information, and the fourth transmission identifier to the first HARQ entity;

(2) (the first device or the MAC entity) allocating or delivering the fourth data and associated HARQ information to the first HARQ entity;

(3) (the first device or the MAC entity) allocating or delivering the fourth data and the fourth transmission identifier to the first HARQ entity;

(4) (the first device or the MAC entity) allocating or delivering the fourth data to the first HARQ entity;

(5) (the first device or the MAC entity) allocating or delivering associated HARQ information and the fourth transmission identifier to the first HARQ entity;

(6) (the first device or the MAC entity) allocating or delivering associated HARQ information to the first HARQ entity;

(7) (the first device or the MAC entity) allocating or delivering the fourth transmission identifier to the first HARQ entity;

(8) (the first device or the MAC entity) allocating or delivering the fourth resource to the first HARQ entity; or (9) (the first device or the MAC entity) allocating or delivering the fourth resource or existence indication of the fourth resource to the first HARQ entity.

The associated HARQ information includes at least one of the following: the fourth HARQ process ID, a fourth NDI, a second redundancy version (Redundancy Version, RV), and a second transport block size (Transport Block Size, TBS).

The associated HARQ information may be understood as HARQ information associated with any one or more of the fourth data, the fourth transmission identifier, the fourth HARQ process ID, the fourth DCI, the fourth resource, and the fourth transmission.

Optionally, the first device may store a second correspondence, and the second correspondence may be any one or more of the following:

(1) a correspondence between the fourth data and the first HARQ entity;

(2) a correspondence between a fourth transmission identifier and a fourth HARQ process ID and the fourth HARQ entity;

(3) a correspondence between a fourth transmission identifier and the first HARQ entity;

(4) a correspondence between a fourth HARQ process ID and the first HARQ entity;

(5) a correspondence between fourth downlink control information DCI or a PDCCH and the first HARQ entity;

(6) a correspondence between a fourth resource and the first HARQ entity;

(7) a correspondence between fourth transmission and the first HARQ entity; or (8) a correspondence between any one or more of the fourth data, a fourth transmission identifier, a fourth HARQ process ID, fourth DCI or a PDCCH, a fourth resource, and fourth transmission and the first HARQ entity.

"Correspondence with the first HARQ process" may be understood as "a correspondence with an identifier of the first HARQ entity".

According to this solution, the first device can distinguish between differently groupcast data associated with a same HARQ process ID.

According to this solution, the first device can distinguish between unicast data and groupcast data that are associated with a same HARQ process ID.

Specifically, the first device determines the first HARQ entity from HARQ entities that are not occupied by the first device; or the first device determines any HARQ entity as the first HARQ entity.

That the first device determines any HARQ entity as the first HARQ entity may be understood as that the first device may select or preempt an occupied HARQ entity to process the fourth data, or may select an unoccupied HARQ entity to process the fourth data.

"Store the correspondence" may be understood as: updating the correspondence, or deleting the original correspondence and storing a new correspondence.

Optionally, the first device may maintain the correspondence by using the HARQ entity as a reference, or maintain the correspondence by using received information as a reference.

That the first device may maintain the correspondence by using the HARQ entity as the reference may be understood as: for the first HARQ entity, the first device may at most associate one second correspondence.

That the first device may maintain the correspondence by using the HARQ entity as the reference may be understood as: for P HARQ entities supported by the first device, the first device may store a maximum of P correspondences, where P is an integer greater than or equal to 0 or 1.

For example, the first device previously stores four correspondences or the first device stores four correspondences. For example, as shown in FIG. 20, the four correspondences are respectively a correspondence between a transmission identifier 1 and a HARQ entity 1, a correspondence between a transmission identifier 2 and a HARQ entity 2, a correspondence between a transmission identifier 3 and a HARQ entity 3, and a correspondence between a transmission identifier 4 and a HARQ entity 4. Then, the first device receives data corresponding to a transmission identifier 5, the first device determines to process the data by using the HARQ entity 4, and the first device stores a correspondence between the transmission identifier 5 and the HARQ entity 4. In this case, the correspondences stored in the first device are shown in FIG. 21, including: the correspondence between the transmission identifier 1 and the HARQ entity 1, the correspondence between the transmission identifier 2 and the HARQ entity 2, the correspondence between the transmission identifier 3 and the HARQ entity 3, and the correspondence between the transmission identifier 5 and the HARQ entity 4.

That the first device stores the correspondence between the transmission identifier 5 and the HARQ entity 4 may be understood as that the first device updates the correspondence between the transmission identifier 4 and the HARQ entity 4 to the correspondence between the transmission identifier 5 and the HARQ entity 4; or the first device deletes the correspondence between the transmission identifier 4 and the HARQ entity 4, and stores the correspondence between the transmission identifier 5 and the HARQ entity 4.

That the first device may maintain the correspondence by using the received information as the reference may be understood as: for the first HARQ entity, the first device may store one or more correspondences.

That the first device may maintain the correspondence by using the received information as the reference may be understood as: for each group of received information, the first device may store a maximum of one correspondence.

That the first device may maintain the correspondence by using the received information as the reference may be understood as: for one group of information received by the first device, the first device may store a maximum of one correspondence, or the first device may store the latest correspondence.

That the first device may maintain the correspondence by using the received information as the reference may be understood as: for Q groups of information received by the first device, the first device may store a maximum of Q correspondences, where Q is an integer greater than or equal to 0 or 1.

The "Q groups of information received by the first device" may be understood as Q groups of not exactly the same or completely the same information.

In a possible implementation, the second correspondence may include a relationship between one or more pieces of information and a HARQ entity, and one complete second correspondence is considered as one correspondence.

For example, the first device previously stores four correspondences or the first device stores four correspondences. For example, as shown in FIG. 20, the four correspondences are respectively a correspondence between a transmission identifier 1 and a HARQ entity 1, a correspondence between a transmission identifier 2 and a HARQ entity 2, a correspondence between a transmission identifier 3 and a HARQ entity 3, and a correspondence between a transmission identifier 4 and a HARQ entity 4. Then, the first device receives data corresponding to a transmission identifier 5, the first device determines to process the data by using the HARQ entity 4, and the first device stores a correspondence between the transmission identifier 5 and the HARQ entity 4. In this case, the correspondences stored in the first device are shown in FIG. 22, including: the correspondence between the transmission identifier 1 and the HARQ entity 1, the correspondence between the transmission identifier 2 and the HARQ entity 2, the correspondence between the transmission identifier 3 and the HARQ entity 3, the correspondence between the transmission identifier 4 and the HARQ entity 4, and the correspondence between the transmission identifier 5 and the HARQ entity 4.

For example, the first device previously stores four correspondences or the first device stores four correspondences. For example, as shown in FIG. 20, the four correspondences are respectively a correspondence between a transmission identifier 1 and a HARQ entity 1, a correspondence between a transmission identifier 2 and a HARQ entity 2, a correspondence between a transmission identifier 3 and a HARQ entity 3, and a correspondence between a transmission identifier 4 and a HARQ entity 4. Then, the first device receives data corresponding to a transmission identifier 4, the first device determines to process the data by using the HARQ entity 3, and the first device stores a correspondence between the transmission identifier 4 and the HARQ entity 3. In this case, the correspondences stored in the first device are shown in FIG. 23, including: the correspondence between the transmission identifier 1 and the HARQ entity 1, the correspondence between the transmission identifier 2 and the HARQ entity 2, the correspondence between the transmission identifier 3 and the HARQ entity 3, and the correspondence between the transmission identifier 4 and the HARQ entity 3.

That the first device stores the correspondence between the transmission identifier 4 and the HARQ entity 3 may be understood as that the first device updates the correspondence between the transmission identifier 4 and the HARQ entity 4 to the correspondence between the transmission identifier 4 and the HARQ entity 3; or the first device deletes the correspondence between the transmission identifier 4 and the HARQ entity 4, and stores the correspondence between the transmission identifier 4 and the HARQ entity 3.

Optionally, the method further includes: If a fourth condition is met, the first device may perform any one or more of the following operations: deleting the second correspondence, releasing an association associated with the first HARQ entity, releasing a HARQ process corresponding to the first HARQ entity, discarding the fourth data, discarding data corresponding to a HARQ process corresponding to the first HARQ entity, clearing a HARQ buffer corresponding to a HARQ process corresponding to the first HARQ entity, considering the first HARQ entity and/or a HARQ process corresponding to the first HARQ entity as unoccupied, or considering the first HARQ entity and/or a HARQ process corresponding to the first HARQ entity as available for receiving other data.

The HARQ process corresponding to the first HARQ entity may be understood as a HARQ process corresponding to the first HARQ entity associated with any one or more of the fourth data, the fourth transmission identifier, the fourth HARQ process ID, the fourth DCI or the PDCCH, the fourth resource, and the fourth transmission.

The fourth condition includes any one or more of the following conditions.

(1) The first device releases the first HARQ entity.

(2) Alternatively, the first device clears the HARQ buffer corresponding to the HARQ process corresponding to the first HARQ entity.

"The first device clears the HARQ buffer corresponding to the HARQ process corresponding to the first HARQ entity" may be understood as that the first device clears HARQ buffers corresponding to all HARQ processes corresponding to the first HARQ entity, the first device discards data corresponding to a HARQ process corresponding to the first HARQ entity, or the first device discards data corresponding to all HARQ processes corresponding to the first HARQ entity.

(3) Alternatively, the first device receives fourth information, where the fourth information indicates that transmission stops, and the fourth information is associated with any one or more of the first HARQ entity, the fourth data, the fourth transmission identifier, the fourth HARQ process ID, the fourth DCI or the PDCCH, the fourth resource, and the fourth transmission.

For content related to the fourth information, refer to the first information. It is only necessary to replace the first information with the fourth information, replace the first data with the fourth data, replace the first HARQ process with the fourth HARQ process, replace the first HARQ process ID with the fourth HARQ process ID, replace the first transmission identifier with the fourth transmission identifier, replace the first resource with the fourth resource, and replace the first transmission with the fourth transmission for understanding. Details are not described herein again.

Data associated with the fourth information/the fourth data may include one or more pieces.

For example, the first device receives a fourth message, where the fourth message indicates that transmission related to the fourth transmission identifier stops, and the fourth transmission identifier is associated with the first HARQ entity. The first device may delete a correspondence between the fourth transmission identifier and the first HARQ entity, release an association between the fourth transmission identifier and the first HARQ entity, discard data corresponding to a HARQ process corresponding to the first HARQ entity, clear a HARQ buffer corresponding to a HARQ process corresponding to the first HARQ entity, consider the first HARQ entity and/or a HARQ process corresponding to the first HARQ entity as unoccupied, or consider the first HARQ entity and/or a HARQ process corresponding to the first HARQ entity as available for receiving other data.

(4) Alternatively, the first device determines to process fifth data by using the first HARQ entity.

For content related to "the first device determines to process the fifth data by using the first HARQ entity", refer to content related to "the first device determines to process the fourth data by using the first hybrid automatic repeat request entity HARQ entity". It is only necessary to replace the fourth data with the fifth data, replace the fourth HARQ process with the fifth HARQ process, replace the fourth HARQ process ID with the fifth HARQ process ID, replace the fourth transmission identifier with the fifth transmission identifier, replace the fourth transmission with the fifth transmission, replace the first data with the fourth data, place the first HARQ process with the fourth HARQ process, place the first HARQ process ID with the fourth HARQ process ID, place the first transmission identifier with the fourth transmission identifier, place the first resource with the fourth resource, and place the first transmission with the fourth transmission for understanding. Details are not described herein again.

The "association associated with the first HARQ entity" may include any one or more of the following:
(1) the fourth transmission identifier and the fourth HARQ process ID are associated with the first HARQ entity;
(2) the fourth transmission identifier is associated with the first HARQ entity;
(3) the fourth HARQ process ID is associated with the first HARQ entity;
(4) the fourth DCI or the PDCCH is associated with the first HARQ entity;
(5) the fourth resource is associated with the first HARQ entity;
(6) the fourth transmission is associated with the first HARQ entity;
(7) the fourth data is associated with the first HARQ entity;
(8) any one or more of the fourth data, the fourth transmission identifier, the fourth HARQ process ID, the fourth DCI or the PDCCH, the fourth resource, and the fourth transmission is associated with the first HARQ entity.

This implementation may be applied to a case in which groupcasts do not share a same HARQ entity, and/or a case in which a groupcast and a unicast do not share a same HARQ entity.

The case in which the groupcasts do not share the same HARQ entity may be understood as a case in which one groupcast and another groupcast do not share a same HARQ entity, and/or a case in which one or more groupcasts and one or more other groupcasts do not share a same HARQ entity.

Specifically, optionally, the first condition includes: The first device releases a multicast radio bearer.

The multicast radio bearer is associated with the first data/first HARQ process/first transmission identifier/TMGI.

The multicast radio bearer may include/be replaced with/be corresponding to any one or more of the following: an MBS radio bearer, a broadcast radio bearer, a groupcast radio bearer, a radio bearer associated with a multicast/groupcast/broadcast/MBS, a radio bearer associated with PTM transmission, or a PTM branch of the multicast/groupcast/broadcast/MBS radio bearer. For example, the multicast radio bearer may be understood as/replaced with a multicast radio bearer, an MBS radio bearer, a broadcast radio bearer, a groupcast radio bearer, a radio bearer associated with a multicast/groupcast/broadcast/MBS, a radio bearer associated with PTM transmission, or a PTM branch of the multicast/groupcast/broadcast/MBS radio bearer.

In a possible scenario, the multicast radio bearer includes a PTP branch and a PTM branch.

For example, the multicast radio bearer may be an MBS radio bearer, an MBMS point to multipoint radio bearer, an MBS point to multipoint radio bearer, a multicast radio bearer, a broadcast radio bearer, or the like.

For ease of description, the multicast radio bearer is referred to as an MRB for short below.

That the MRB is associated with the first data may be understood as that the MRB is associated with the first transmission identifier, and the first data is associated with the first transmission identifier; or the first data is carried on the MRB.

The first data may include/is one or more pieces of or all data associated with the MRB.

For example, that the first device releases the MRB may be understood as that the first device stops receiving data corresponding to the first transmission identifier, that is, the first device stops receiving the first data corresponding to the first transmission identifier; or the first device stops receiving data that is transmitted in the PTM mode and that is corresponding to the first transmission identifier, that is, the first device stops receiving the first data that is transmitted in the PTM mode and that is corresponding to the first transmission identifier.

That the MRB is associated with the first HARQ process may be understood as that an identifier of the MRB or a first transmission identifier corresponding to the MRB/groupcast/multicast/broadcast/MBS session/PTM branch/data corresponding to the PTM branch/data/data transmitted in the PTM mode/data carried by the TMGI or the MRB or data carried by the PTM branch corresponding to the MRB is associated with the first HARQ process.

In a possible implementation, in this embodiment of this application, the MRB may include all MRBs associated with the first transmission identifier (for example, the G-RNTI).

For example, the first device releases all MRBs corresponding to the first transmission identifier, and the first device performs any one or more of the following: clearing a HARQ buffer corresponding to the first HARQ process; releasing the first HARQ process; and releasing a correspondence related to the first HARQ process. The first HARQ process may include a HARQ process (for example, all HARQ processes) corresponding to the first transmission identifier.

It may be understood that any two or more of the MBR, the identifier of the MRB, the first transmission identifier, the groupcast, the multicast, the broadcast, the MBS session, the PTM branch corresponding to the MRB, the data corresponding to the PTM branch corresponding to the MRB, the data corresponding to the MRB, the data that is transmitted in the PTM mode and that is corresponding to the MRB, the TMGI, the data carried by the MRB, and the data carried by the PTM branch corresponding to the MRB may be associated/corresponding to each other.

The first HARQ process is/includes a HARQ process associated with the MRB. For example, the first HARQ process may be/include one or more or all HARQ processes associated with the MRB.

The HARQ process associated with the MRB may include/be replaced with/be understood as: a HARQ process associated with the identifier of the MRB, a HARQ process associated with the first transmission identifier corresponding to the MRB, a HARQ process associated with the groupcast/multicast/broadcast corresponding to the MRB, a HARQ process associated with the MBS session corresponding to the MRB, a HARQ process associated with the PTM branch corresponding to the MRB, a HARQ process associated with the data corresponding to the PTM branch corresponding to the MRB, a HARQ process associated with the data corresponding to the MRB, a HARQ process associated with the data that is transmitted in the PTM mode and that is corresponding to the MRB, a HARQ process associated with the TMGI corresponding to the MRB, a HARQ process associated with the data carried by the MRB, or a HARQ process associated with the data carried by the PTM branch corresponding to the MRB. For example, a first transmission identifier corresponding to one MRB is a G-RNTI 1, and a HARQ process associated with the MRB is a HARQ process associated with the G-RNTI 1.

For example, there previously exist four associations in the first device or there exist four associations in the first device. For example, a transmission identifier 1 and a HARQ process ID 0 are associated with a HARQ process 0, the transmission identifier 1 and a HARQ process ID 1 are associated with a HARQ process 1, the transmission identifier 1 and a HARQ process ID 2 are associated with a HARQ process 2, and a transmission identifier 2 and the HARQ process ID 0 are associated with a HARQ process 3. The first device then releases an MRB associated with the transmission identifier 1. HARQ processes corresponding to the MRB associated with the transmission identifier 1 are the HARQ process 0, the HARQ process 1, and the HARQ process 2. In this case, the first device performs any one or more of the following: clearing HARQ buffers corresponding to the HARQ process 0, the HARQ process 1, and the HARQ process 2; releasing the HARQ process 0, the HARQ process 1, and the HARQ process 2; or releasing the following three correspondences: the association between the transmission identifier 1 and the HARQ process ID 0 and the HARQ process 0, the association between the transmission identifier 1 and the HARQ process ID 1 and the HARQ process 1, and the association between the transmission identifier 1 and the HARQ process ID 2 and the HARQ process 2.

Specifically, that the first device releases the MRB may include/be replaced with any one or more of the following. In other words, the first device releases the MRB when any one or more of the following conditions are met:
(1) the MBS session stops;
(2) the first device loses interest or is no longer interested in the MBS session;
(3) the first device leaves a cell in which the MRB is established;
(4) the first device leaves a corresponding service area or an MBSFN (for example, a Multimedia Broadcast multicast service Single Frequency Network or a Multicast and Broadcast Services Single Frequency Network) service area; and
(5) a capability limitation of the first device (for example, prohibiting receiving of a related service/service) starts.

The MBS session includes any one or more of a groupcast session, a multicast session, and a broadcast session. The MBS session is corresponding to the MRB. For example, when one MBS session stops, the first device releases a corresponding MRB.

The service area or the MBSFN service area is corresponding to the MRB. For example, the first device leaves a service area of one groupcast, and the first device releases an MRB corresponding to the groupcast.

For example, that the capability limitation of the first device starts may include: prohibiting receiving of a service/ groupcast corresponding to the MRB. For example, when the capability limitation of the first device starts, receiving of a groupcast or one groupcast is prohibited, and the first device releases an MRB corresponding to the groupcast.

Optionally, that the first device releases the MRB further includes: The first device determines to perform MAC reset for the MRB.

Optionally, if a condition 1 is met, the first device determines to perform MAC reset for the MRB. The condition 1 is that the first device releases the MRB.

"The first device determines to perform MAC reset" may also be described as that the first device performs MAC reset.

For example, the MAC reset may be an MBS-specific MAC reset.

Optionally, that the first device releases the MRB includes: An RRC layer of the first device releases the MRB.

Optionally, that the first device determines to perform MAC reset for the MRB includes: For the MRB, a MAC layer of the first device determines to perform MAC reset.

Optionally, that the first device clears the first HARQ buffer includes: A MAC layer of the first device clears the first HARQ buffer.

Optionally, that the first device releases the first HARQ process includes: A MAC layer of the first device releases the first HARQ process.

Optionally, that the first device releases the correspondence related to the first HARQ process includes: A MAC layer of the first device releases the correspondence related to the first HARQ process.

"For the MRB" may be understood/include/be replaced with any one or more of the following: an identifier/first transmission identifier/groupcast/multicast/broadcast/MBS session/PTM branch/data corresponding to the PTM branch/ data transmitted in the PTM mode/TMGI/data carried by the MRB/data carried by the PTM branch corresponding to the MRB for the MRB.

It should be noted that "the first device determines to perform MAC reset" does not limit whether the first device has performed MAC reset. For example, "the first device determines to perform MAC reset" may include: The first device is/prepares to perform MAC reset.

Optionally, "the first device determines to perform MAC reset" includes one or more of the following actions: (1) an upper layer of the MAC layer of the first device requests to perform MAC reset; (2) the MAC layer of the first device/ the first device is requested to perform MAC reset; (3) an upper layer of the MAC layer of the first device requests the MAC layer of the first device to perform MAC reset; and (4) the MAC layer of the first device performs MAC reset.

For example, the MAC layer of the first device may be specifically a MAC entity of a terminal.

For example, the upper layer of the MAC layer may be an RRC layer, a radio link control (radio link control, RLC) layer, a packet data convergence protocol (packet data convergence protocol, PDCP) layer, or the like.

It should be noted that, in unicast transmission, when releasing an RB, the first device does not release a HARQ process or clear a HARQ buffer, because data of a plurality of RBs in the unicast may be multiplexed into one piece of data (for example, one MAC PDU or one TB), and a HARQ process corresponding to another unreleased RB cannot be released or a HARQ buffer of the RB cannot be cleared due to releasing of one RB.

Specifically, optionally, the first condition includes: The first device receives a unicast indication; or for a groupcast, the first device receives a unicast indication.

The unicast indication is associated with the first data/first HARQ process.

"For the groupcast" may be understood/include/be replaced with any one or more of the following: data/groupcast transmission/MRB/identifier of the MRB/first transmission identifier/groupcast/multicast/broadcast/MBS session/data/TMGI/MRB bearer data for the groupcast.

The first HARQ process is/includes a HARQ process associated with the unicast indication, or a HARQ process associated with the unicast indication and a groupcast/PTM transmission mode. For example, the first HARQ process may be/include one or more or all HARQ processes associated with the unicast indication, or one or more or all HARQ processes associated with the unicast indication and the groupcast/PTM transmission mode.

The HARQ process associated with the unicast indication may include/be replaced with/be understood as: a HARQ process associated with groupcast data/groupcast transmission corresponding to the unicast indication, a HARQ process associated with an identifier of the MRB/the MRB corresponding to the unicast indication, a HARQ process associated with a first transmission identifier corresponding to the unicast indication, a HARQ process associated with a groupcast/multicast/broadcast corresponding to the unicast indication, a HARQ process associated with an MBS session corresponding to the unicast indication, a HARQ process associated with data corresponding to the unicast indication, a HARQ process associated with data that is corresponding to a TMGI and that is corresponding to the unicast indication, or a HARQ process associated with data that is carried by the MRB and that is corresponding to the unicast indication. For example, a first transmission identifier corresponding to the unicast indication is a G-RNTI 1, and the HARQ process associated with the unicast indication is a HARQ process associated with the G-RNTI 1.

The unicast indication may include any one or more of the following:
(1) for the groupcast, an indication that a sending mode is PTP transmission;
(2) for the groupcast, an indication that a sending mode is changed from PTM transmission to PTP transmission.
(3) for the groupcast, an indication that a sending mode is changed from PTM transmission and PTP transmission to PTP transmission.
(4) for the groupcast, activating any one or more of the following: a sending mode of PTP transmission, detection of an RNTI (for example, a C-RNTI) related to PTP transmission, or an indication of a configuration related to PTP transmission;
(5) for the groupcast, deactivating any one or more of the following: a sending mode of PTP transmission, detection of an RNTI (for example, a G-RNTI) related to PTM transmission, or an indication of a configuration related to PTM transmission;
(6) for the groupcast, a configuration related to PTP transmission; or
(7) for the groupcast, data sent in a unicast/PTP mode.

It should be understood that, after receiving the unicast indication, the first device may determine that the second device is to send data related to the groupcast in the unicast/PTP mode. It should be understood that before the first device receives the unicast indication information, the second device may send the data related to the groupcast in the groupcast/PTM mode, or may send the data related to the groupcast in the groupcast/PTM mode and the unicast/PTP mode.

The groupcast can be understood as one groupcast.

The sending mode may be understood as a transmission mode.

"Change" can be considered as "hand over".

"Activate" can be considered as "enable". "Deactivate" can be considered as "disable", "release", "delete", and "clear".

Optionally, the unicast indication is associated with the first transmission identifier; the unicast indication is associated with the first HARQ process ID; the unicast indication is associated with the first transmission identifier and the first HARQ process ID; or the unicast indication is associated with the first transmission identifier, the first HARQ process ID, and the first data. Optionally, the first transmission identifier is a groupcast identifier.

That the unicast indication is associated with the first transmission identifier includes: The unicast indication indicates that data corresponding to the first transmission identifier is sent in the unicast/PTP mode. That the unicast indication is associated with the first HARQ process ID includes: The unicast indication indicates that the first data corresponding to the first HARQ process ID is sent in the unicast/PTP mode.

Specifically, the unicast indication may be a point-to-point (point to point, PTP) indication.

Optionally, the unicast indication may be an explicit indication, or may be an implicit indication. For example, the unicast indication may be included in any one of the following: DCI, a MAC CE, RRC (for example, in a reconfiguration message), a broadcast message, and the like.

Optionally, the implicit indication may include the following cases:
(1) DCI scrambled by a fourth RNTI (for example, a C-RNTI) is received, where an indication in the DCI is associated with the first data; and
(2) a subheader of received MAC PDU includes an LCID or groupcast information (for example, a G-RNTI) corresponding to the first transmission identifier (or a groupcast identifier or a groupcast). The MAC PDU is scheduled by using the DCI scrambled by the fourth RNTI (for example, the C-RNTI).

That the unicast indication is associated with the first HARQ process may be understood as that a groupcast/groupcast data/groupcast transmission/MRB/an identifier of the MRB/first transmission identifier/groupcast/multicast/broadcast/MBS session/data/TMGI/data carried by the MRB corresponding to the unicast indication is associated with the first HARQ process.

For example, the HARQ process 0, the HARQ process 1, and the HARQ process 2 are corresponding to the data that is transmitted in the groupcast/PTM mode and that is associated with the transmission identifier 1, and the HARQ process 3 is corresponding to the data that is transmitted in the groupcast/PTM mode and that is associated with the transmission identifier 2. Then, the first device receives a unicast indication associated with the transmission identifier 1. HARQ processes associated with the unicast indication associated with the transmission identifier 1 and the groupcast/PTM transmission mode is the HARQ process 0, the HARQ process 1, and the HARQ process 2. In this case, the first device performs any one or more of the following: clearing HARQ buffers corresponding to the HARQ process 0, the HARQ process 1, and the HARQ process 2; releasing the HARQ process 0, the HARQ process 1, and the HARQ process 2; or releasing the following three correspondences:

the association between the transmission identifier 1 and the HARQ process ID 0 and the HARQ process 0, the association between the transmission identifier 1 and the HARQ process ID 1 and the HARQ process 1, and the association between the transmission identifier 1 and the HARQ process ID 2 and the HARQ process 2.

Specifically, optionally, the first condition includes: The first device receives first data sent in a unicast/PTP mode.

The first data is groupcast data. Alternatively, the first data is associated with a first transmission identifier, and the first transmission identifier is a groupcast identifier.

The first HARQ process is/includes a HARQ process associated with first data sent in a groupcast/PTM mode.

It should be understood that, when the first device receives the first data sent in the unicast/PTP mode, the first device may determine that the second device no longer sends the first data in the groupcast/PTM mode. It should be understood that before the first device receives the first data sent in the unicast/PTP mode, the second device may send the first data in the groupcast/PTM mode.

"The first device receives the first data sent in the unicast/PTP mode" may include that the first device receives control information (for example, DCI) corresponding to the first data sent in the unicast/PTP mode, or the first device successfully decodes the first data sent in the unicast/PTP mode.

For example, there previously exist two associations in the first device or there exist two associations in the first device. For example, a transmission identifier 1 and a HARQ process ID 0 are associated with a HARQ process 0, which is corresponding to data 1 transmitted in the multicast/PTM mode. The transmission identifier 1 and the HARQ process ID 1 are associated with the HARQ process 1, which is corresponding to data 2 transmitted in the multicast/PTM mode. Then, the first device receives the data 1 transmitted in the unicast/PTP mode. A HARQ process corresponding to the data 1 transmitted in the groupcast/PTM mode is the HARQ process 0. In this case, the first device performs any one or more of the following: clearing a HARQ buffer corresponding to the HARQ process 0; releasing the HARQ process 0; and releasing the following correspondence between the transmission identifier 1 and the HARQ process ID 0 and the HARQ process 0.

Specifically, optionally, the first condition includes: The first device receives a groupcast indication; or for a groupcast, the first device receives a groupcast indication.

The groupcast indication is associated with the first data/first HARQ process.

The first HARQ process is/includes a HARQ process associated with the groupcast indication, or a HARQ process associated with the groupcast indication and a unicast/PTP transmission mode. For example, the first HARQ process may be/include one or more or all HARQ processes associated with the groupcast indication, or one or more or all HARQ processes associated with the groupcast indication and the unicast/PTP transmission mode.

The HARQ process associated with the groupcast indication may include/be replaced with/be understood as: a HARQ process associated with groupcast data/groupcast transmission corresponding to the groupcast indication, a HARQ process associated with an identifier of the MRB/the MRB corresponding to the groupcast indication, a HARQ process associated with a first transmission identifier corresponding to the groupcast indication, a HARQ process associated with a groupcast/multicast/broadcast corresponding to the groupcast indication, a HARQ process associated with an MBS session corresponding to the groupcast indication, a HARQ process associated with data corresponding to the groupcast indication, a HARQ process associated with data that is corresponding to a TMGI and that is corresponding to the groupcast indication, or a HARQ process associated with data that is carried by the MRB and that is corresponding to the groupcast indication. For example, a first transmission identifier corresponding to the groupcast indication is a G-RNTI 1, and the HARQ process associated with the groupcast indication is a HARQ process associated with the G-RNTI 1.

The groupcast indication may include any one or more of the following:
(1) for the groupcast, an indication that a sending mode is PTM transmission;
(2) for the groupcast, an indication that a sending mode is changed from PTP transmission to PTM transmission.
(3) for the groupcast, an indication that a sending mode is changed from PTM transmission and PTP transmission to PTM transmission.
(4) for the groupcast, activating any one or more of the following: a sending mode of PTM transmission, detection of an RNTI (for example, a G-RNTI) related to PTM transmission, or an indication of a configuration related to PTM transmission;
(5) for the groupcast, deactivating any one or more of the following: a sending mode of PTP transmission, detection of an RNTI (for example, a C-RNTI) related to PTP transmission, or an indication of a configuration related to PTP transmission;
(6) for the groupcast, a configuration related to PTM transmission; or
(7) for the groupcast, data sent in a groupcast/PTM mode.

It should be understood that, after receiving the groupcast indication, the first device may determine that the second device is to send data related to the groupcast in the groupcast/PTM mode. It should be understood that before the first device receives the groupcast indication information, the second device may send the data related to the unicast in the groupcast/PTP mode, or may send the data related to the groupcast in the groupcast/PTM mode and the unicast/PTP mode.

Optionally, the groupcast indication is associated with the first transmission identifier; the groupcast indication is associated with the first HARQ process ID; the groupcast indication is associated with the first transmission identifier and the first HARQ process ID; or the groupcast indication is associated with the first transmission identifier, the first HARQ process ID, and the first data. Optionally, the first transmission identifier is a groupcast identifier.

That the groupcast indication is associated with the first transmission identifier includes: The groupcast indication indicates that data corresponding to the first transmission identifier is sent in the groupcast/PTM mode. That the groupcast indication is associated with the first HARQ process ID includes: The groupcast indication indicates that the first data corresponding to the first HARQ process ID is sent in the groupcast/PTM mode.

Specifically, the groupcast indication may be a point-to-multipoint (point to multiple points, PTM) indication.

Optionally, the groupcast indication may be an explicit indication, or may be an implicit indication. For example, the groupcast indication may be included in any one of the following: DCI, a MAC CE, RRC (for example, in a reconfiguration message), a broadcast message (for example, system information or groupcast control information), and the like.

Optionally, the implicit indication may include: receiving DCI scrambled by a fifth RNTI (for example, a G-RNTI), where the fifth RNTI is associated with the first data.

That the groupcast indication is associated with the first HARQ process may be understood as that a groupcast/groupcast data/groupcast transmission/MRB/identifier of the MRB/first transmission identifier/groupcast/multicast/broadcast/MBS session/data/TMGI/data carried by the MRB corresponding to the groupcast indication is associated with the first HARQ process.

For example, the HARQ process 0, the HARQ process 1, and the HARQ process 2 are corresponding to the data that is transmitted in the unicast/PTP mode and that is associated with the transmission identifier 1, and the HARQ process 3 is corresponding to the data that is transmitted in the unicast/PTP mode and that is associated with the transmission identifier 2. Then, the first device receives a groupcast indication associated with the transmission identifier 1. HARQ processes associated with the groupcast indication associated with the transmission identifier 1 and the unicast/PTP transmission mode is the HARQ process 0, the HARQ process 1, and the HARQ process 2. In this case, the first device performs any one or more of the following: clearing HARQ buffers corresponding to the HARQ process 0, the HARQ process 1, and the HARQ process 2; releasing the HARQ process 0, the HARQ process 1, and the HARQ process 2; or releasing the following three correspondences: an association between (transmission identifier 1)+(C-RNTI)+HARQ process ID 0 and the HARQ process 0, an association between (transmission identifier 1)+(C-RNTI)+HARQ process ID 1 and the HARQ process 1, and an association between (transmission identifier 1)+(C-RNTI)+HARQ process ID 2 and the HARQ process 2. It should be noted that the association with the HARQ process may not include the transmission identifier and/or the C-RNTI. In addition, the association with the HARQ process may include an indication of the unicast/PTP transmission mode.

Specifically, optionally, the first condition includes: The first device receives first data sent in a groupcast/PTM mode. The first data is groupcast data. Alternatively, the first data is associated with a first transmission identifier, and the first transmission identifier is a groupcast identifier.

The first HARQ process is/includes a HARQ process associated with first data sent in a unicast/PTP mode.

It should be understood that, when the first device receives the first data sent in the groupcast/PTM mode, the first device may determine that the second device no longer sends the first data in the unicast/PTP mode. It should be understood that before the first device receives the first data sent in the groupcast/PTM mode, the second device may send the first data in the unicast/PTP mode.

"The first device receives the first data sent in the groupcast/PTM mode" may include that the first device receives control information (for example, DCI) corresponding to the first data sent in the groupcast/PTM mode, or the first device successfully decodes the first data sent in the groupcast/PTM mode.

For example, the HARQ process 0 is corresponding to data 1 transmitted in the unicast/PTP mode, and the HARQ process 1 is corresponding to data 2 transmitted in the unicast/PTP mode. Then, the first device receives the data 1 transmitted in the groupcast/PTM mode. A HARQ process corresponding to the data 1 transmitted in the unicast/PTP mode is the HARQ process 0. In this case, the first device performs any one or more of the following: clearing a HARQ buffer corresponding to the HARQ process 0; releasing the HARQ process 0; and releasing the following correspondence between (transmission identifier 1)+(C-RNTI)+the HARQ process ID 0 and the HARQ process 0. It should be noted that the association with the HARQ process may not include the transmission identifier and/or the C-RNTI. In addition, the association with the HARQ process may include an indication of the unicast/PTP transmission mode.

Specifically, optionally, the first condition includes: The first device receives third information, where the third information is used to indicate to release the first HARQ process, clear a buffer of the first HARQ process, and/or release a correspondence related to the first HARQ process.

For example, the third information may be indication information sent by the second device, and the third information may be information such as DCI, a MAC CE, RRC (for example, in a reconfiguration message), or a broadcast message.

The third information may explicitly or implicitly indicate to release the first HARQ process, clear a buffer of the first HARQ process, and/or release a correspondence related to the first HARQ process.

The first HARQ process may include any one or more of the following:
(1) a HARQ process associated with a first transmission identifier;
(2) a HARQ process associated with a first transmission identifier and a first HARQ process ID; or
(3) a HARQ process associated with any one or more of first data, a first transmission identifier, a first HARQ process ID, first DCI or a PDCCH, a first resource, a first transmission, and third information.

Specifically, optionally, the first condition includes: For the first transmission identifier, the first device determines to perform MAC reset.

The first HARQ process is/includes a HARQ process associated with the first transmission identifier. For example, the first HARQ process may be/include one or more or all HARQ processes associated with the first transmission identifier.

The HARQ process associated with the first transmission identifier may include/be replaced with/be understood as: a HARQ process associated with groupcast/groupcast data/groupcast transmission corresponding to the first transmission identifier, a HARQ process associated with an identifier of the MRB/the MRB corresponding to the first transmission identifier, a HARQ process associated with a groupcast/multicast/broadcast corresponding to the first transmission identifier, a HARQ process associated with an MBS session corresponding to the first transmission identifier, a HARQ process associated with data corresponding to the first transmission identifier, a HARQ process that is associated with a TMGI and that is corresponding to the first transmission identifier, or a HARQ process that is associated with data carried by the MRB and that is corresponding to the first transmission identifier. For example, the groupcast corresponding to one first transmission identifier is a groupcast 1, and the HARQ process associated with the first transmission identifier is a HARQ process associated with the groupcast 1.

"For the first transmission identifier" may be understood/include/be replaced with any one or more of the following: an identifier of the MRB/groupcast/multicast/broadcast/MBS session/PTM branch/data corresponding to the PTM branch/data transmitted in the PTM mode/TMGI/data carried by the MRB/data carried by the PTM branch corresponding to the MRB for the MRB.

For example, there previously exist four associations in the first device or there exist four associations in the first device. For example, a transmission identifier 1 and a HARQ process ID 0 are associated with a HARQ process 0, the transmission identifier 1 and a HARQ process ID 1 are associated with a HARQ process 1, the transmission identifier 1 and a HARQ process ID 2 are associated with a HARQ process 2, and a transmission identifier 2 and the HARQ process ID 0 are associated with a HARQ process 3. Then, the first device determines to perform MAC reset for the transmission identifier 1. HARQ processes associated with the transmission identifier 1 are the HARQ process 0, the HARQ process 1, and the HARQ process 2. In this case, the first device performs any one or more of the following: clearing HARQ buffers corresponding to the HARQ process 0, the HARQ process 1, and the HARQ process 2; releasing the HARQ process 0, the HARQ process 1, and the HARQ process 2; or releasing the following three correspondences: the association between the transmission identifier 1 and the HARQ process ID 0 and the HARQ process 0, the association between the transmission identifier 1 and the HARQ process ID 1 and the HARQ process 1, and the association between the transmission identifier 1 and the HARQ process ID 2 and the HARQ process 2.

Optionally, before the first device determines to perform MAC reset, the method further includes: The first device releases the MRB. The MRB is associated with the first transmission identifier.

Specifically, optionally, the first condition includes: Transmission of data corresponding to the first HARQ process succeeds or ends.

That the first condition is met may be understood as any one or more of the following: The first device no longer uses the first HARQ process to process the first data, the first device determines that the first device does not need to continue to process the first data by using the first HARQ process, the first device does not need to continue to process the first data by using the first HARQ process, or transmission/receiving of the first data ends.

This embodiment can resolve the problem 1 or the problem 6.

This embodiment may be used to clear the HARQ buffer, release the HARQ process, and release the correspondence related to the HARQ process.

In the technical solutions provided in embodiments of this application, if the first condition is met, or if the first condition and the second condition are met, the first device performs any one or more of the following: clearing the HARQ buffer corresponding to the first HARQ process, releasing the first HARQ process, and releasing the correspondence related to the first HARQ process. This can release the buffer, so that a quantity of HARQ processes used by the first device to process other data can be increased, and data transmission efficiency can be improved. This can prevent the first device from incorrectly clearing/overwriting data or incorrectly using the HARQ process, thereby ensuring data receiving reliability and improving data transmission performance.

Figure 24:
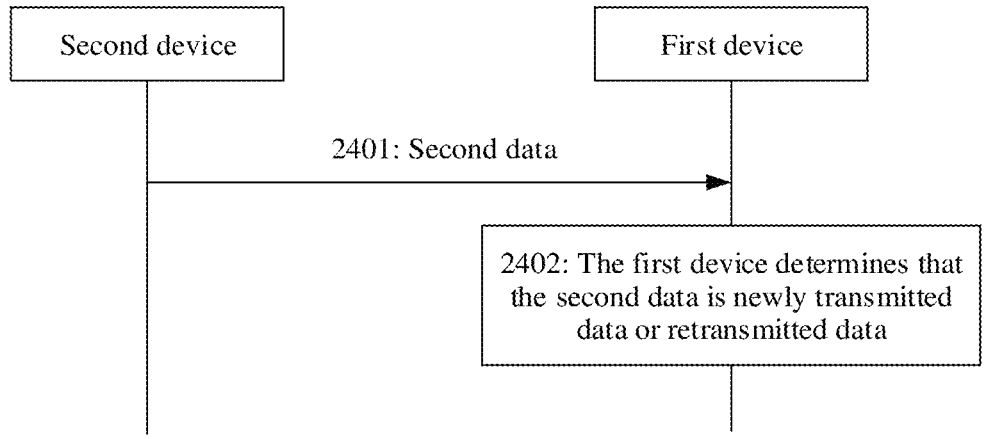
FIG. 24 is a schematic flowchart of another communication method according to an embodiment of this application.

FIG. 24 is a schematic diagram of another embodiment of a communication method 2400 according to an embodiment of this application. The method 2400 includes the following steps:

2401: A first device receives second data.

2402: The first device determines that the second data is newly transmitted data or retransmitted data.

That the first device determines that the second data is the newly transmitted data or retransmitted data may be understood as that the first device determines that second transmission is new transmission or retransmission.

Optionally, that the first device determines that the second data is the newly transmitted data includes: The first device determines, based on a second transmission identifier and/or a second HARQ process ID, that the second data is the newly transmitted data.

Optionally, that the first device determines that the second data is the retransmitted data includes: The first device determines, based on a second transmission identifier and/or a second HARQ process ID, that the second data is the retransmitted data.

For content related to this embodiment, refer to the related content in the embodiment shown in FIG. 8. Details are not described herein again.

For content related to "determining that the second data is the retransmitted data", "determining that the second data is the newly transmitted data" in the embodiment in FIG. 8 may be replaced with "determining that the second data is the retransmitted data" for understanding.

That the first device determines, based on the second transmission identifier and/or the second HARQ process ID, that the second data is the retransmitted data may be understood as: when the first device judges/determines whether the second data is the newly transmitted data or the retransmitted data, the first device considers the second transmission identifier and/or the second HARQ process ID.

Optionally, that the first device determines that the second data is the retransmitted data includes: The first device determines, based on the second transmission identifier, the second HARQ process ID, and a second new data indicator NDI, that the second data is the retransmitted data.

That the first device determines, based on the second transmission identifier, the second HARQ process ID, and the second new data indicator NDI that the second data is the retransmitted data may be understood as: when the first device judges/determines whether the second data is the newly transmitted data or the retransmitted data, the first device considers the second transmission identifier, the second HARQ process ID, and the second NDI.

Specifically, "the first device determines, based on the second transmission identifier, the second HARQ process ID, and the second new data indicator NDI corresponding to the second data, that the second data is the retransmitted data" may be understood as that the first device determines, based on the second NDI and the first NDI, that the first data is the retransmitted data.

Optionally, if the first device receives, for the first time, data corresponding to the second transmission identifier and/or the second HARQ process ID, the first device determines that the second data is the newly transmitted data.

"The first device receives, for the first time, data corresponding to the second transmission identifier and/or the second HARQ process ID" may be understood as one or more of the following: there is no previous time of transmission corresponding to the current time of transmission, there is no previous time of transmission corresponding to the second transmission identifier and/or the second HARQ process ID, there is no previous NDI corresponding to the data, or there is no previous NDI corresponding to the second transmission identifier and/or the second HARQ process ID.

Optionally, that the first device determines that the second data is the retransmitted data includes: The first device determines, based on the second transmission identifier and the second new data indicator NDI, that the second data is the retransmitted data.

That the first device determines, based on the second transmission identifier and the second new data indicator NDI that the second data is the retransmitted data may be understood as: when the first device judges/determines whether the second data is the newly transmitted data or the retransmitted data, the first device considers the second transmission identifier and the second NDI.

Specifically, "the first device determines, based on the second transmission identifier and the second new data indicator NDI corresponding to the second data, that the second data is the retransmitted data" may be understood as that the first device determines, based on the second NDI and the first NDI, that the first data is the retransmitted data.

Optionally, if the second NDI has been toggled compared with the first NDI, the first device determines that the second data is the newly transmitted data; or if the second NDI is not toggled compared with the first NDI, the first device determines that the second data is the retransmitted data.

Optionally, if the second NDI has been toggled compared with the first NDI, the first device determines that the second data is the newly transmitted data; or if the second NDI is not toggled compared with the first NDI, the first device determines that the second data is the retransmitted data.

A sequence of "the first device receives second data" and "the first device determines that the second data is newly transmitted data or retransmitted data" is not limited in this embodiment of this application, and is not necessarily two actions.

This embodiment may be applied to a case in which a plurality of or all groupcasts share one HARQ entity, or may be applied to a case in which a groupcast and a unicast share one HARQ entity.

This embodiment can resolve the problem 2.

This embodiment is used to determine whether received data is the newly transmitted data or the retransmitted data, or used to determine whether one transmission is new transmission or retransmission.

According to the method shown in this embodiment, the first device may correctly judge/determine whether one transmission is new transmission or retransmission. If the transmission is new transmission, the first device may receive corresponding data by using one HARQ process. If the transmission is retransmission, the first device needs to perform combination and decoding on corresponding retransmitted data and newly transmitted data, so that data transmission reliability can be improved.

Figure 25:
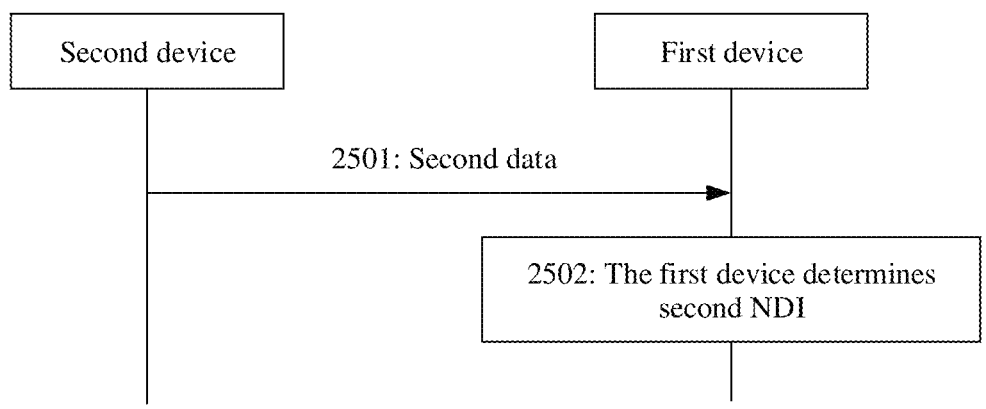
FIG. 25 is a schematic flowchart of another communication method according to an embodiment of this application.

FIG. 25 is a schematic diagram of another embodiment of a communication method 2500 according to an embodiment of this application. The method 2500 includes the following steps.

2501: A first device receives second data, or a first device obtains a second resource.

The second data may be newly transmitted data or retransmitted data.

The second resource may be a resource used for new transmission or a resource used for retransmission.

"Obtain" may be understood as "receive".

The second resource may be a resource used for a unicast or a resource used for a groupcast.

The second resource may be any one or more of the following:

(1) a downlink resource;
(2) a downlink configuration allocation resource;
(3) a downlink first-type configuration allocation resource;
(4) a downlink second-type configuration allocation resource;
(5) a downlink dynamic allocation resource; or
(6) a downlink configuration allocation resource set.

2502: The first device determines a second NDI.

For content related to this embodiment, refer to the related content in the embodiment shown in FIG. 8. Details are not described herein again.

A sequence of "a first device receives second data, or a first device obtains a second resource" and "the first device determines a second NDI" is not limited in this embodiment of this application, and is not necessarily two actions.

This embodiment may be applied to a case in which a plurality of or all groupcasts share one HARQ entity, may be applied to a case in which a groupcast and a unicast share one HARQ entity, or may be applied to a case in which each groupcast or each unicast maintains one HARQ entity.

This embodiment can resolve the problem 5.

This embodiment is used to determine the NDI, or determine a second NDI associated with the second resource, or determine a second NDI associated with the second data.

According to the method shown in this embodiment, the first device determines the second NDI related to the second data or the second resource, and the first device may determine, based on the second NDI and another factor, whether the second data is the newly transmitted data or the retransmitted data.

Figure 26:
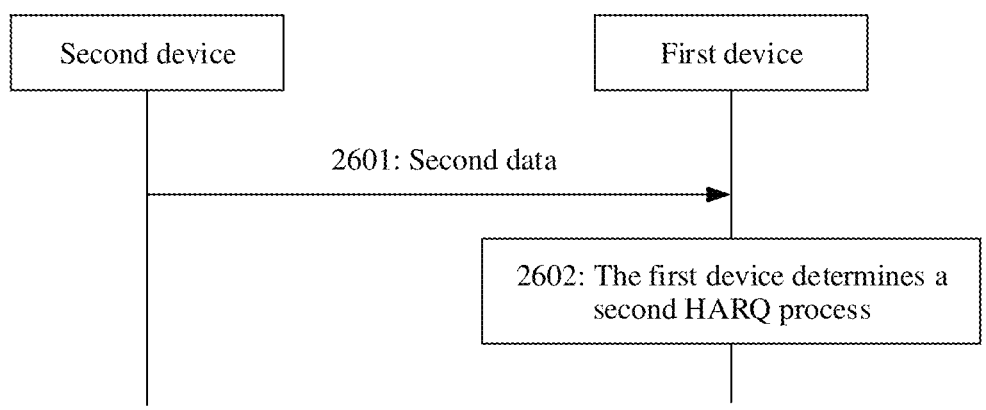
FIG. 26 is a schematic flowchart of another communication method according to an embodiment of this application.

FIG. 26 is a schematic diagram of another embodiment of a communication method 2600 according to an embodiment of this application. The method 2600 includes the following steps.

2601: A first device receives second data.

2602: The first device determines a second HARQ process.

For content related to this embodiment, refer to the related content in the embodiment shown in FIG. 8. Details are not described herein again.

A sequence of "a first device receives second data" and "the first device determines a second HARQ process" is not limited in this embodiment of this application, and is not necessarily two actions.

This embodiment may be applied to a case in which a plurality of or all groupcasts share one HARQ entity, may be applied to a case in which a groupcast and a unicast share one HARQ entity, or may be applied to a case in which each groupcast or each unicast maintains one HARQ entity.

This embodiment can resolve the problem 3.

This embodiment is used to maintain an association or a correspondence with a HARQ process.

According to the method shown in this embodiment, the first device may associate a transmission identifier and a HARQ process ID with the HARQ process. The first device receives retransmitted data associated with a same transmission identifier and a same HARQ process ID, and may deliver the retransmitted data and newly transmitted data to a same HARQ process, so that combination and decoding can be performed, thereby improving data transmission reliability.

According to the method shown in this embodiment, the first device may distinguish between differently groupcast data associated with a same HARQ process ID, and/or the first device may distinguish between unicast data and groupcast data associated with a same HARQ process ID.

Figure 27:
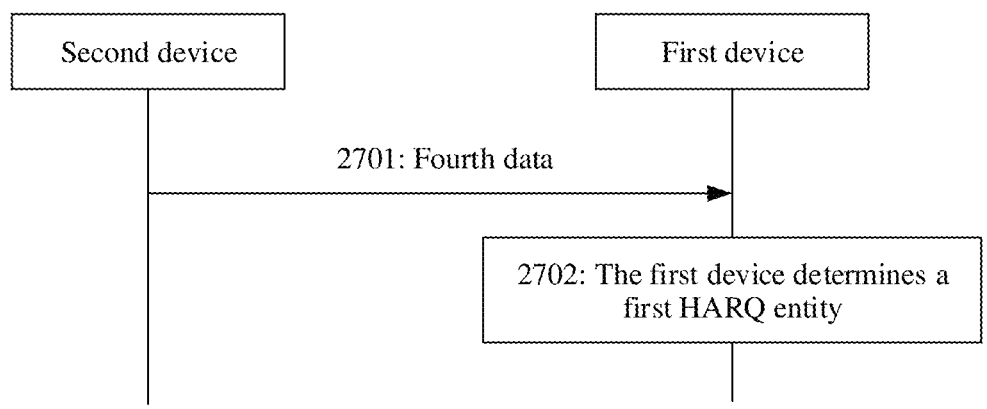
FIG. 27 is a schematic flowchart of another communication method according to an embodiment of this application.

FIG. 27 is a schematic diagram of another embodiment of a communication method 2700 according to an embodiment of this application. The method 2700 includes the following steps.

2701: A first device receives fourth data.

2702: The first device determines a first HARQ entity.

That the first device determines the first HARQ entity may be understood as that the first device processes the fourth data by using a first hybrid automatic repeat request HARQ entity.

For content related to this embodiment, refer to the related content in the embodiment shown in FIG. 8. Details are not described herein again.

This embodiment may be applied to a case in which a plurality of or all groupcasts share one HARQ entity, may be applied to a case in which a groupcast and a unicast share one HARQ entity, or may be applied to a case in which each groupcast or each unicast maintains one HARQ entity.

This embodiment is used to maintain an association or a correspondence with a HARQ entity.

This embodiment can resolve the problem 4.

According to the method shown in this embodiment, the first device may determine which HARQ entity should be used to process differently groupcast data, and/or the first device may determine which HARQ entity should be used to process unicast data and groupcast data.

Problem 7: The first device uses a HARQ entity (for example, a HARQ entity 1) to process a groupcast corresponding to a transmission identifier (for example, a G-RNTI 1). If the second device no longer transmits the groupcast or the first device no longer receives the groupcast, on the first device side, if the HARQ entity 1 is always occupied, a quantity of HARQ entities that can be used to receive data on the first device side decreases. If the first device does not release a correspondence related to the HARQ entity (for example, a correspondence between the HARQ entity 1 and a transmission identifier 1 (for example, a G-RNTI 1)), and the first device receives data (for example, newly transmitted data) associated with the transmission identifier 1 (for example, the G-RNTI 1) again, the first device may incorrectly clear/overwrite other data (for example, data in a HARQ buffer of a HARQ process of the HARQ entity 1) associated with the HARQ entity 1. For example, in a first step, the second device (for example, a network device) sends a groupcast 1 to the first device (for example, a terminal device) by using the transmission identifier 1 (for example, the G-RNTI 1), the first device receives the groupcast 1 by using the HARQ entity 1 (for example, data 1 that is associated with the HARQ process ID 1, and the first device receives the data 1 by using the HARQ process 1 of the HARQ entity 1), and then the first device no longer receives the groupcast 1. However, the first device does not release the correspondence between the HARQ entity 1 and the transmission identifier 1 (for example, the G-RNTI 1). In a second step, the second device sends a groupcast 2 to the first device by using a transmission identifier 2 (for example, a G-RNTI 2), and the first device receives the groupcast 2 by using the HARQ entity 1 (for example, data 2 that is associated with the HARQ process ID 1, and the first device receives the data 2 by using the HARQ process 1 of the HARQ entity 1). In a third step, the second device sends the groupcast 1 (for example, data 3 that is associated with the HARQ process ID 1, and the first device receives the data 3 by using the HARQ process 1 of the HARQ entity 1) to the first device by using the transmission identifier 1 (for example, the G-RNTI 1). The first device may perform any one of the following operations: (1) The HARQ entity 1 may be considered as an unoccupied, a HARQ buffer (for example, a HARQ buffer of the HARQ process 1) of the HARQ process of the HARQ entity 1 is cleared, and the data 2 is incorrectly cleared, affecting receiving of the groupcast 2 in the second step; or (2) the data 3 may be delivered to the HARQ entity (for example, the HARQ process 1 of the HARQ entity 1), affecting receiving of the groupcast 2 in the second step.

Therefore, this application proposes another communication method. The method includes the following steps.

If a first condition is met, or a first condition and a second condition are met, a first device (or a MAC layer of the first device) may perform any one or more of the following: releasing a correspondence between a first HARQ entity and a first transmission identifier, releasing a first HARQ entity, releasing a HARQ process of (corresponding to) a first HARQ entity, clearing a HARQ buffer corresponding to a HARQ process of (corresponding to) a first HARQ entity, or releasing a correspondence between a HARQ process of (corresponding to) a first HARQ entity and a transmission identifier and a HARQ process ID.

In this application, the releasing the HARQ entity may include/be replaced with any one or more of the following: considering/determining the HARQ entity as unoccupied and deactivating the HARQ entity. For example, the releasing the first HARQ entity may be understood as determining the first HARQ entity as unoccupied.

Specifically, optionally, the first condition includes: The first device releases a multicast radio bearer.

The multicast radio bearer is associated with the first HARQ entity.

That the MRB is associated with the first HARQ entity may be understood as that an identifier of the MRB or a first transmission identifier corresponding to the MRB/groupcast/multicast/broadcast/MBS session/PTM branch/data corresponding to the PTM branch/data/data transmitted in a PTM mode/data carried by TMGI or the MRB or data carried by a PTM branch corresponding to the MRB is associated with the first HARQ entity.

The first HARQ entity is/includes a HARQ entity associated with the MRB.

The HARQ process of (corresponding to) the first HARQ entity is/includes a HARQ process of (corresponding to) a HARQ entity associated with the MRB. For example, the HARQ process of (corresponding to) the first HARQ entity may be/include one or more or all HARQ processes (for example, one or more or all HARQ processes associated with the MRB) of (corresponding to) a HARQ entity associated with the MRB.

For explanations related to the "HARQ entity associated with the MRB", refer to the explanations related to the "HARQ process associated with the MRB" in the embodiment in FIG. 8, and the "HARQ process" needs to be replaced with the "HARQ entity" for understanding.

For content related to the MRB and content related to that the first device releases the MRB, refer to the content in the embodiment in FIG. 8. Details are not described herein again.

For example, there previously exist three associations in the first device or there exist three associations in the first device. For example, a transmission identifier 1 is associated with a HARQ entity 0, a transmission identifier 1 is associated with a HARQ entity 2, and a transmission identifier 2 is associated with a HARQ entity 3. The first device then releases an MRB associated with the transmission identifier 1. A HARQ entity corresponding to the MRB associated with the transmission identifier 1 is the HARQ entity 2. In this case, the first device performs any one or more of the following operations: releasing the association between the transmission identifier 1 and the HARQ entity 2, releasing the HARQ entity 2, clearing a HARQ buffer corresponding to a HARQ process of (corresponding to) the HARQ entity 2, releasing a HARQ process of (corresponding to) the HARQ entity 2, or releasing a correspondence between the HARQ process (corresponding to) of the HARQ entity 2 and the transmission identifier and the HARQ process ID.

Specifically, optionally, the first condition includes: The first device receives a unicast indication; or for the groupcast, the first device receives a unicast indication.

The unicast indication is associated with the first HARQ entity.

The first HARQ entity is/includes a HARQ entity associated with the unicast indication, or a HARQ entity associated with the unicast indication and a groupcast/PTM transmission mode. For example, the first HARQ entity may be/include one or more or all HARQ entities associated with the unicast indication, or one or more or all HARQ entities associated with the unicast indication and the groupcast/PTM transmission mode.

For explanations related to the "HARQ entity associated with the unicast indication", refer to the explanations related to the "HARQ process associated with the unicast indication" in the embodiment in FIG. 8, and the "HARQ process" needs to be replaced with the "HARQ entity" for understanding.

For content related to the unicast indication and content related to that the first device receives the unicast indication, refer to the content in the embodiment in FIG. 8. Details are not described herein again.

For example, the first device receives a unicast indication associated with the transmission identifier 1. A HARQ entity associated with the unicast indication associated with the transmission identifier 1 and a groupcast/PTM transmission mode is the HARQ entity 2. In this case, the first device performs any one or more of the following operations: releasing the association between the transmission identifier 1 and the HARQ entity 2, releasing the HARQ entity 2, clearing a HARQ buffer corresponding to a HARQ process of (corresponding to) the HARQ entity 2, releasing a HARQ process of (corresponding to) the HARQ entity 2, or releasing a correspondence between the HARQ process (corresponding to) of the HARQ entity 2 and the transmission identifier and the HARQ process ID.

Specifically, optionally, the first condition includes: The first device receives the first data sent in a unicast/PTP mode.

The first data is groupcast data. Alternatively, the first data is associated with a first transmission identifier, and the first transmission identifier is a groupcast identifier.

The first HARQ entity is/includes a HARQ entity associated with a first transmission identifier associated with the first data, or a HARQ entity associated with a first transmission identifier associated with the first data and data sent in a groupcast/PTM mode.

For example, there previously exist two associations in the first device or there exist two associations in the first device. For example, a transmission identifier 1 is associated with a HARQ entity 0, which is corresponding to the data transmitted in the groupcast/PTM mode; and a transmission identifier 2 is associated with a HARQ entity 1, which is corresponding to the data transmitted in the groupcast/PTM mode. Then, the first device receives data transmitted in a unicast/PTP mode, where the data is associated with the transmission identifier 1. A HARQ entity associated with the transmission identifier 1 and the data transmitted in the groupcast/PTM mode is the HARQ entity 0. In this case, the first device performs any one or more of the following operations: releasing the association between the transmission identifier 1 and the HARQ entity 0, releasing the HARQ entity 0, clearing a HARQ buffer corresponding to a HARQ process of (corresponding to) the HARQ entity 0, releasing a HARQ process of (corresponding to) the HARQ entity 0, or releasing a correspondence between the HARQ process (corresponding to) of the HARQ entity 0 and the transmission identifier and the HARQ process ID.

Specifically, optionally, the first condition includes: The first device receives a groupcast indication; or for the groupcast, the first device receives a groupcast indication.

The groupcast indication is associated with a first HARQ entity.

The first HARQ entity is/includes a HARQ entity associated with the groupcast indication, or a HARQ entity associated with the groupcast indication and a unicast/PTP transmission mode. For example, the first HARQ entity may be/include one or more or all HARQ entities associated with the groupcast indication, or one or more or all HARQ entities associated with the groupcast indication and the unicast/PTP transmission mode.

For explanations related to the "HARQ entity associated with the groupcast indication", refer to the explanations related to the "HARQ process associated with the groupcast indication" in the embodiment in FIG. 8, and the "HARQ process" needs to be replaced with the "HARQ entity" for understanding.

For content related to the groupcast indication and content related to receiving the groupcast indication by the first device, refer to the content in the embodiment in FIG. 8. Details are not described herein again.

For example, the first device receives a groupcast indication associated with the transmission identifier 1. A HARQ entity associated with the groupcast indication associated with the transmission identifier 1 and the unicast/PTP transmission mode is the HARQ entity 2. In this case, the first device performs any one or more of the following operations: releasing the association between the transmission identifier 1 and the HARQ entity 2, releasing the HARQ entity 2, clearing a HARQ buffer corresponding to a HARQ process of (corresponding to) the HARQ entity 2, releasing a HARQ process of (corresponding to) the HARQ entity 2, or releasing a correspondence between the HARQ process (corresponding to) of the HARQ entity 2 and the transmission identifier and the HARQ process ID.

Specifically, optionally, the first condition includes: The first device receives the first data sent in a groupcast/PTM mode.

The first data is groupcast data. Alternatively, the first data is associated with a first transmission identifier, and the first transmission identifier is a groupcast identifier.

The first HARQ entity is/includes a HARQ entity associated with a first transmission identifier associated with the first data, or a HARQ entity associated with a first transmission identifier associated with the first data and data sent in a unicast/PTP mode.

For example, there previously exist two associations in the first device or there exist two associations in the first device. For example, a transmission identifier 1 is associated with a HARQ entity 0, which is corresponding to the data transmitted in the unicast/PTP mode; and a transmission identifier 2 is associated with a HARQ entity 1, which is corresponding to the data transmitted in the unicast/PTP mode. Then, the first device receives data transmitted in a groupcast/PTM mode, where the data is associated with the transmission identifier 1. A HARQ entity associated with the transmission identifier 1 and the data transmitted in the unicast/PTP mode is the HARQ entity 0. In this case, the first device performs any one or more of the following operations: releasing the association between the transmission identifier 1 and the HARQ entity 0, releasing the HARQ entity 0, clearing a HARQ buffer corresponding to a HARQ process of (corresponding to) the HARQ entity 0, releasing a HARQ process of (corresponding to) the HARQ entity 0, or releasing a correspondence between the HARQ process (corresponding to) of the HARQ entity 0 and the transmission identifier and the HARQ process ID.

Specifically, optionally, the first condition includes: The first device receives fifth information, where the fifth information is used to indicate any one or more of the following: releasing a correspondence between a first HARQ entity and a first transmission identifier, releasing a first HARQ entity, releasing a HARQ process of (corresponding to) a first HARQ entity, clearing a HARQ buffer corresponding to a HARQ process of (corresponding to) a first HARQ entity, or releasing a correspondence between a HARQ process of (corresponding to) a first HARQ entity and a transmission identifier and a HARQ process ID.

For example, the fifth information may be indication information sent by the second device, and the fifth information may be information such as DCI, a MAC CE, RRC (for example, in a reconfiguration message), or a broadcast message.

The fifth information may explicitly or implicitly indicate the foregoing content.

The first HARQ entity may include any one or more of the following: a HARQ entity associated with any one or more of the first transmission identifier and the fifth information.

Specifically, optionally, the first condition includes: For the first transmission identifier, the first device determines to perform MAC reset.

The first HARQ entity is/includes a HARQ entity associated with the first transmission identifier. For example, the first HARQ entity may be/include one or more or all HARQ entities associated with the first transmission identifier.

For explanations related to the "HARQ entity associated with the first transmission identifier", refer to the explanations related to the "HARQ process associated with the first transmission identifier" in the embodiment in FIG. 8, and the "HARQ process" needs to be replaced with the "HARQ entity" for understanding.

For content related to that the first device determines to perform MAC reset, refer to the content in the embodiment in FIG. 8. Details are not described herein again.

For example, there previously exist three associations in the first device or there exist three associations in the first device. For example, a transmission identifier 1 is associated with a HARQ entity 0, a transmission identifier 1 is associated with a HARQ entity 2, and a transmission identifier 2 is associated with a HARQ entity 3. Then, the first device determines to perform MAC reset for the transmission identifier 1. A HARQ entity associated with the transmission identifier 1 is the HARQ entity 2. In this case, the first device performs any one or more of the following operations: releasing the association between the transmission identifier 1 and the HARQ entity 2, releasing the HARQ entity 2, clearing a HARQ buffer corresponding to a HARQ process of (corresponding to) the HARQ entity 2, releasing a HARQ process of (corresponding to) the HARQ entity 2, or releasing a correspondence between the HARQ process (corresponding to) of the HARQ entity 2 and the transmission identifier and the HARQ process ID.

This embodiment can resolve the problem 7.

This embodiment may be used to release the correspondence between the HARQ entity and the transmission identifier, release the HARQ entity, release the HARQ process (corresponding to) of the HARQ entity, clear the HARQ buffer corresponding to the HARQ process of (corresponding to) the HARQ entity, and release the correspondence between the HARQ process (corresponding to) of the HARQ entity and the transmission identifier and the HARQ process ID. This can release the buffer, so that a quantity of HARQ entities/HARQ processes used by the first device to process other data can be increased, and data transmission efficiency can be improved. This can prevent the first device from incorrectly clearing/overwriting data or incorrectly using the HARQ entity/HARQ process, thereby ensuring data receiving reliability and improving data transmission performance.

It should be noted that the solutions in embodiments may be combined on the premise that the solutions are not contradictory.

Figure 28:
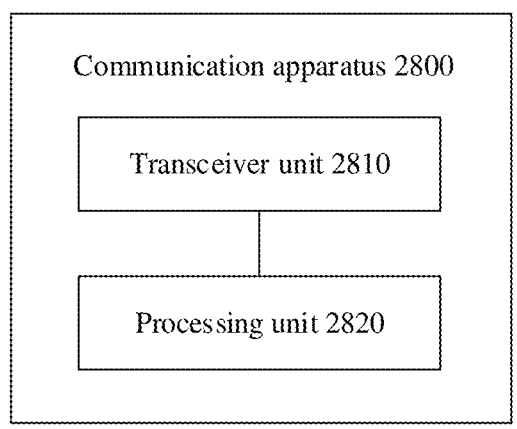
FIG. 28 is a schematic block diagram of a communication apparatus according to an embodiment of this application.

An embodiment of this application provides a communication apparatus 2800. FIG. 28 is a schematic block diagram of the communication apparatus 2800 according to an embodiment of this application. The communication apparatus 2800 includes a transceiver unit 2810 and a processing unit 2820.

The processing unit 2820 is configured to determine that a first condition is met.

The processing unit 2820 is further configured to clear a first hybrid automatic repeat request buffer HARQ buffer corresponding to a first hybrid automatic repeat request process HARQ process, release the first HARQ process, and/or release a correspondence related to the first HARQ process.

The first condition includes: the transceiver unit 2810 is configured to receive second data; and the processing unit 2820 is further configured to determine that the second data is newly transmitted data, where a second transmission identifier and a second hybrid automatic repeat request process identifier HARQ process ID that are corresponding to the second data are the same as a first transmission identifier and a first HARQ process ID that are corresponding to first data, or a second transmission identifier corresponding to the second data is the same as a first transmission identifier corresponding to first data.

The first condition includes: the transceiver unit 2810 is configured to receive first information, where the first information indicates that transmission stops, and the first information is associated with the first data.

That the first information indicates that transmission stops includes: The first information indicates that transmission corresponding to the first transmission identifier stops, and the first transmission identifier is associated with the first data; the first information indicates that transmission corresponding to the first hybrid automatic repeat request process identifier HARQ process ID stops, and the first HARQ process ID is associated with the first data; the first information indicates that transmission corresponding to the first transmission identifier and the first HARQ process ID stops; or the first information indicates that transmission corresponding to a groupcast or a unicast stops, and the groupcast or the unicast is associated with the first data.

The first condition includes: the transceiver unit 2810 is configured to receive third data sent in a unicast mode, where the third data is associated with the first data, and the first data is sent in a multicast mode.

The first condition includes: the processing unit 2820 is further configured to process fourth data by using a first hybrid automatic repeat request entity HARQ entity, where a fourth transmission identifier corresponding to the fourth data is different from the first transmission identifier corresponding to the first data.

The processing unit 2820 is specifically configured to: allocate associated HARQ information and the fourth transmission identifier to the first HARQ entity; allocate associated HARQ information to the first HARQ entity; or indicate a fourth resource or existence of a fourth resource to the first HARQ entity, where the associated HARQ information includes at least one of the following: a fourth HARQ process ID, a fourth new data indicator NDI, a fourth redundancy version RV, and a fourth transport block size TBS.

The apparatus further includes a transceiver unit. The first condition includes: the processing unit is further configured to release a multicast radio bearer, where the multicast radio bearer is associated with the first HARQ process; the transceiver unit is configured to receive a unicast indication, where the unicast indication is associated with the first HARQ process; the transceiver unit is further configured to receive first data sent in a unicast mode, where the first data is associated with the first HARQ process; the transceiver unit is configured to receive a multicast indication, where the multicast indication is associated with the first HARQ process; the transceiver unit is further configured to receive first data sent in a multicast mode, where the first data is associated with the first HARQ process; the transceiver unit is further configured to receive third information, where the third information indicates to release the first HARQ process; or the processing unit is further configured to reset media access radio control MAC for a first transmission identifier, where the first transmission identifier is associated with the first HARQ process.

The processing unit 2820 is specifically configured to: if the first condition is determined to be met and a second condition is determined to be met, clear the first HARQ buffer, release the first HARQ process, and/or release the correspondence related to the first HARQ process, where the second condition includes:

the first HARQ buffer is not empty;

the first HARQ process is associated with the first data;

the first HARQ process is associated with the first transmission identifier and the first HARQ process ID; or the first HARQ process is associated with the first transmission identifier;

the first HARQ process is associated with first downlink control information DCI corresponding to the first data;

the first HARQ process is associated with the first HARQ entity; transmission corresponding to the first HARQ process succeeds or ends;

the first device receives the newly transmitted data; or a quantity of unoccupied HARQ processes is less than or equal to a first threshold.

The processing unit 2820 is specifically configured to determine, based on the second transmission identifier, the second HARQ process ID, and a second new data indicator NDI corresponding to the second data, that the second data is the newly transmitted data.

The processing unit 2820 is further configured to:

determine a second HARQ process, where the second HARQ process is used to process the second data; and associate the second transmission identifier and the second HARQ process ID with the second HARQ process;

associate the second transmission identifier with the second HARQ process;

associate the second HARQ process ID with the second HARQ process; or associate second downlink control information DCI corresponding to the second data with the second HARQ process.

An embodiment of this application further provides a communication apparatus. The communication apparatus may be a terminal device, or may be a circuit. The communication apparatus may be configured to perform an action performed by the first device in the foregoing method embodiment.

Figure 29:
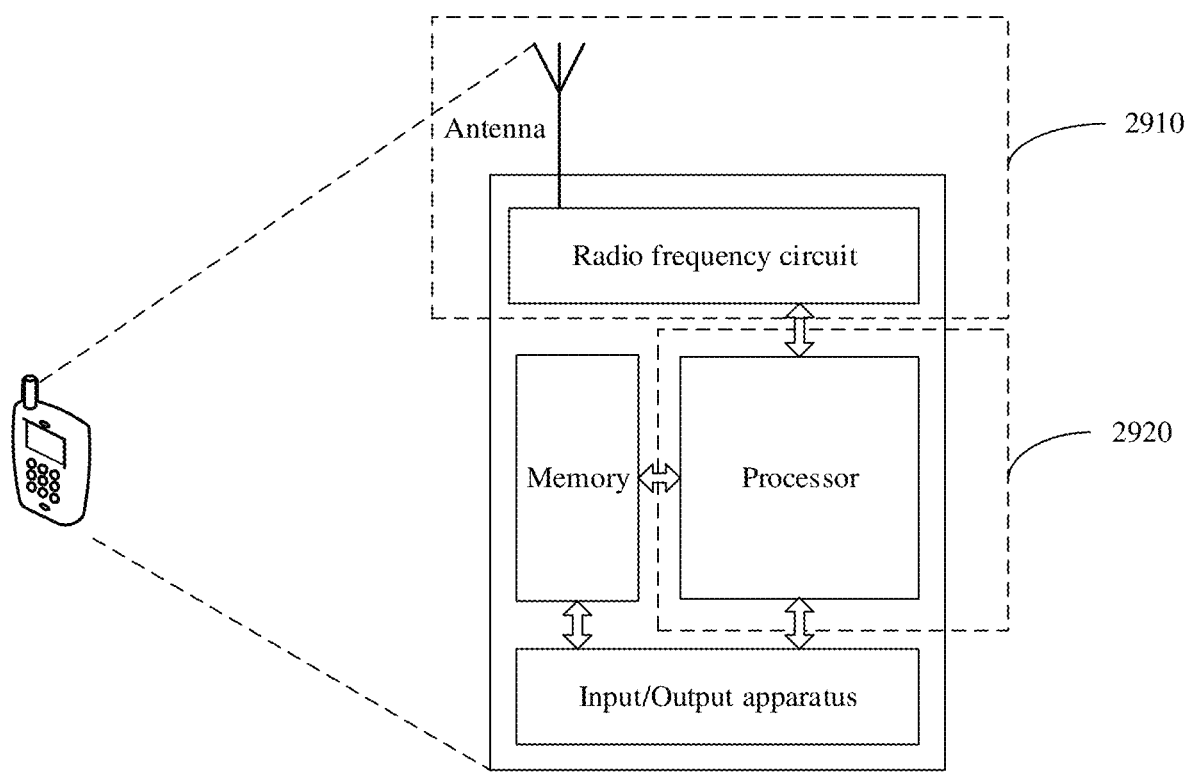
FIG. 29 is a schematic block diagram of a communication apparatus according to an embodiment of this application.

When the communication apparatus is the terminal device, FIG. 29 is a simplified schematic diagram of a structure of the terminal device. For ease of understanding and illustration, an example in which the terminal device is a mobile phone is used in FIG. 29. As shown in FIG. 29, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 29 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 29, the terminal device includes a transceiver unit 2910 and a processing unit 2920. The transceiver unit may also be referred to as a transceiver, a transceiver machine, a transceiver apparatus, or the like. The processing unit may also be referred to as a processor, a processing board, a processing module, a processing apparatus, or the like. A component that is in the transceiver unit 2910 and that is configured to implement a receiving function may be considered as a receiving unit, and a component that is in the transceiver unit 2910 and that is configured to implement a sending function may be considered as a sending unit. That is, the transceiver unit 2910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 2910 is configured to perform a sending operation and a receiving operation on a side of the terminal device in the foregoing method embodiments, and the processing unit 2920 is configured to perform an operation other than the sending operation and the receiving operation of the terminal device in the foregoing method embodiments.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 30:
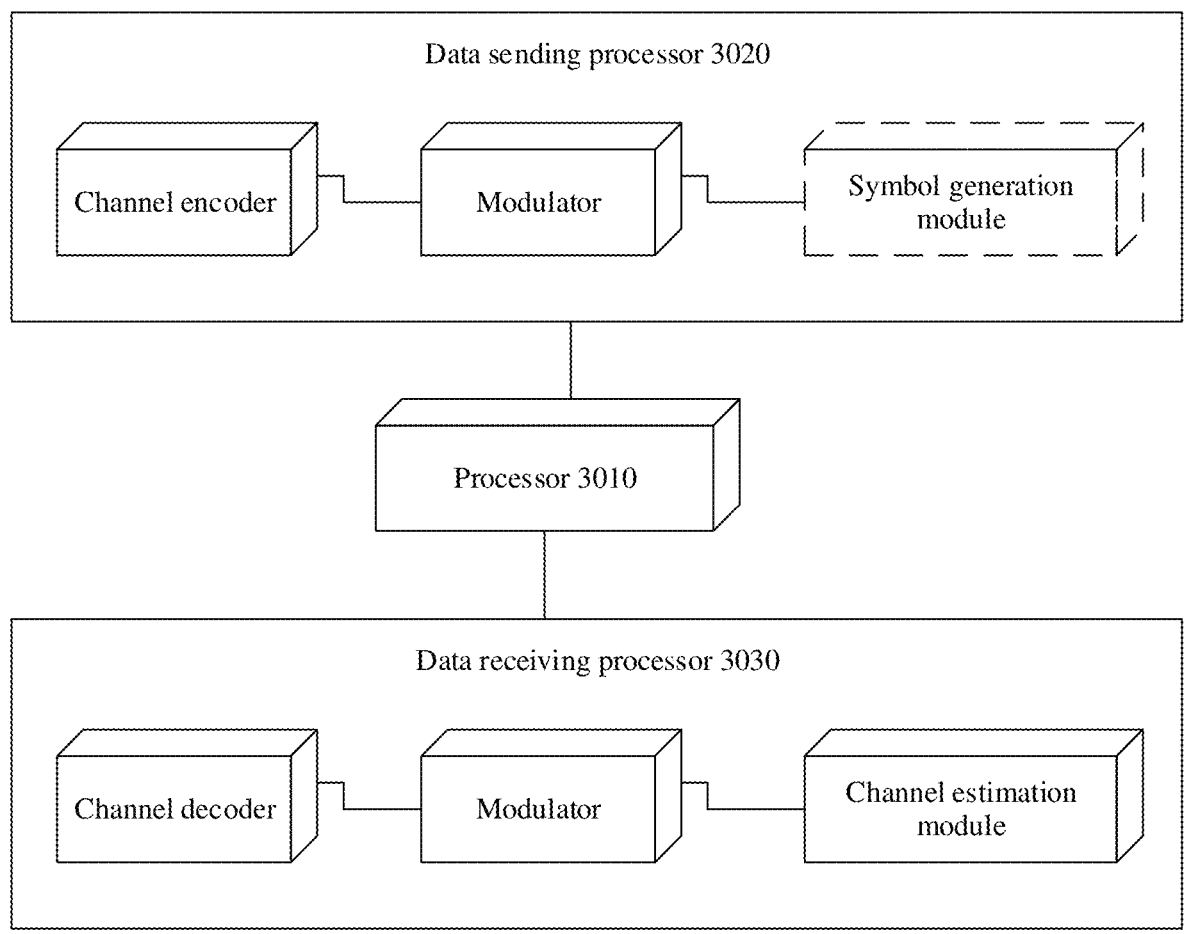
FIG. 30 is another schematic block diagram of a communication apparatus according to an embodiment of this application.

When the communication apparatus in this embodiment is the terminal device, refer to a device shown in FIG. 29. In an example, the device may implement a function similar to that of the processing unit 2820 in FIG. 28. In FIG. 30, the device includes a processor 3010, a data sending processor 3020, and a data receiving processor 3030. The processing unit 2820 in the foregoing embodiment may be the processor 3010 in FIG. 12, and implements a corresponding function. The transceiver unit 2810 in the foregoing embodiment may be the data sending processor 3020 and/or the data receiving processor 3030 in FIG. 30. Although FIG. 30 shows a channel encoder and a channel decoder, it may be understood that these modules do not constitute a limitation on this embodiment, and are merely examples.

Figure 31:
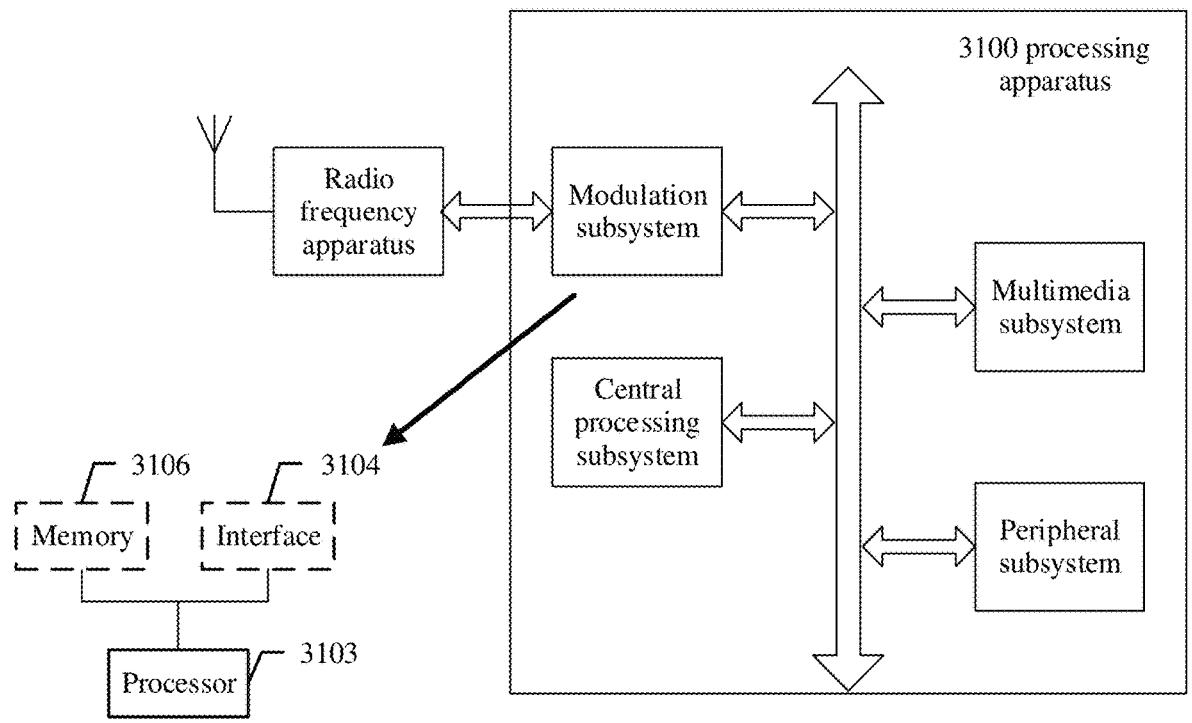
FIG. 31 is still another schematic block diagram of a communication apparatus according to an embodiment of this application.

FIG. 31 shows another form of this embodiment. A processing apparatus 3100 includes modules such as a modulation subsystem, a central processing subsystem, and a peripheral subsystem. The communication apparatus in this embodiment may be used as the modulation subsystem. Specifically, the modulation subsystem may include a processor 3103 and an interface 3104. The processor 3103 implements a function of the processing unit 2820, and the interface 3104 implements a function of the transceiver unit 2810. In another variation, the modulation subsystem includes a memory 3106, a processor 3103, and a program that is stored in the memory 3106 and that can be run on the processor. When executing the program, the processor 3103 implements the method on a side of the terminal device in the foregoing method embodiment. It should be noted that the memory may be a non-volatile memory or a volatile memory. The memory may be located in the modulation subsystem, or may be located in the processing apparatus 3100, provided that the memory 3106 can be connected to the processor 3103.

An embodiment of this application provides a communication system, including the communication apparatuses in embodiments.

Figure 32:
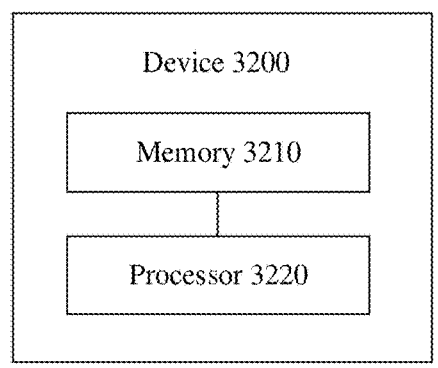
FIG. 32 is a schematic block diagram of a network device according to an embodiment of this application.

An embodiment of this application provides a device 3200. FIG. 32 is a schematic block diagram of a device according to an embodiment of this application. The device 3200 includes:

a memory 3210, configured to store executable instructions; and 3106 a processor 3220, configured to invoke and run the executable instructions in the memory 3210, to implement the method in embodiments of this application.

The foregoing processor may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The foregoing memory may be a volatile memory or a non-volatile memory, or may include both a volatile memory and a non-volatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that the memory may be integrated into the processor, or the processor and the memory may be integrated into a same chip, or may be separately located on different chips and connected in an interface coupling manner. This is not limited in this embodiment of this application.

An embodiment of this application further provides a computer-readable storage medium. The computer-readable storage medium stores computer instructions used to implement the method in the foregoing method embodiments. When the computer program is run on a computer, the computer is enabled to implement the method in the foregoing method embodiments.

In addition, the term "and/or" in this application merely indicates an association relationship for describing associated objects, and indicates that three relationships may exist. For example, A and/or B may indicate the following three cases: Only A exists, both A and B exist, and only B exists.

In addition, the character "/" in this specification generally indicates that the associated objects are in an "or" relationship. In this application, the term "at least one" may represent "one" and "two or more". For example, at least one of A, B, and C may represent the following seven cases: Only A exists, only B exists, only C exists, both A and B exist, both A and C exist, both C and B exist, A, B, and C all exist.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application, but such implementation should not be considered beyond the scope of this application.

A person skilled in the art may clearly learn that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a terminal device, that a second new data indicator (NDI) is toggled in response to a first condition being met, wherein the second NDI is associated with a second resource;
   receiving, by the terminal device, a second data, the second data is transmitted on the second resource, the second resource is associated with a second hybrid automatic repeat request (HARQ) process identifier (ID); and
   determining, by the terminal device, the second data is newly transmitted data in response to the second NDI being toggled compared to a first NDI, wherein the first NDI is an NDI of a previous transmission associated with the second HARQ process ID,
   wherein the first condition comprises at least one of the following:
      the second resource is scheduled by using downlink control information (DCI) or physical downlink control channel (PDCCH) scrambled by a first radio network temporary identifier (RNTI), the second HARQ process ID is previously associated with a configured resource for multicast, and the first RNTI is at least one of used to schedule a dynamic resource for unicast or used to schedule a retransmission resource of the dynamic resource for unicast;
      the second resource is scheduled by using DCI/PDCCH scrambled by the first RNTI, the second HARQ process ID is previously associated with a resource scheduled by using DCI or PDCCH scrambled by a second RNTI, the first RNTI is at least one of used to schedule the dynamic resource for unicast or used to schedule the retransmission resource of the dynamic resource for unicast, and the second RNTI is used for one or more of activating a configured resource for multicast, reactivating the configured resource for multicast, deactivating the configured resource for multicast, or scheduling a retransmission resource of the configured resource for multicast;
      the second resource is scheduled by using DCI or PDCCH scrambled by a third RNTI, the second HARQ process ID is previously associated with a configured resource for unicast, and the third RNTI is at least one of used to schedule the dynamic resource for multicast or used to schedule the retransmission resource of the dynamic resource for multicast; or
      the second resource is scheduled by using DCI or PDCCH scrambled by the third RNTI, the second HARQ process ID is previously associated with a resource scheduled by using DCI or PDCCH scrambled by a fourth RNTI, and the third RNTI is at least one of used to schedule the dynamic resource for multicast or used to schedule the retransmission resource of the dynamic resource for multicast, and the fourth RNTI is used for one or more of activating the configured resource for unicast, reactivating the configured resource for unicast, deactivating the configured resource for unicast, or scheduling a retransmission resource of the configured resource for unicast.

2. The communication method according to claim 1, wherein the first RNTI is a cell-radio network temporary identity.

3. The communication method according to claim 1, wherein the third RNTI is a group radio network temporary identity.

4. A device, comprising:
a processor; and
a memory having instructions stored thereon that, when executed by the processor, cause the device to:
determine that a second new data indicator (NDI) is toggled in response to a first condition being met, wherein the second NDI is associated with a second resource;
receive a second data, the second data is transmitted on the second resource, the second resource is associated with a second hybrid automatic repeat request (HARQ) process identifier (ID); and
determine the second data is newly transmitted data in response to the second NDI being toggled compared to a first NDI, wherein the first NDI is an NDI of a previous transmission associated with the second HARQ process ID,
wherein the first condition comprises at least one of the following:
the second resource is scheduled by using downlink control information (DCI) or physical downlink control channel (PDCCH) scrambled by a first radio network temporary identifier (RNTI), the second HARQ process ID is previously associated with a configured resource for multicast, and the first RNTI is at least one of used to schedule a dynamic resource for unicast or used to schedule a retransmission resource of the dynamic resource for unicast;
the second resource is scheduled by using DCI/PDCCH scrambled by the first RNTI, the second HARQ process ID is previously associated with a resource scheduled by using DCI or PDCCH scrambled by a second RNTI, the first RNTI is at least one of used to schedule the dynamic resource for unicast or used to schedule the retransmission resource of the dynamic resource for unicast, and the second RNTI is used for one or more of activating a configured resource for multicast, reactivating the configured resource for multicast, deactivating the configured resource for multicast, or scheduling a retransmission resource of the configured resource for multicast;
the second resource is scheduled by using DCI or PDCCH scrambled by a third RNTI, the second HARQ process ID is previously associated with a configured resource for unicast, and the third RNTI is at least one of used to schedule the dynamic resource for multicast or used to schedule the retransmission resource of the dynamic resource for multicast; or
the second resource is scheduled by using DCI or PDCCH scrambled by the third RNTI, the second HARQ process ID is previously associated with a resource scheduled by using DCI or PDCCH scrambled by a fourth RNTI, and the third RNTI is at least one of used to schedule the dynamic resource for multicast or used to schedule the retransmission resource of the dynamic resource for multicast, and the fourth RNTI is used for one or more of activating the configured resource for unicast, reactivating the configured resource for unicast, deactivating the configured resource for unicast, or scheduling a retransmission resource of the configured resource for unicast.

5. The device according to claim 4, wherein the first RNTI is a cell-radio network temporary identity.

6. The device according to claim 4, wherein the third RNTI is a group radio network temporary identity.

7. A communication system, comprising:
a terminal device; and
a network device,
wherein
the network device is configured to send, to the terminal device, a second data, the second data is transmitted on a second resource associated with a second hybrid automatic repeat request (HARQ) process identifier (ID),
the terminal device is configured to determine that a second new data indicator (NDI) is toggled in response to a first condition being met,
the second NDI is associated with the second resource,
the terminal device is configured to determine the second data is newly transmitted data in response to the second NDI being toggled compared to a first NDI, wherein the first NDI is an NDI of a previous transmission associated with the second HARQ process ID, and
the first condition comprises at least one of the following:
the second resource is scheduled by using downlink control information (DCI) or physical downlink control channel (PDCCH) scrambled by a first radio network temporary identifier (RNTI), the second HARQ process ID is previously associated with a configured resource for multicast, and the first RNTI is at least one of used to schedule a dynamic resource for unicast or used to schedule a retransmission resource of the dynamic resource for unicast;
the second resource is scheduled by using DCI/PDCCH scrambled by the first RNTI, the second HARQ process ID is previously associated with a resource scheduled by using DCI or PDCCH scrambled by a second RNTI, the first RNTI is at least one of used to schedule the dynamic resource for unicast or used to schedule the retransmission resource of the dynamic resource for unicast, and the second RNTI is used for one or more of activating a configured resource for multicast, reactivating the configured resource for multicast, deactivating the configured resource for multicast, or scheduling a retransmission resource of the configured resource for multicast;
the second resource is scheduled by using DCI or PDCCH scrambled by a third RNTI, the second HARQ process ID is previously associated with a configured resource for unicast, and the third RNTI is at least one of used to schedule the dynamic resource for multicast or used to schedule the retransmission resource of the dynamic resource for multicast; or
the second resource is scheduled by using DCI or PDCCH scrambled by the third RNTI, the second HARQ process ID is previously associated with a resource scheduled by using DCI or PDCCH scrambled by a fourth RNTI, and the third RNTI is at least one of used to schedule the dynamic resource for multicast or used to schedule the retransmission resource of the dynamic resource for multicast, and the fourth RNTI is used for one or more of activating the configured resource for unicast, reactivating the configured resource for unicast, deactivating the configured resource for unicast, or scheduling a retransmission resource of the configured resource for unicast.

8. The communication system according to claim 7, wherein the first RNTI is a cell-radio network temporary identity.

9. The communication system according to claim 7, wherein the third RNTI is a group radio network temporary identity.

* * * * *